US012785217B2

(12) United States Patent
Kieran et al.

(10) Patent No.: US 12,785,217 B2
(45) Date of Patent: Nov. 3, 2026

(54) BATTERY PACK FOR AN ELECTRIC VEHICLE

(71) Applicant: LITENS AUTOMOTIVE PARTNERSHIP, Woodbridge (CA)

(72) Inventors: Sean Kieran, Woodbridge (CA); Geoffrey William Ryeland, North York (CA); Ercong Ji, Scarborough (CA); Hao Q. Tran, North York (CA); Geoffrey Hodgson, Aurora (CA); Hossein Siadatkhoo, Unionville (CA); Sageevan Maheswaran, Bradford (CA); John Antchak, Aurora (CA); Zhengjie Jia, Woodbridge (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 432 days.

(21) Appl. No.: 18/557,432

(22) PCT Filed: May 3, 2022

(86) PCT No.: PCT/CA2022/050694
§ 371 (c)(1),
(2) Date: Oct. 26, 2023

(87) PCT Pub. No.: WO2022/232928
PCT Pub. Date: Nov. 10, 2022

(65) Prior Publication Data

US 2024/0234961 A1 Jul. 11, 2024

Related U.S. Application Data

(60) Provisional application No. 63/197,818, filed on Jun. 7, 2021, provisional application No. 63/183,623, filed
(Continued)

(51) Int. Cl.
*H01M 50/505* (2021.01)
*B60L 50/64* (2019.01)
(Continued)

(52) U.S. Cl.
CPC .......... *H01M 50/505* (2021.01); *B60L 50/64* (2019.02); *H01M 50/249* (2021.01);
(Continued)

(58) Field of Classification Search
None
See application file for complete search history.

(56) References Cited

U.S. PATENT DOCUMENTS 4,091,174 A 5/1978 Ruch et al.
8,067,111 B2 11/2011 Koetting et al.
(Continued)

FOREIGN PATENT DOCUMENTS

CA 2860465 A1 7/2013
CN 210607540 U 5/2020
(Continued)

OTHER PUBLICATIONS

Extended European Search Report issued in corresponding EP Patent Application No. 22798467.1 Feb. 18, 2025.
(Continued)

*Primary Examiner* — Alexander Usyatinsky
(74) *Attorney, Agent, or Firm* — Aird & Berlis LLP

(57) ABSTRACT

A battery pack is provided. The battery pack, in an aspect, provides direct a plurality of modules, each having a housing, a plurality of cells in the housing, and a plurality of bus bars connecting the cells electrically to one another. The housing includes a cover. At least one of the bus bars is mounted to the cover for removable engagement with the cells contained therein. When the cover is removed from a lower housing portion of the housing, the at least one bus bar
(Continued)

is removed with the cover, thereby breaking any electrical flow path through the cells.

9 Claims, 43 Drawing Sheets

Related U.S. Application Data on May 3, 2021, provisional application No. 63/183,622, filed on May 3, 2021.

(51) Int. Cl.
*H01M 50/249* (2021.01)
*H01M 50/271* (2021.01)
*H01M 50/548* (2021.01)
*B60L 53/80* (2019.01)

(52) U.S. Cl.
CPC ....... *H01M 50/271* (2021.01); *H01M 50/548* (2021.01); *B60L 53/80* (2019.02); *H01M 2220/20* (2013.01)

(56) References Cited

U.S. PATENT DOCUMENTS

| | | | | |
|---|---|---|---|---|
| 8,124,262 | B2 | 2/2012 | Okada et al. | |
| 8,304,104 | B2 | 11/2012 | Lee et al. | |
| 8,722,224 | B2 | 5/2014 | Lee et al. | |
| 8,956,747 | B2 | 2/2015 | Itoi et al. | |
| 9,548,476 | B2 | 1/2017 | Cicero et al. | |
| 9,692,095 | B2 | 6/2017 | Harris | |
| 9,869,726 | B2 | 1/2018 | Zumstein et al. | |
| 9,960,395 | B2 | 5/2018 | Yoon et al. | |
| 10,084,219 | B2 | 9/2018 | Roh et al. | |
| 10,243,183 | B1 | 3/2019 | Harris, III | |
| 10,243,184 | B1 | 3/2019 | Harris, III | |
| 10,305,078 | B1 | 5/2019 | Harris, III | |
| 10,396,410 | B2 | 8/2019 | Mastrandrea | |
| D868,692 | S | 12/2019 | Harris, III | |
| 10,497,912 | B2 | 12/2019 | Lui et al. | |
| 10,573,859 | B2 * | 2/2020 | Roddy | H01M 10/441 |
| 11,539,087 | B2 | 12/2022 | Chidester et al. | |
| 2011/0293986 | A1 | 12/2011 | Kozu | |
| 2013/0196184 | A1 | 8/2013 | Faass et al. | |
| 2015/0111082 | A1 * | 4/2015 | Sumpf | H01M 50/262 429/120 |
| 2017/0005371 | A1 * | 1/2017 | Chidester | H01M 50/20 |
| 2017/0162922 | A1 * | 6/2017 | Sumpf, Jr. | H01M 10/6557 |
| 2017/0194680 | A1 * | 7/2017 | Muck | H01M 50/264 |
| 2018/0212222 | A1 * | 7/2018 | Barton | H01M 50/3425 |
| 2018/0254536 | A1 * | 9/2018 | Chidester | H01M 10/6567 |
| 2019/0319249 | A1 * | 10/2019 | Barton | H01M 50/502 |
| 2020/0076018 | A1 | 3/2020 | Butterfield et al. | |
| 2020/0212525 | A1 | 7/2020 | Ogino et al. | |
| 2020/0227697 | A1 | 7/2020 | Cummins et al. | |
| 2021/0194035 | A1 | 6/2021 | Offutt et al. | |
| 2021/0359359 | A1 | 11/2021 | Harris et al. | |
| 2021/0399355 | A1 | 12/2021 | Darlix | |

FOREIGN PATENT DOCUMENTS

| | | | | |
|---|---|---|---|---|
| CN | 112103594 | A | 12/2020 | |
| CN | 112467287 | A | 3/2021 | |
| CN | 214848772 | U | 11/2021 | |
| CN | 109935939 | B | 1/2022 | |
| CN | 114006103 | A | 2/2022 | |
| CN | 114156560 | A | 3/2022 | |
| CN | 216058098 | U | 3/2022 | |
| CN | 114421086 | A | 4/2022 | |
| CN | 115036636 | A | 9/2022 | |
| CN | 115411407 | A | 11/2022 | |
| CN | 115579550 | A | 1/2023 | |
| DE | 202021003752 | U1 | 6/2022 | |
| EP | 3096372 | B2 | 6/2021 | |
| GB | 2545567 | A | 12/2016 | |
| IN | 201937052673 | A | 1/2020 | |
| KR | 20220169289 | A | 12/2022 | |
| WO | 2006099602 | A1 | 9/2006 | |
| WO | 2006099602 | A2 | 9/2006 | |
| WO | WO 2006099602 | * | 9/2006 | |
| WO | 2013137707 | A1 | 9/2013 | |
| WO | WO-2013188680 | A1 * | 12/2013 | H01M 10/658 |
| WO | WO-2017020674 | A1 * | 2/2017 | B60L 50/66 |
| WO | WO-2018071776 | A1 * | 4/2018 | H01M 10/613 |
| WO | 2018134704 | A1 | 7/2018 | |
| WO | WO 2018134704 | * | 7/2018 | |
| WO | 2020128532 | A1 | 6/2020 | |
| WO | 2020128533 | A1 | 6/2020 | |
| WO | 2021214794 | A1 | 10/2021 | |

OTHER PUBLICATIONS

"Dielectric Fluids for safer, cooler, greener high performance EV batteries," mivoltcooling.com/ev-battery-systems, as early as Jan. 20, 2023.

"DF7 Dielectric Liquid Technical Brochure," M&I Materials, as early as Jan. 20, 2023.

"DFK Dielectric Liquid Technical Brochure," M&U Materials, as early as Jan. 20, 2023.

"Faraday Future Partners with Mivolt (M&I Materials) to Announce a Unique Fully Submerged Battery Cooling System," Business Wire, Dec. 2, 2020.

International Search Report and Written Opinion for PCT/CA2022/050694 mailed Aug. 1, 2022.

"XOS Inc—Electric Truck Co.—Investor Presentation" as early as Feb. 2021.

"GM Wireless BMS Battery Management System to Reduce 90% of Wiring and Cabling with Battery Enclosure".

Ulrich, "Exclusive: GM Can Manage an EV's Batteries Wirelessly—and Remotely," IEEE Spectrum, Sep. 8, 2020.

Xing Mobility, "Immersio XM25—Immersion Cooled Battery System", www.xingmobility.com, Sep. 2023.

"CATL Launches Superfast Charging Battery Shenxing, Opens Up Era of EV Superfast Charging", https://www.catl.com/en/news/6091.html, Aug. 16, 2023.

Waldersee, Victoria, "CATL to produce fast-charging Shenxing battery in Germany, Hungary," Reuters, Sep. 4, 2023, accessed at https://www.reuters.com/technology/catl-produce-fast-charging-shenxing-battery-germany-hungary-2023-09-04/.

* cited by examiner

BATTERY PACK FOR AN ELECTRIC VEHICLE

CROSS-REFERENCE TO RELATED APPLICATIONS

This application is a national phase entry of PCT/CA2022/050694 filed May 3, 2022, which claims the benefit of U.S. Provisional Patent Application No. 62/183,622 filed May 3, 2021, U.S. Provisional Patent Application No. 63/183,623 filed May 3, 2021, and U.S. Provisional Patent Application No. 63/197,818 filed Jun. 7, 2023, the contents of all of which are incorporated by reference as if fully set forth in detail herein.

FIELD

The specification relates generally to battery packs for electric vehicles and more particularly to battery packs having cells that are immersion-cooled.

BACKGROUND OF THE DISCLOSURE

It is known to provide battery packs for electric vehicles. Many battery packs suffer from temperature variations across the cells contained therein, among other problems. An improved battery pack is desirable.

SUMMARY OF THE DISCLOSURE

In one aspect, a module for a battery pack for an electric vehicle, is provided comprising:

a module housing;

a plurality of cells supported in the module housing, wherein each cell from the plurality of cells includes a positive cell terminal and a negative cell terminal;

a bus bar that is electrically conductive, at least one biasing member that is positioned between the module housing and the bus bar so as to urge the bus bar against the positive cell terminals of a first subset of cells from the plurality of cells and the negative cell terminals from a second subset of cells from the plurality of cells; and a positive battery pack terminal, and a negative battery pack terminal, wherein the bus bar and the plurality of cells are electrically connected to the positive battery pack terminal and the negative battery pack terminal in such a way as to form an electric circuit with the plurality of cells for charging and discharging the plurality of cells, wherein, for each cell from the first and second subsets of cells from the plurality of cells, the bus bar has a contact arrangement that includes:

a contact element having a contact surface that is in contact with one of the positive and negative terminals of said each cell, a first flex arm that extends from the contact element to a first arm support, and, a second flex arm that extends from the first arm support to a second arm support, wherein, when the bus bar is in an unflexed condition, the second arm support defines a bus bar plane, wherein the first flex arm and second flex element are positioned such that flexure of the first flex arm relative to the first arm support, and flexure of the second flex arm relative to the second arm support together position the contact surface of the contact element to be parallel to but offset from the bus bar plane.

In an embodiment, the at least one biasing member includes a helical compression spring for each cell from the first and second subsets of cells from the plurality of cells. The contact element optionally includes a receiving surface that is engaged by a first end of the helical compression spring and a guide wall that at least partially surrounds the first end of the helical compression spring.

In an embodiment, the first flex arm extends from the first arm support towards the contact element in a first arm direction, and the second flex arm extends from the second arm support towards the first arm support in a second arm direction that is generally opposite the first arm direction.

In an embodiment the first arm support is an enclosed, hollow shape and the first flex arm is connected to the enclosed, hollow shape at a first connection region, and the second flex arm is connected to the enclosed, hollow shape at a second connection region that is positioned opposite to the first connection region about the enclosed hollow shape.

In an embodiment the enclosed, hollow shape is a circular ring, and wherein the first connection region and the second connection region are diametrically opposite one another.

In an embodiment, for at least one of the contact elements, the first flex arm has a first arm cross-sectional area and the second flex arm has a second arm cross-sectional area that is the same as the first arm cross-sectional area.

In an embodiment, the second arm support for supporting the second flex arm from a first one of the contact arrangements is the first arm support for supporting the first flex arm from a second one of the contact arrangements.

In another aspect, a bus bar that is electrically conductive, for use in a battery pack, is provided, comprising:

a plurality of contact arrangements, each contact arrangement including a contact element having a contact surface that is positioned for contact with a positive terminal or a negative terminal of a cell from the battery pack, a first flex arm that extends from the contact element to a first arm support, and, a second flex arm that extends from the first arm support to a second arm support, wherein, when the bus bar is in an unflexed condition, the second arm support defines a bus bar plane, wherein the first flex arm and second flex element are positioned such that flexure of the first flex arm relative to the first arm support, and flexure of the second flex arm relative to the second arm support together position the contact surface of the contact element to be parallel to but offset from the bus bar plane.

In an embodiment, the first flex arm extends from the first arm support towards the contact element in a first arm direction, and the second flex arm extends from the second arm support towards the first arm support in a second arm direction that is generally opposite the first arm direction.

In an embodiment, the first arm support is an enclosed, hollow shape and the first flex arm is connected to the enclosed, hollow shape at a first connection region, and the second flex arm is connected to the enclosed, hollow shape at a second connection region that is positioned opposite to the first connection region about the enclosed hollow shape.

In an embodiment, the enclosed, hollow shape is a circular ring, and wherein the first connection region and the second connection region are diametrically opposite one another.

In an embodiment, for at least one of the contact elements, the first flex arm has a first arm cross-sectional area and the second flex arm has a second arm cross-sectional area that is the same as the first arm cross-sectional area.

In an embodiment the second arm support for supporting the second flex arm from a first one of the contact arrangements is the first arm support for supporting the first flex arm from a second one of the contact arrangements.

In another aspect, a module for a battery pack for an electric vehicle, comprises:

a plurality of cells, wherein each of the cells has a top end and a bottom end and defines an axis;

a module housing including a lower holder and an upper holder, wherein the lower holder has a plurality of lower holder cell apertures, and the upper holder has a plurality of upper holder cell apertures, wherein the plurality of cells are supported in the lower holder cell apertures and the upper holder cell apertures, wherein each of the upper holder cell apertures is defined by an upper holder cell aperture wall that has a plurality of upper cell contact surfaces for engaging a respective one of the plurality of cells, and has a plurality of upper wall valleys wherein at each of the upper wall valleys, the upper holder cell aperture wall is spaced by an upper gap from said respective one of the plurality of cells, wherein the module has a coolant inlet for receiving coolant from a coolant source, and a coolant outlet for discharging coolant from the module, wherein the coolant inlet is positioned to transfer coolant to an inlet chamber above the upper holder cell apertures and the coolant outlet is positioned below the coolant inlet, such that a coolant flow path through the module extends from the coolant inlet, into the inlet chamber, axially through the upper holder at least partially through the upper gaps between the upper holder cell aperture wall and the respective one of the plurality of cells, axially through the lower holder into the outlet chamber, and out of the module through the coolant outlet, In an embodiment each of the lower holder cell apertures is defined by a lower holder cell aperture wall that has a plurality of lower cell contact surfaces for engaging a respective one of the plurality of cells, and has a plurality of lower wall valleys wherein at each of the lower wall valleys, the lower holder cell aperture wall is spaced by an upper gap from said respective one of the plurality of cells, wherein the coolant flow path through the lower holder is at least partially through the lower gaps between the lower holder cell aperture wall and the respective one of the plurality of cells.

In an embodiment each cell has a cell body that extends axially between the top and bottom ends, and has a positive terminal at one of the top and bottom ends, and a negative terminal that is at the other of the top and bottom ends and which also extends along an outer surface of the cell body.

In another aspect, a subassembly is provided for a battery pack for an electric vehicle, the battery pack including a plurality of cells, wherein each cell from the plurality of cells includes a positive cell terminal and a negative cell terminal, and has a top end and a bottom end, and a lower holder, wherein the lower holder has a plurality of lower holder cell apertures, wherein the plurality of cells are supported in the lower holder cell apertures, and wherein the lower holder is spaced from the top end of each cell, the subassembly comprising:

an upper holder, wherein the upper holder has a first upper holder portion that has a plurality of upper holder cell apertures which are sized to receive the top end of each of the cell, and a second upper holder portion that has at least one biasing member support surface thereon, wherein the first upper holder portion includes a first bus bar support shoulder adjacent a first one of the upper holder cell apertures, and a lower bus bar support shoulder adjacent a second one of the upper holder cell apertures;

a bus bar that is electrically conductive and includes a bus bar body and a plurality of end portions connected to the bus bar body, wherein the end portions are positioned for engagement with one of the positive cell terminals and negative cell terminals from a subset of the cells from the plurality of cells; and at least one biasing member that is positioned to engage the at least one biasing member support surface and the cell-to-cell bus bar to urge the cell-to-cell bus bar against the first upper holder portion, such that the cell-to-cell bus bar extends across each of the upper holder cell apertures, and such that at least one of the end portions of the cell-to-cell bus bar includes at least one extension which engages the at least one first bus bar support shoulder in order that the at least one of the end portions extends across at least one of the upper holder cell apertures, so as to be positioned to be engaged by one of the positive and negative cell terminals of each cell from the subset of cells from the plurality of cells during installation of the subassembly on the subset of cells.

In an embodiment each of the end portions is connected to the bus bar body by a current control region having a selected cross-sectional area to permit the current control region to fail upon carrying a selected current.

In another aspect, a module for a battery pack for an electric vehicle, comprising:

a plurality of cells, wherein each of the cells has a top end and a bottom end, and a positive cell terminal and a negative cell terminal, wherein the plurality of cells include a first subset of cells, each having the positive cell terminal at the top end and the negative cell terminal at the bottom end, a second subset of cells, each having the negative cell terminal at the top end and the positive cell terminal at the bottom end;

a module housing including a lower housing portion that includes a lower holder, and a module cover, wherein the lower holder has a plurality of lower holder cell apertures, wherein the plurality of cells are removably supported in the lower holder cell apertures;

an upper bus bar that is electrically conductive, and is mounted to the module cover; and at least one biasing member that is positioned between the module housing and the upper bus bar so as to urge the bus bar against the positive cell terminals of the first subset of cells and the negative cell terminals from the second subset of cells, wherein the module cover is removably mounted to the lower housing portion to hold the upper bus bar in engagement with the positive cell terminals of the first subset of cells and the negative cell terminals from the second subset of cells so as to electrically connect the first subset of cells with the second subset of cells, and is removable therefrom so as to remove the upper bus bar from engagement with the first subset of cells, so as to expose the plurality of cells while also electrically disconnecting the first subset of cells from the second subset of cells, so as to permit removal of at least one of the plurality of cells from the lower housing portion.

In an embodiment a voltage measurement rod is mounted to one of the module cover and the lower housing portion in electrical connection with one of the upper and lower bus bars, and extends from said one of the module cover and the lower housing portion, wherein the other of the upper and lower bus bars has a rod engagement feature thereon that is positioned to removably engage the voltage measurement rod by mounting of the module cover onto the lower housing portion, wherein the module further includes a signal conduit that is mounted to the lower housing portion for transmitting a voltage measurement between the upper and lower bus bars to a controller. Optionally the voltage measurement rod is mounted to the lower housing portion in electrical connection with the lower bus bars, and extends upward from the lower housing portion, wherein the upper bus bar has the rod engagement feature thereon that is positioned to removably engage the voltage measurement rod by mounting of the module cover onto the lower housing portion.

In an embodiment the module has a coolant inlet for receiving coolant from a coolant source, and a coolant outlet for discharging coolant from the module, wherein the coolant inlet is positioned to transfer coolant into an inlet chamber above the upper holder cell apertures and the coolant outlet is positioned below the coolant inlet, such that a coolant flow path through the module extends from the coolant inlet, into the inlet chamber, downward axially along the plurality of cells, and out through the coolant outlet.

In an embodiment the plurality of cells includes a third subset of cells, each having the positive cell terminal at the top end and the negative cell terminal at the bottom end, and wherein the module further comprises a lower bus bar that is electrically conductive and that is mounted to the module housing underneath the bottom ends of the plurality of cells, for removable engagement with the positive cell terminals of the second subset of cells and the negative cell terminals from the third subset of cells.

In another aspect, a battery pack for an electric vehicle, comprises:

- a battery pack housing including
- a battery pack frame;
- a first battery pack cover and a second battery pack cover, which cooperate with the battery pack frame to define a battery pack wet chamber,
- a plurality of cells held in the battery pack wet chamber,
- wherein the battery pack frame includes a plurality of frame members that are mounted to one another,
- wherein the battery pack includes at least a portion of a coolant circuit for circulating coolant from a coolant source and through the battery pack wet chamber in order to carry out heat transfer with the plurality of cells,
- wherein at least one of the plurality of frame members directly defines a frame member conduit that makes up part of the coolant circuit.

In an embodiment the battery pack frame includes a first primary frame member, and a plurality of secondary frame members that extend from the first primary frame member through the plurality of cells, and wherein the frame member conduit is defined in the primary frame member, wherein the frame member conduit is an inlet header and has an inlet header inlet that is fluidically connected to and downstream from the coolant source, and has a plurality of inlet header outlets, wherein each of the secondary frame members defines a secondary conduit, wherein each of the inlet header outlets discharges coolant to the secondary conduit from one of the secondary frame members. Optionally each of the inlet header outlets has a size, wherein the sizes of the inlet header outlets are selected so as to provide flow rates of coolant through the inlet header outlets that are all within about 50% of one another. Optionally, each of the secondary frame members each defining a secondary conduit that has a secondary conduit inlet and a plurality of secondary conduit outlets, wherein each secondary conduit outlet discharges coolant to an associated subset of cells. Optionally each of the secondary conduit outlets has a size, wherein the sizes of the secondary conduit outlets are selected so as to provide flow rates of coolant through the secondary conduit outlets that are all within about 50% of one another.

Optionally, the battery pack frame includes a plurality of tertiary frame members that extend from the first primary frame member through the plurality of cells, wherein each of the tertiary frame members defines a tertiary conduit having a plurality of tertiary conduit inlets and a tertiary conduit outlet, wherein each tertiary conduit inlet receives coolant to the associated subset of cells. Optionally each of the tertiary conduit inlets has a size, wherein the sizes of the tertiary conduit inlets are selected so as to provide flow rates of coolant through the tertiary conduit inlets that are all within about 50% of one another. Optionally the battery pack frame includes a second primary frame member that defines an outlet header having a plurality of outlet header inlets each of which is fluidically connected to and downstream from one of the plurality of tertiary conduits, and has an outlet header outlet that is upstream from the coolant source.

Optionally each of the outlet header inlets has a size, wherein the sizes of the outlet header inlets are selected so as to provide flow rates of coolant through the outlet header inlets that are all within about 50% of one another.

Optionally the first and second primary frame members are parallel to one another and extend in a longitudinal direction of the battery pack, and the plurality of secondary frame members and the plurality of tertiary frame members extend laterally between the first and second primary frame members and connect to both the first and second primary frame members. Optionally the first subset of cells is housed in a first module housing, and the second subset of cells is housed in a second module housing, wherein each of the first and second module housings has a coolant inlet and a module outlet, wherein the coolant inlet is connected to one of the secondary conduit outlets and the module outlet is connected to one of the tertiary conduit inlets. Optionally the coolant inlet is positioned at a higher elevation than the first module outlet. Optionally the coolant inlet is positioned in a module cover, wherein the module cover includes a plurality of coolant compartments which are in fluid communication with the coolant inlet, and which are positioned above the associated first or second subset of cells, such that each of the coolant compartments is positioned about a selected sub-subset of the associated first or second subset of cells.

In another aspect a module for a battery pack for an electric vehicle, comprises:

- a plurality of cells, wherein each of the cells has a top end and a bottom end and defines an axis, wherein each cell has an axially extending cell body between the top and bottom ends which has a cross-sectional size, and wherein each of the cells has a positive terms at one of the top and bottom ends and has a negative terminal that is at the other of the top and bottom ends and which extends along at least a portion of the axially extending body;

a module housing including a lower holder, wherein the lower holder has a plurality of lower holder cell apertures, wherein each of the lower holder cell apertures has a first aperture end and a second aperture end that is smaller than the first aperture end, and is tapered from the first aperture end to the second aperture end;

wherein the module housing further includes a mid-level holder that is positioned above the lower holder, and includes a plurality of mid-level holder cell apertures, wherein each of the mid-level holder cell apertures has a first aperture end and a second aperture end that is smaller than the first aperture end, and is tapered from the first aperture end to the second aperture end, and wherein the lower holder and the mid-level holder are oriented such that the first aperture end of one of the lower holder cell apertures and the mid-level holder cell apertures faces towards the other of the lower holder cell apertures and the mid-level holder cell apertures, wherein the second aperture ends of the lower holder and the mid-level holder are sized relative to the cross-sectional area of each of the plurality of cells so as to prevent a first one of the plurality of cells held in a first one of the mid-level holder cell apertures and a first one of the lower holder cell apertures, and a second one of the plurality of cells that is adjacent to the first one of the plurality of cells and which is held in a second one of the mid-level holder cell apertures and a second one of the lower holder cell apertures from being brought into contact with one another by being tilted towards one another.

In an embodiment the lower holder and the mid-level holder are oriented such that the first aperture end of the lower holder and the first aperture end of the mid-level holder face towards one another.

In another aspect, a battery pack for an electric vehicle, comprises:

a battery pack housing that defines a battery pack wet chamber, a plurality of cells held in the battery pack wet chamber, wherein the battery pack includes at least a portion of a coolant circuit for circulating coolant from a coolant source and through the battery pack wet chamber in order to carry out heat transfer with the plurality of cells, a plurality of inner signal-carrying electrical conduits in the battery pack wet chamber, a plurality of outer signal-carrying electrical conduits outside of the battery pack wet chamber, a printed circuit board that extends through a PCB aperture in the housing, wherein the printed circuit board which has a first board portion that is inside the battery pack wet chamber and a second board portion that is outside the battery pack wet chamber, wherein the inner signal-carrying electrical conduits connect to the first board portion, and the outer signal-carrying electrical conduits connect to the second board portion, a PCB sealing member that is sealingly connected to the printed circuit board and to the battery pack housing to seal against coolant leakage through the PCB aperture, a controller that is positioned outside the battery pack wet chamber which receives signals from the outer signal-carrying electrical conduits, and which controls operation of the battery pack, based at least in part on the signals.

In an embodiment the battery pack housing includes a panel aperture, and a removable panel that is sealingly mountable to a remainder of the battery pack housing to prevent coolant leakage through the panel aperture, wherein the PCB aperture is in the removable panel. Optionally a bus bar extends through a bus bar aperture in the removable panel, and a bus bar sealing member is sealingly connected to the bus bar and to the removable panel to seal against coolant leakage through the bus bar aperture.

In another aspect, a battery pack for an electric vehicle, comprises:

a battery pack housing, a plurality of cells held inside the battery pack housing, wherein the plurality of cells are arranged into a first group of cells, and a second group of cells, wherein the first and second groups of cells are connected in series, with one another, and a safety switch that is positioned to control current between the first group of cells and the second group of cells, wherein the safety switch is positioned outside of the battery pack housing, and wherein the safety switch is movable between a circuit-closed position in which the safety switch electrically connects the first group of cells with the second group of cells in series, and a circuit-open position in which the safety switch electrically disconnects the first group of cells from the second group of cells.

In an embodiment the safety switch has a first locking feature that aligns with a second locking feature on the battery pack housing, so as to permit a lock to be places on the safety switch to prevent movement of the safety switch out of the circuit-open position.

In an embodiment the safety switch is a first safety switch, and the battery pack further includes a third group of cells and a fourth group of cells that are connected in series with series with one another and with the first and second groups of cells such that the first, second, third and fourth groups of cells are connected in series, with one another; a second safety switch positioned to control current between the third group of cells and the fourth group of cells, wherein the second safety switch is positioned outside of the battery pack housing, and wherein the second safety switch is movable between a circuit-closed position in which the second safety switch electrically connects the third group of cells with the fourth group of cells in series, and a circuit-open position in which the safety switch electrically disconnects the third group of cells from the fourth group of cells.

In another aspect, a battery pack for an electric vehicle, comprises:

a battery pack housing;

a plurality of modules positioned inside the battery pack housing, wherein each module includes a plurality of cells, wherein each of the cells has a top end and a bottom end, and a positive cell terminal and a negative cell terminal, wherein the plurality of cells include a first subset of cells, each having the positive cell terminal at the top end and the negative cell terminal at the bottom end, a second subset of cells, each having the negative cell terminal at the top end and the positive cell terminal at the bottom end;

a module housing including a lower housing portion that includes a lower holder, and a module cover, wherein the lower holder has a plurality of lower holder cell apertures, wherein the plurality of cells are removably supported in the lower holder cell apertures;

a first upper bus bar that is electrically conductive, and is mounted to the module cover;

at least one biasing member that is positioned between the module housing and the upper bus bar so as to urge the bus bar against the positive cell terminals of the first subset of cells and the negative cell terminals from the second subset of cells, wherein the module cover is removably mounted to the lower housing portion to hold the upper bus bar in engagement with the positive cell terminals of the first subset of cells and the negative cell terminals from the second subset of cells so as to electrically connect the first subset of cells with the second subset of cells, and is removable therefrom so as to remove the upper bus bar from engagement with the first subset of cells, so as to expose the plurality of cells while also electrically disconnecting the first subset of cells from the second subset of cells, so as to permit removal of at least one of the plurality of cells from the lower housing portion, wherein the plurality of modules includes a first subset of modules, wherein, for each module from the first subset of modules except for a final module from the first subset of modules, each module includes a bridging bus bar that connects the positive terminals of a final subset of cells from said each module to the negative terminals of the first subset of cells from a subsequent one of the modules from the first subset of modules, wherein mounting the module covers to the lower housing portions of all of the modules from the first subset of modules electrically connects all of the modules from the first subset of modules together to provide an electrical flow path through the first subset of modules, and wherein removal of any one of the module covers from the lower housing portions of any of the modules from the first subset of modules breaks the electrical flow path through the first subset of modules.

In another aspect, a module for a battery pack for an electric vehicle, comprises:

a module housing;

a plurality of cells supported in the module housing, wherein each cell from the plurality of cells includes a positive cell terminal and a negative cell terminal;

a bus bar that is electrically conductive, at least one biasing member having a first end and a second end, wherein the first end is engaged with the bus bar and the second end is engaged with a seat in the module housing so as to urge the bus bar against the positive cell terminals of a first subset of cells from the plurality of cells and against the negative cell terminals from a second subset of cells from the plurality of cells, wherein the at least one biasing member is made from a metal that is electrically conductive, and wherein the seat in the module housing is made from a non-conductive material, and wherein the bus bar and the plurality of cells are electrically connected to a positive battery pack terminal and a negative battery pack terminal of the battery pack in such a way as to form an electric circuit with the bus bar and the plurality of cells for charging and discharging the plurality of cells, wherein the seat in the module housing prevents current from the electric circuit from passing through the at least one biasing member.

In an embodiment the at least one biasing member includes a helical compression spring for each cell from the first and second subsets of the plurality of cells.

In an embodiment the at least one biasing member includes a layer of resilient material that extends across the bus bar over an area that overlaps at least partially each cell from the subset of the cells from the plurality of cells.

In another aspect, a module for a battery pack for an electric vehicle, comprises:

a plurality of cells, wherein each of the cells has a top end and a bottom end and defines an axis;

a module housing including a lower holder and an upper holder, wherein the lower holder has a plurality of lower holder cell apertures, and the upper holder has a plurality of upper holder cell apertures, wherein the plurality of cells are supported in the lower holder cell apertures and the upper holder cell apertures, and wherein the upper holder is spaced from the lower holder by an intermediate space, such that a portion of a length of the plurality of cells is exposed between the upper and lower holders, wherein the module has a coolant inlet for receiving coolant from a coolant source, and a coolant outlet for discharging coolant from the module, wherein the coolant inlet is positioned to transfer coolant to an inlet chamber above the upper holder, and the coolant outlet is positioned below the coolant inlet, such that a coolant flow path through the module extends from the coolant inlet, into the inlet chamber, axially through the upper holder into the intermediate space, axially through the lower holder, and out of the module through the coolant outlet.

In an embodiment each of the upper holder cell apertures is defined by an upper holder cell aperture wall that has a plurality of upper cell contact surfaces for engaging a respective one of the plurality of cells, and has a plurality of upper wall valleys wherein at each of the upper wall valleys, the upper holder cell aperture wall is spaced by an upper gap from said respective one of the plurality of cells, wherein the coolant flow path through the upper holder is at least partially through the upper gaps between the upper holder cell aperture wall and the respective one of the plurality of cells.

In an embodiment each of the lower holder cell apertures is defined by a lower holder cell aperture wall that has a plurality of lower cell contact surfaces for engaging a respective one of the plurality of cells, and has a plurality of lower wall valleys wherein at each of the lower wall valleys, the lower holder cell aperture wall is spaced by an upper gap from said respective one of the plurality of cells, wherein the coolant flow path through the lower holder is at least partially through the lower gaps between the lower holder cell aperture wall and the respective one of the plurality of cells.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

DETAILED DESCRIPTION

Figure 1:
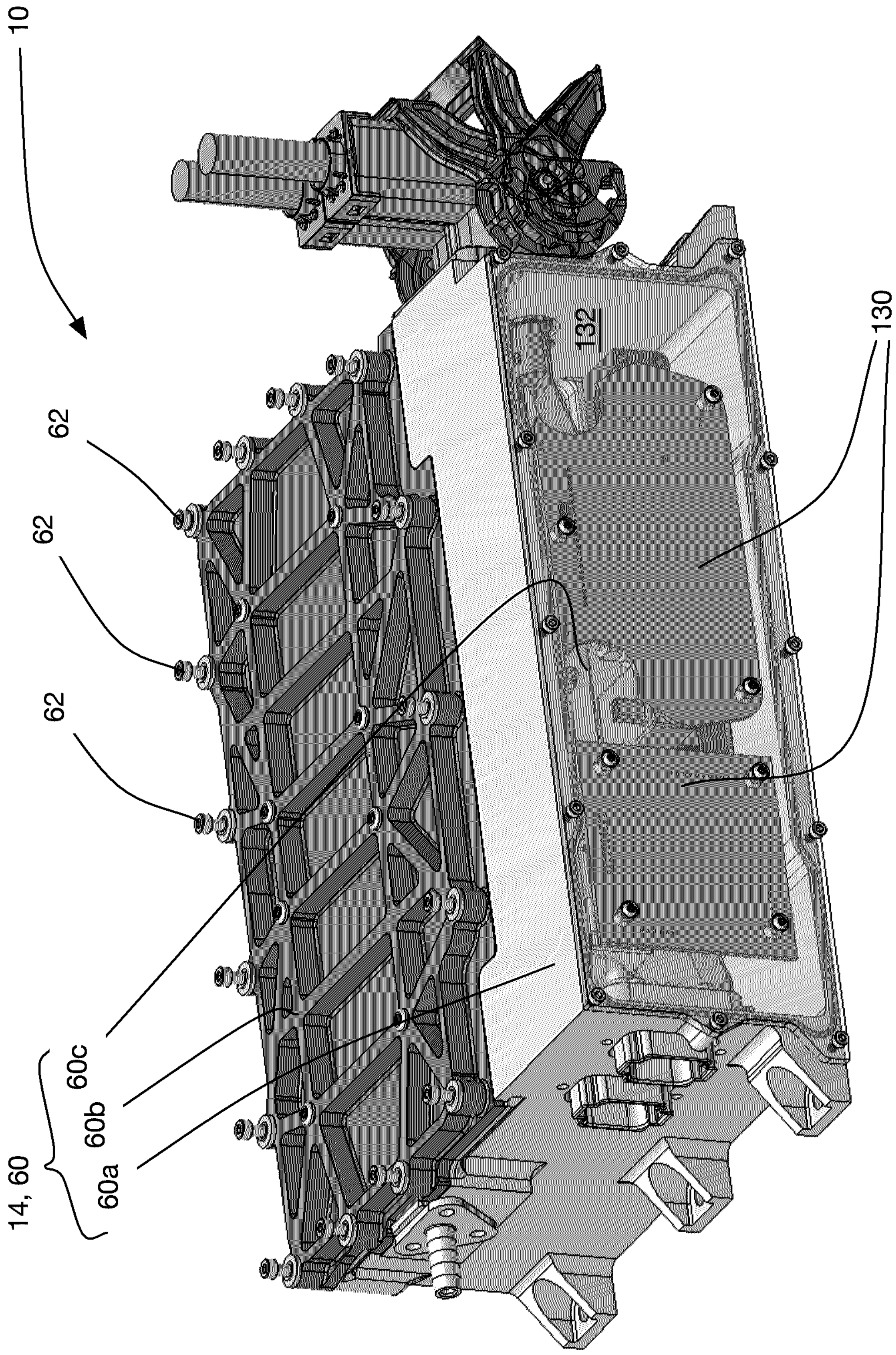
FIG. 1 is a perspective view of a battery pack for an electric vehicle in accordance with a first embodiment of the present disclosure.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The indefinite article "a" is not intended to be limited to mean "one" of an element. It is intended to mean "one or more" of an element, where applicable, (i.e. unless in the context it would be obvious that only one of the element would be suitable).

Any reference to upper, lower, top, bottom or the like are intended to refer to an orientation of a particular element during use of the claimed subject matter and not necessarily to its orientation during shipping or manufacture. The upper surface of an element, for example, can still be considered its upper surface even when the element is lying on its side.

Figure 46:
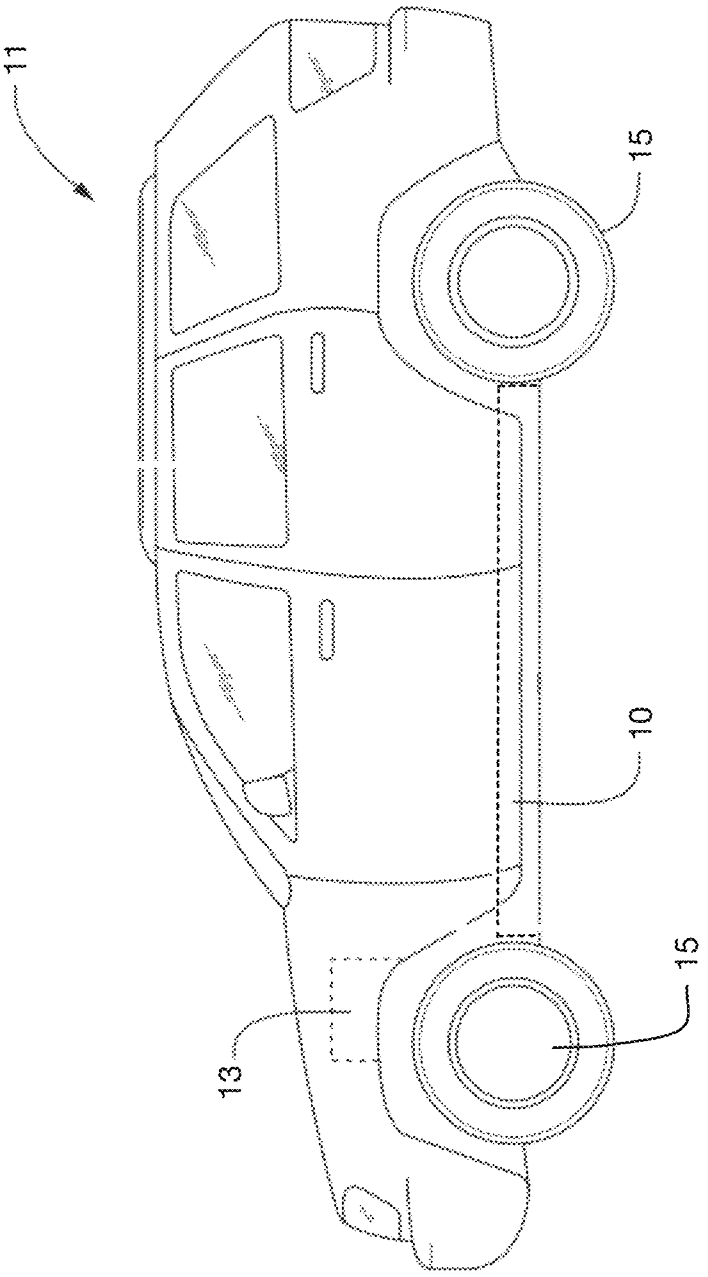
FIG. 46 shows a battery pack in an electric vehicle.

Reference is made to FIG. 46, which shows a battery pack 10 for an electric vehicle 11. The term 'electric vehicle' is intended to include any vehicle that includes an electric motor 13 that drives one or more wheels 15 of the vehicle 11. The vehicle 11 may also include an internal combustion engine that operates to drive one or more wheels 15 of the vehicle 11 (which may be the same as, partially the same as, or entirely different than the one or more wheels 15 driven by the electric motor 13). Additionally or alternatively, the internal combustion engine (if provided) may be operated to charge the battery pack 10 or for any other suitable purpose. The vehicle 11 may include any other suitable type of energy storage device, in addition to the battery pack 10. In embodiments where the electric motor 13 is not the only power generation device driving one or more wheels 15 of the vehicle 11, the vehicle 11 may include any other suitable type of power generation device instead of, or in addition to an internal combustion engine.

Description Relating Primarily to FIGS. 1-11

The battery pack 10 includes a plurality of cells 12 supported in a battery pack housing 14. The plurality of cells 12 each include a positive cell terminal 16 and a negative cell terminal 18. The battery pack 10 further includes a positive battery pack terminal 20 and a negative battery pack terminal 22, such that the plurality of cells are electrically connected to the positive and negative battery pack terminals 20 and 22, either in series, in parallel, or in a combination of both series and parallel.

Use of Bus Bars with Biasing Members

Figure 2A:
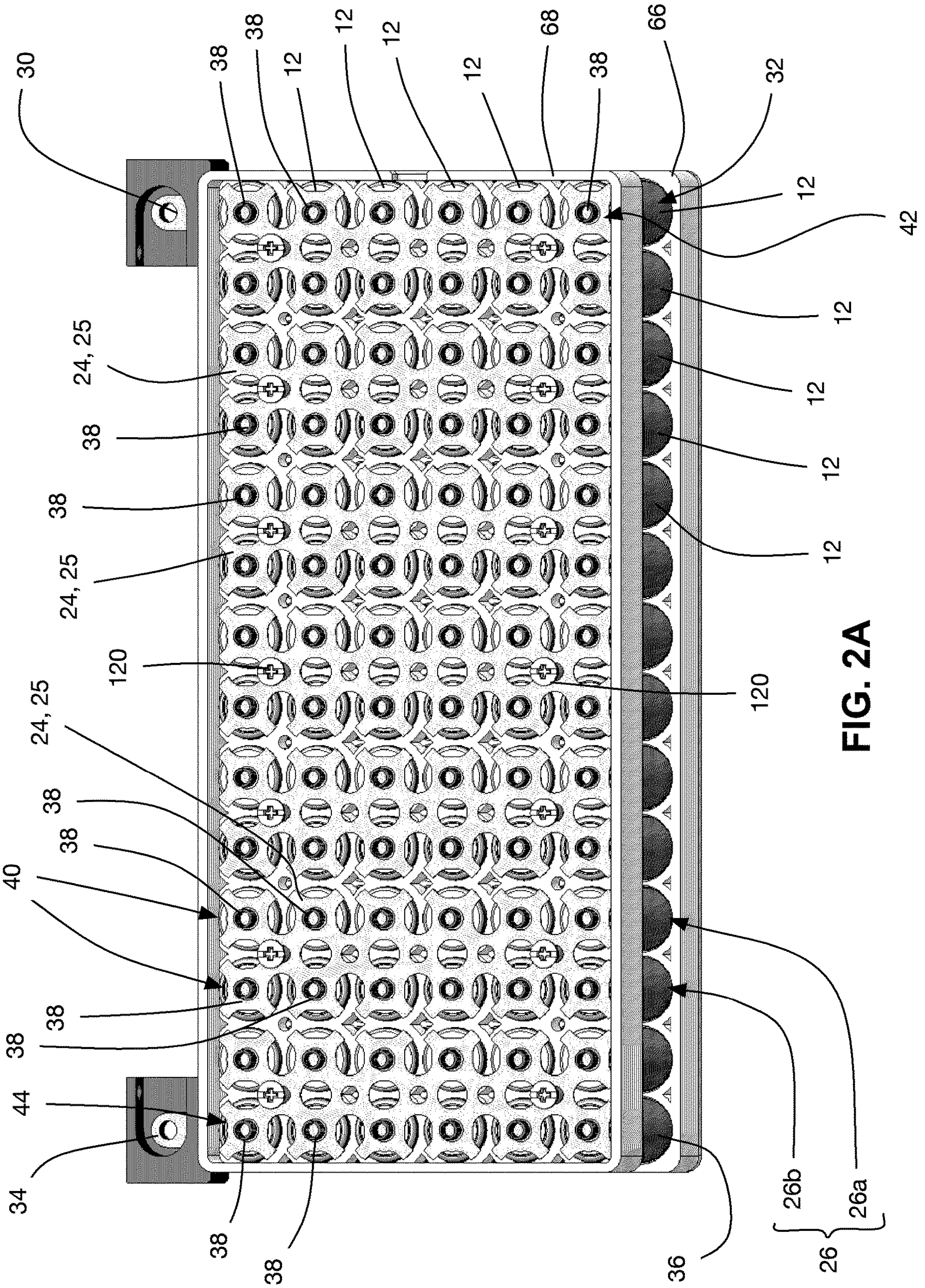
FIG. 2A is a perspective view of a portion of the battery pack shown in figure one, with the housing of the battery pack removed.
Figure 2B:
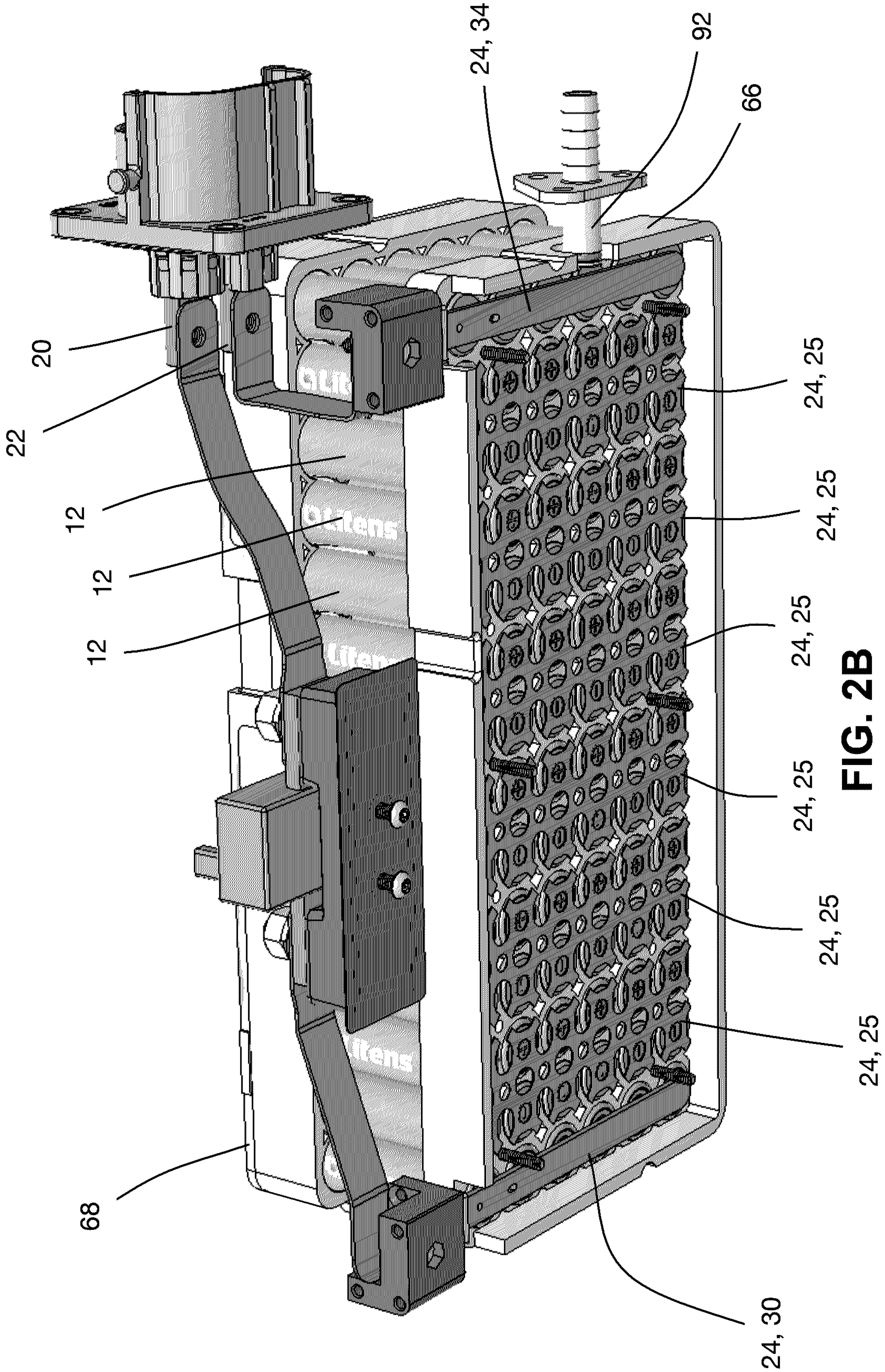
FIG. 2B is another perspective view of a portion of the battery pack shown in figure one, with the housing removed.
Figure 3:
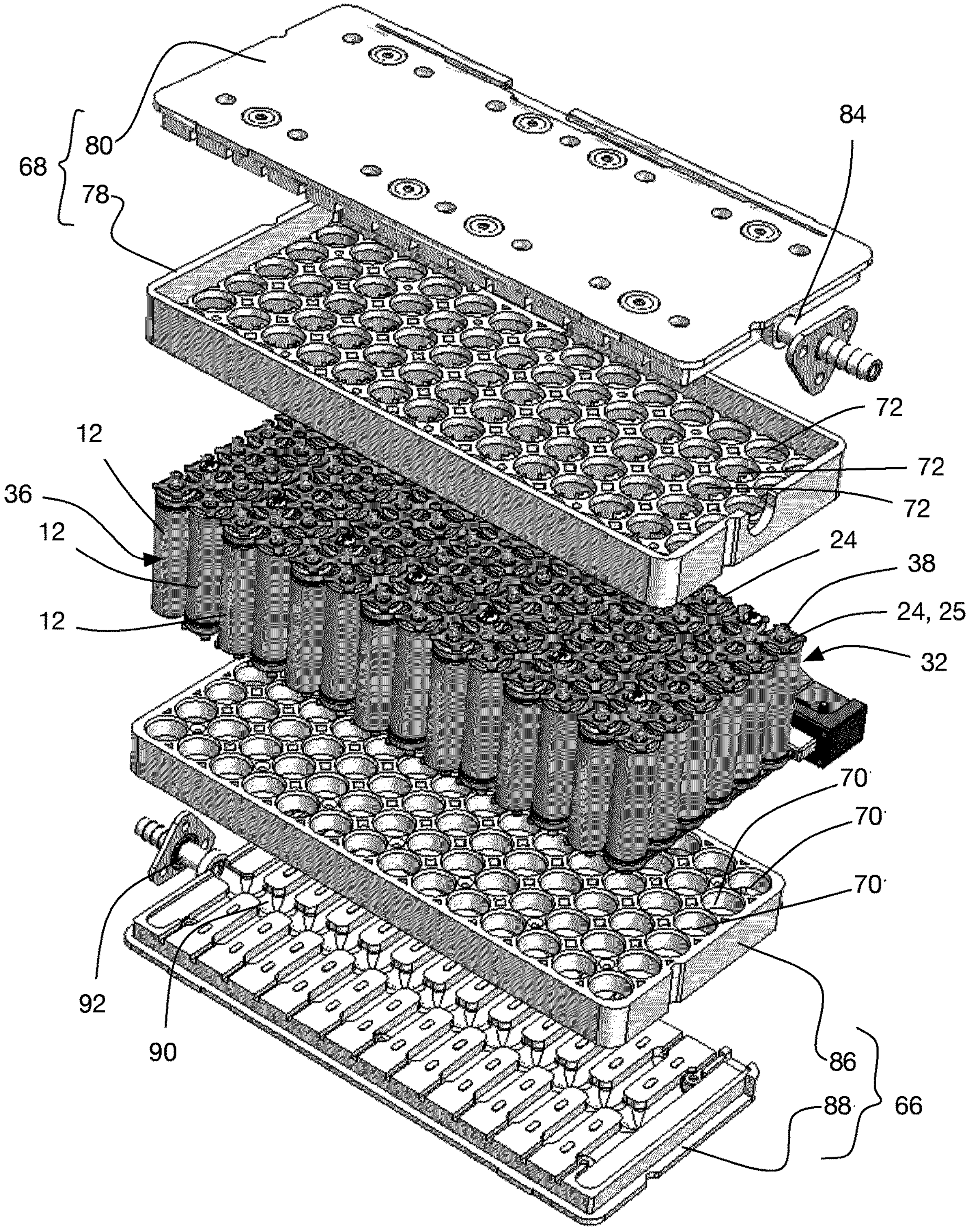
FIG. 3 is an exploded perspective view of the portion of the battery pack shown in FIG. 2*a*.
Figure 4:
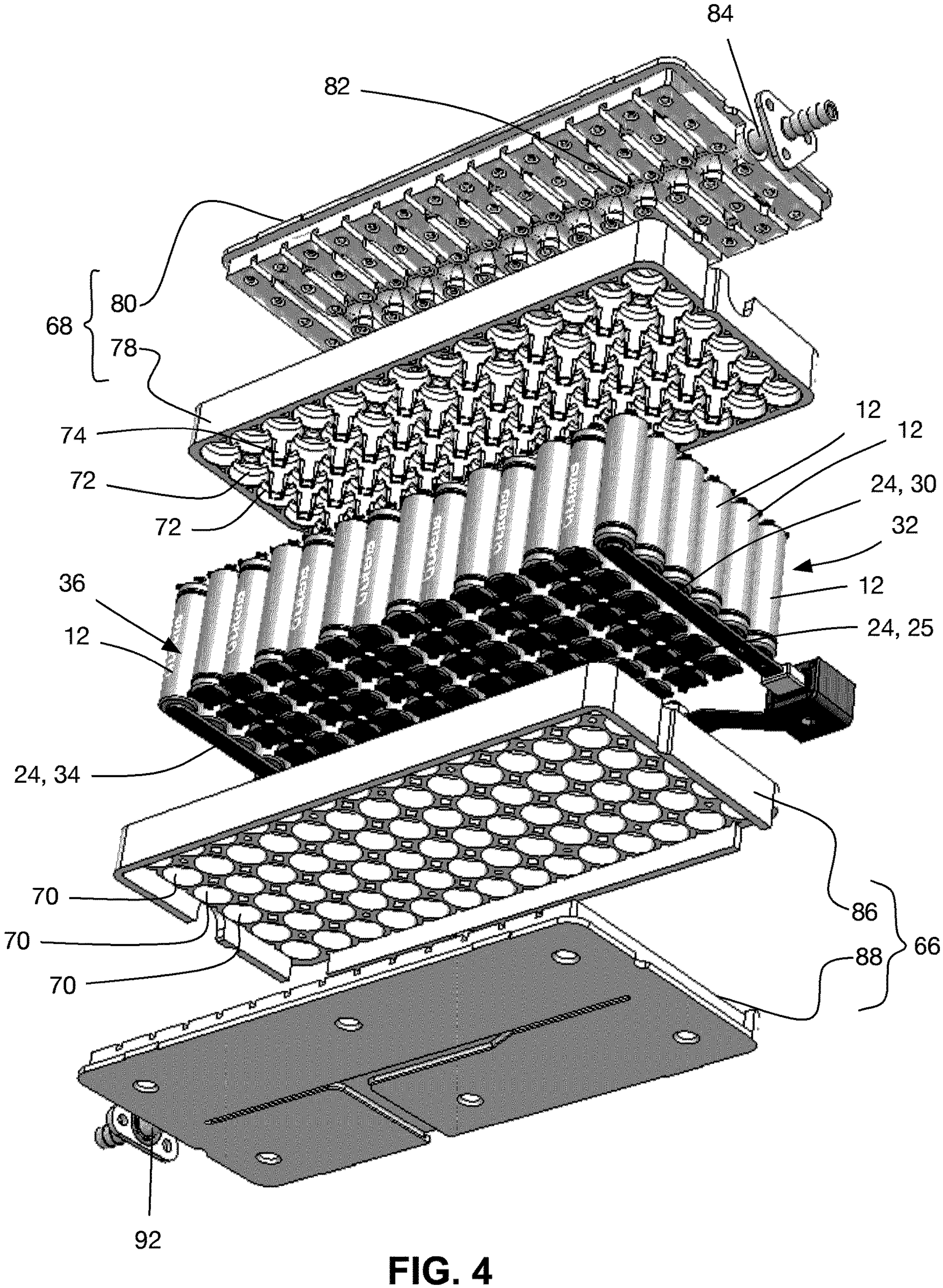
FIG. 4 is another exploded perspective view of the portion of the battery pack shown in FIG. 2*a*.

A plurality of bus bars 24 are provided, as shown in FIGS. 2A and 2B. In the embodiment shown, for each bus bar 24, at least one biasing member 38 is provided and is positioned between the housing 14 and the bus bar 24 so as to urge the bus bar 24 against one of the positive terminals and negative terminals 16 and 18 from each cell 12 from a subset of cells 12 so as to connect the subset of cells 12 electrically. In the embodiment shown in FIGS. 2A-6, there are a plurality of biasing members 38.

The plurality of bus bars 24 includes a plurality of cell-to-cell bus bars 25, where each cell-to-cell bus bar 25 is urged by a first subset of the plurality of biasing members 38, into engagement with the positive terminal 16 of each cell 12 from a first half 26*a* of a first subset 26 of cells 12, and the negative terminal 18 of each cell 12 from a second half 26*b* of the first subset 26 of cells 12, so as to electrically connect the positive cell terminals 16 from the first half 26*a* of the first subset 26 of cells 12 to the negative cell terminals 18 of the second half 26*b* of the first subset 26 of cells 12. The plurality of bus bars 24 also includes a first end bus bar 30 that is urged by a second subset 42 of the plurality of biasing members 38, into engagement with the positive cell terminals 16 from a second subset 32 of cells 12, to the positive battery pack terminal 20 so as to electrically connect the positive cell terminals 16 from the second subset 32 of cells 12 with the positive battery pack terminal 20. The plurality of bus bars 24 also includes a second end bus bar 34 that is urged by a third subset 44 of the plurality of biasing members 38, into engagement with the negative cell terminals 18 from a third subset 36 of cells 12 from the plurality of cells 12, to the negative battery pack terminal 22 so as to electrically connect the negative cell terminals 18 from the third subset 36 of cells 12 with the positive battery pack terminal 20.

While a plurality of bus bars 24 are shown, it will be noted that there could be as few as one bus bar 24, and other ways of connecting the cells 12 electrically to one another or to other components could be used instead of bus bars.

Figure 6:
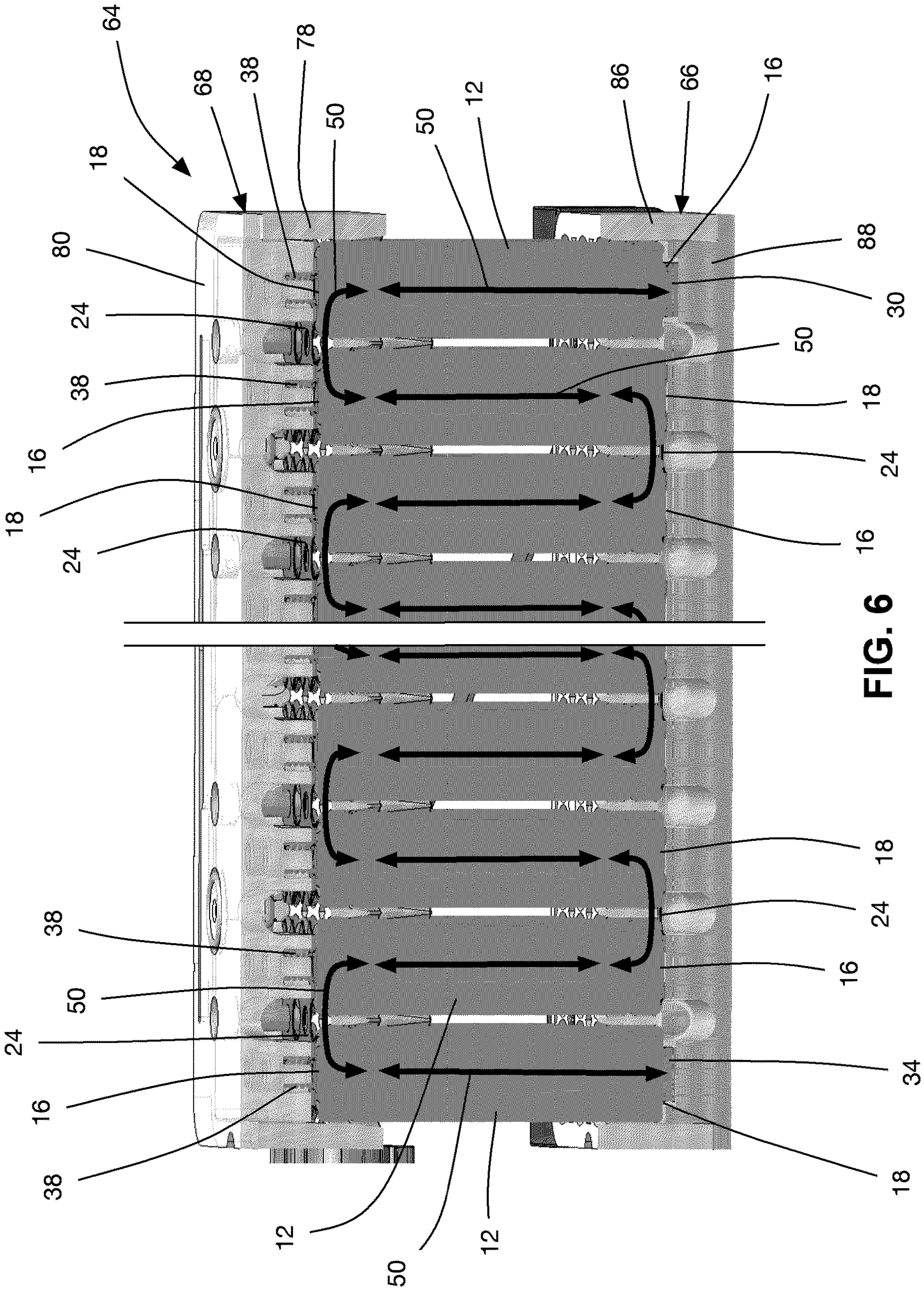
FIG. 6 is another sectional perspective view of a portion of the battery pack, illustrating an electric current that passes through the cells during discharging or charging thereof.

For each bus bar 24 that is provided, it may be said that the bus bar 24 and the plurality of cells 12 are electrically connected to the positive battery pack terminal 20 and the negative battery pack terminal 22 in such a way as to form an electric circuit with the plurality of cells 12 for charging and discharging the plurality of cells 12. In the embodiment shown, the circuit is represented by double-headed arrows (a few of which are identified at 50) in FIG. 6, and extends through the second end bus bar 34, into and through the cells 12 and the bus bars 24, and out through the first end bus bar 30, during discharging of the cells 12, and extends through the first end bus bar 30, into and through the cells 12 and the bus bars 24, and out through the second end bus bar 34, during charging of the cells 12. It will be noted that FIG. 6 shows the battery pack 10, but with a middle portion removed to enable the two ends of the battery pack 10 to be shown in the figure.

The bus bars 24 may be made from any suitable material, such as copper.

The at least one biasing member 38 is, in the embodiment shown, a plurality of helical compression springs. As can be seen, the aforementioned circuit is formed with the bus bar 24 (or in this case, bus bars 24) without passing through the at least one biasing member 38. Since the at least one biasing member 38 is not involved in carrying current the material for the at least one biasing member 38 may be selected without concern for whether that material is a good conductor or not. This is beneficial, as traditional conductive materials such as copper, can be poor choices for use as springs, due to brittleness and other factors. The material of construction for the at least one biasing member 38 may be a suitable material such as spring steel.

Figure 7:
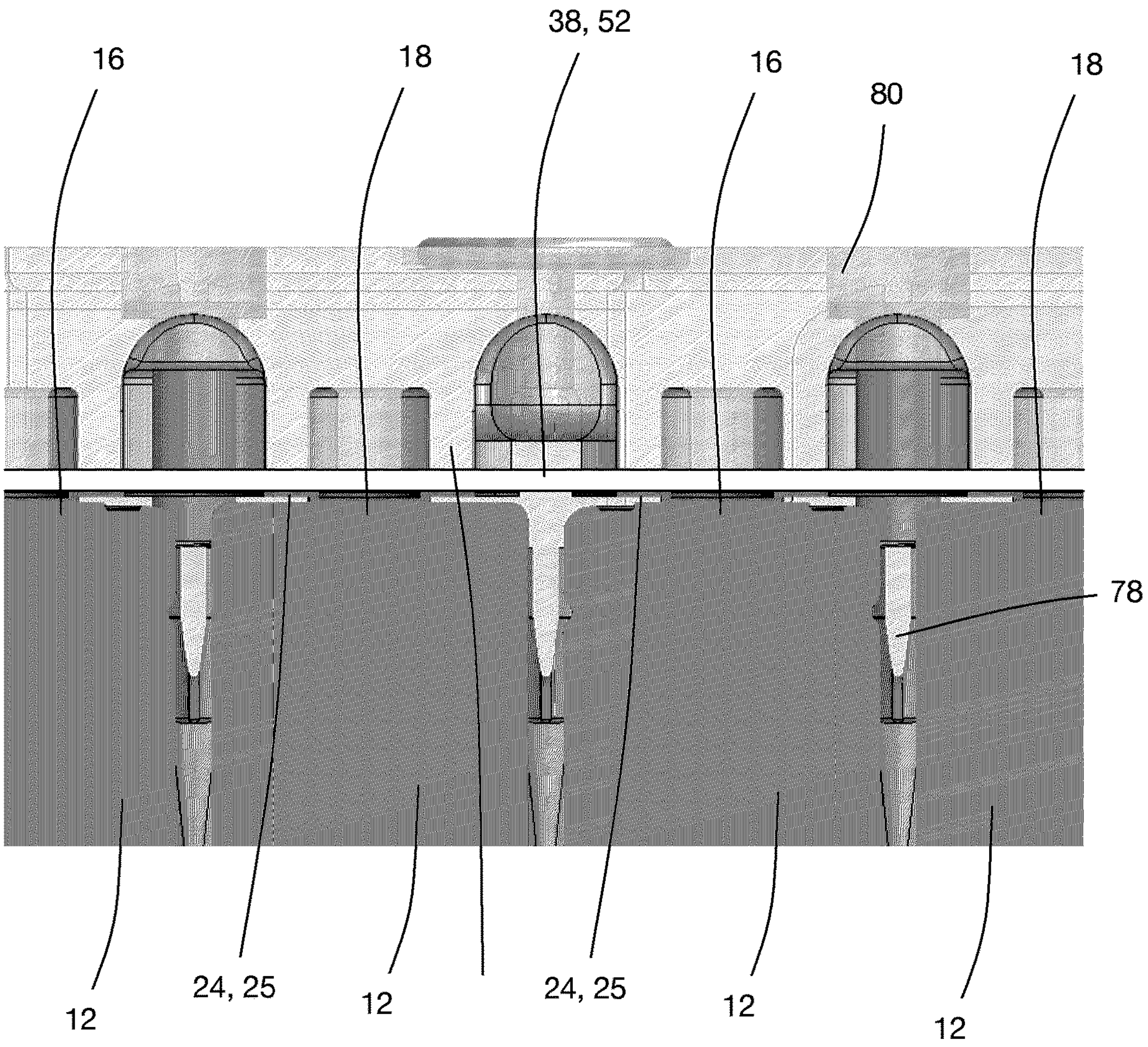
FIG. 7 is a magnifying sectional view of a portion of the battery pack to show the engagement between the bus bar and the cells.

In an embodiment shown in FIG. 7, the at least one biasing member 38 includes a layer of resilient material shown at 52 that extends across the bus bar 24 over an area that overlaps at least partially each cell from the subset of the cells from the plurality of cells. The layer of resilient material 52 may, for example, include a layer of closed-cell foam. Thus, in the embodiment shown in FIG. 7, there is a single biasing member 52 that urges the bus bar 24 into engagement with the associated subset of cells 12.

The cells 12 themselves may be any suitable type of cells, such as 4V cells that are generally cylindrical in shape. The cells 12, in the embodiment shown, are arranged into 14 rows of six cells 12 each, where the cells 12 in each row alternate in their orientation, with one row having its cells 12 arranged with their positive cell terminals 16 pointing upward (i.e. at their top end, shown at 56) and with the next row with the positive cell terminals 16 pointing downward (i.e. at their bottom ends, shown at 58).

Tapered Projections and Axial Coolant Flow

The housing 14 will now be described in more detail. The housing 14 may include an outer shell 60 that includes a first outer shell portion 60*a* and a second outer shell portion 60*b*. The outer shell 60 performs several functions, including sealingly enclosing a space for coolant flow, and protecting the cells 12 from mechanical impact. As shown in FIG. 1, the second outer shell portion 60*b* is removably mounted to the first outer shell portion 60*a* (e.g. via mechanical fasteners 62). This permits insertion and removal of a cell sub assembly 64 containing the cells 12 (FIG. 6). The housing 14 further includes an upper holder 66 and a lower holder 68.

The lower holder 66 (FIG. 3) has a plurality of lower holder cell apertures 70. The plurality of cells 12 are supported in the lower holder cell apertures 70. The lower holder 66 is spaced from the top end 56 of each cell 12.

The upper holder 68 has a plurality of upper holder cell apertures 72. The plurality of cells 12 are supported in the upper holder cell apertures 72. The upper holder 68 is closer to the top end 56 of each cell 12 than is the lower holder 66.

Figure 10:
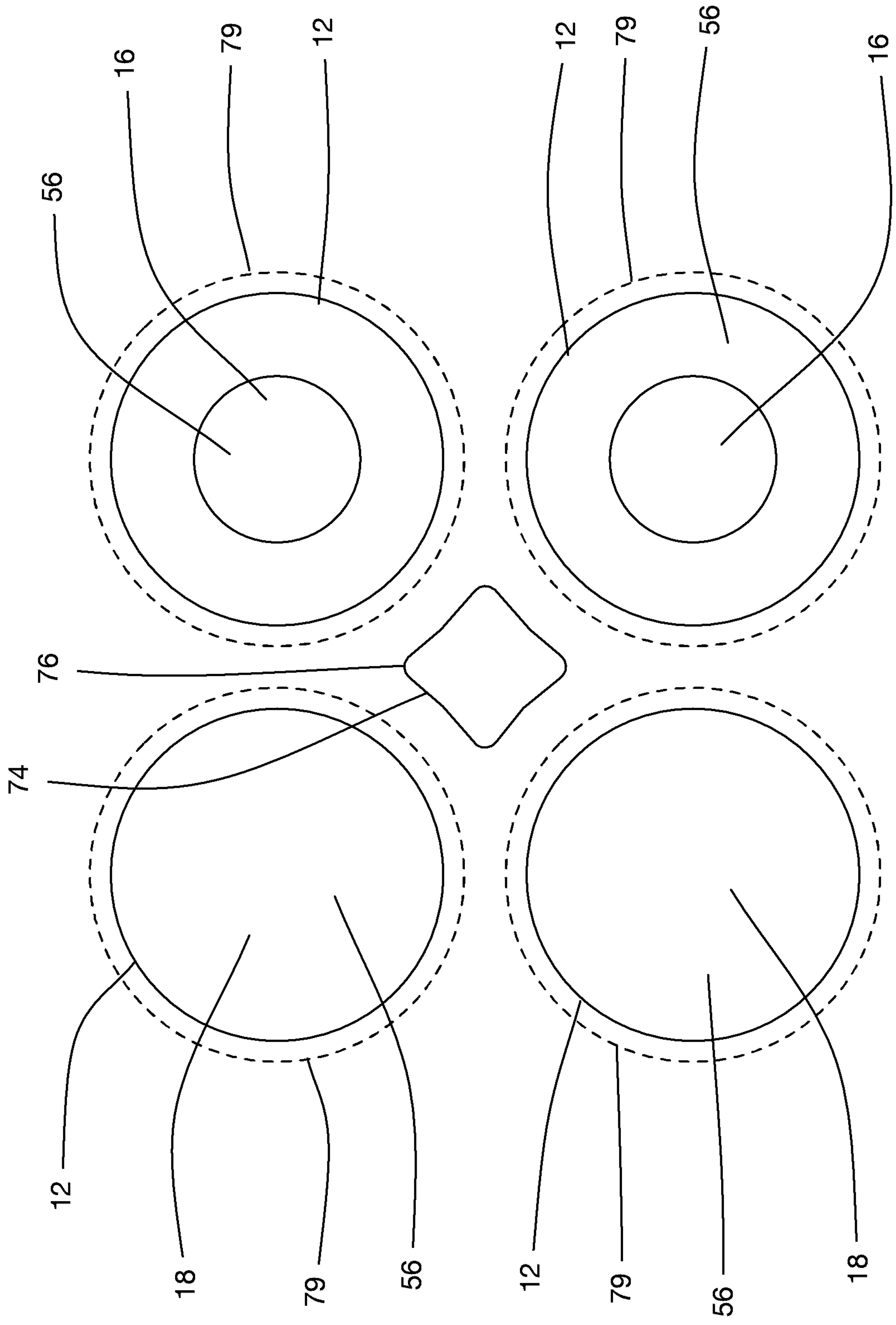
FIG. 10 is a plan view of several cells from the battery pack illustrating tolerances in their positions.

The upper holder 68 includes a plurality of tapered projections 74 that extend downward between groups of cells (FIG. 8) from the plurality of cells 12. Each tapered projection 74 has a distal end 76 and a proximal end 77. As can be seen best in FIG. 5A, the proximal end 77 is contiguous with a group of the upper holder cell apertures 72. In other words, there is no shoulder between the proximal end 77 and the upper holder cell apertures 72 it is nearest to. By having no shoulders therebetween, the upper holder 68 can be placed on a subassembly of the lower holder 66 with all the cells 12 positioned thereon, and is ensured that there is no hang-up point between when the tapered projections 74 enter in between the cells 12 and when the upper holder 68 is positioned in its final position with the cells 12 held in the upper holder cell apertures 72 (FIG. 6). Also, it will be understood that there are a plurality of cell dimensional tolerances and a plurality of lower holder dimensional tolerances that exist in relation to the manufacture of the cells 12 and in the manufacture of the lower holder 66. As a result, there is a range of possible positions for each cell 12 when the cells 12 are supported by the lower holder 66 and not by the upper holder 68 (i.e. prior to mounting of the upper holder 68 on the cells 12). Examples of where some cells 12 are shown not being centered in their respective lower holder cell apertures 70 are provided (greatly exaggerated, for clarity) in FIG. 9. Thus, there is an area 79 (shown greatly exaggerated in FIG. 10) that the top end 56 might occupy. This area 79 is referred to as an area of potential interference 79. By sizing the distal ends 76 of the tapered projections 74 to ensure that they are outside of the areas of potential interference 79, the upper holder 68 is ensured to be able to be placed onto the cells 12 without obstruction. A representation of the outline of the distal end 76 of one of the tapered projections 74 is shown in FIG. 10.

In the embodiment shown, the upper holder 68 includes a first upper holder portion 78 and a second upper holder portion 80. The first and second upper holder portions 78 and 80 together define an upper manifold 82 (FIGS. 5A and 8) therebetween. The upper manifold 82 has an upper manifold fluid port 84. The lower holder 66 includes a first lower holder portion 86 and a second lower holder portion 88. The first and second lower holder portions 86 and 88 together define a lower manifold 90 therebetween. The lower manifold 90 has a lower manifold fluid port 92. A cooling chamber 94 is defined in the housing 14 between the upper holder 68 and the lower holder 66.

Figure 8:
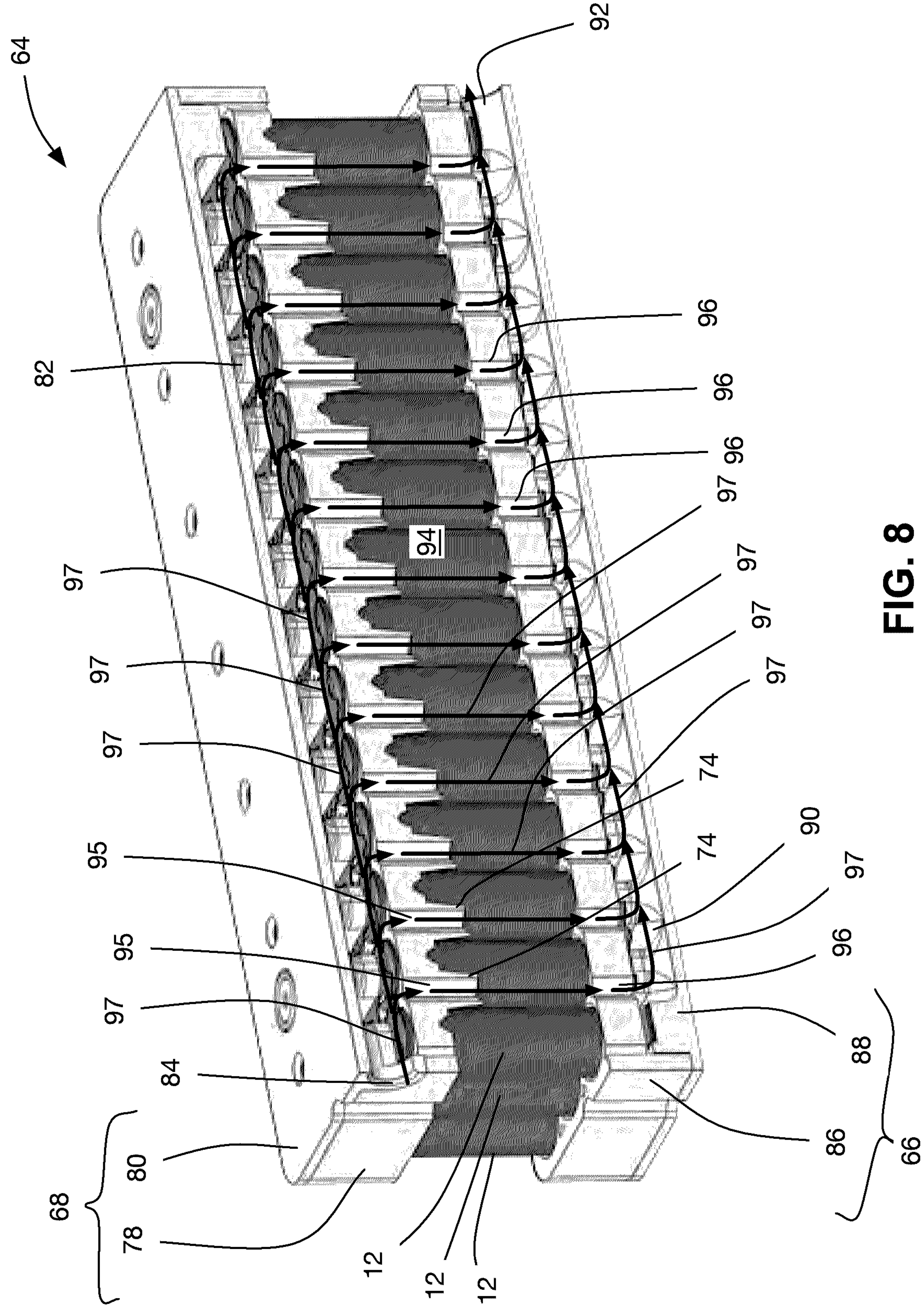
FIG. 8 is a sectional perspective view of a portion of the battery pack illustrating a flow of coolant therethrough during use.
Figure 9:
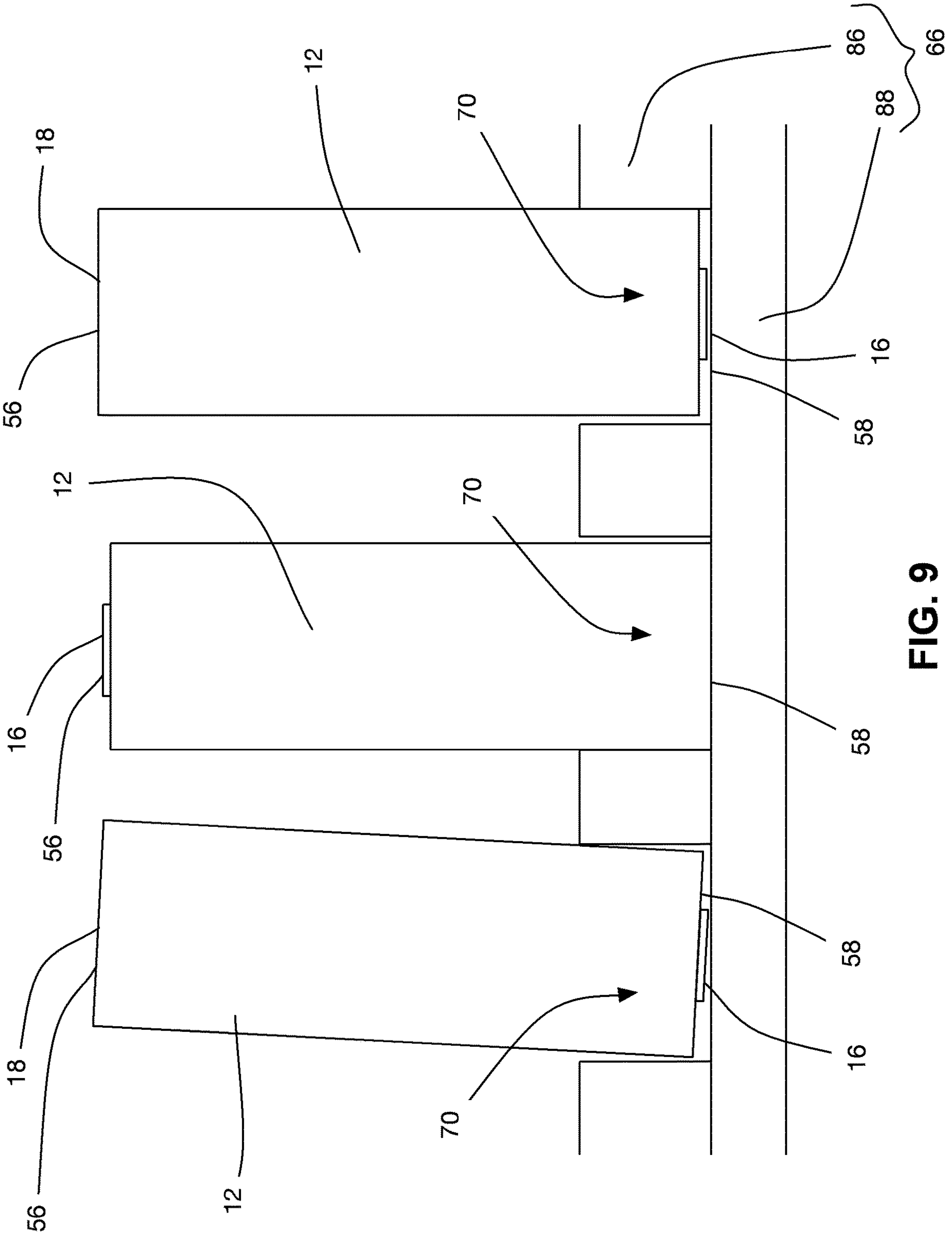
FIG. 9 is a side view of several cells from the battery pack showing prevention of contact between adjacent ones of the cells.

The tapered projections 74 each contain a projection pass-through aperture 95 shown best in FIG. 8, so as to permit fluid communication between the cooling chamber 94 and the upper manifold 82. A plurality of lower manifold transmission apertures 96 are provided to permit fluid communication between the lower manifold 90 and the cooling chamber 94.

As can be seen in FIG. 8, coolant (represented by arrows 97) enters the upper manifold 82 through the upper manifold fluid port 84, and is distributed throughout the upper manifold 82, and flows down through the projection pass-through apertures 95 into the cooling chamber 94, in order to cool the cells 12. It will be noted that the coolant 97 flows axially along the lengths of the cells 12, as opposed to coolant flow in some other battery packs of the prior art, that flows transversely along the length of the battery pack, and therefore has a temperature gradient associated with it along the length of the battery pack. The coolant 97 exits the cooling chamber 94 through the lower manifold transmission apertures 96 into the lower manifold 90 and finally exits the housing 14 through the lower manifold fluid port 92. Thus, in the embodiment shown, the upper manifold fluid port 84 is an inlet port for the battery pack 10, and the lower manifold fluid port 92 is an outlet port for the battery pack 10. The sizes of the projection pass-through apertures 95 and the lower manifold transmission apertures 96 may be selected so as to encourage generally uniform coolant flow throughout the battery pack 10.

Suitable materials of construction for the upper and lower holders 68 and 66 may be any suitable type of material such as a suitable polymeric material that is electrically insulative.

Figure 11:
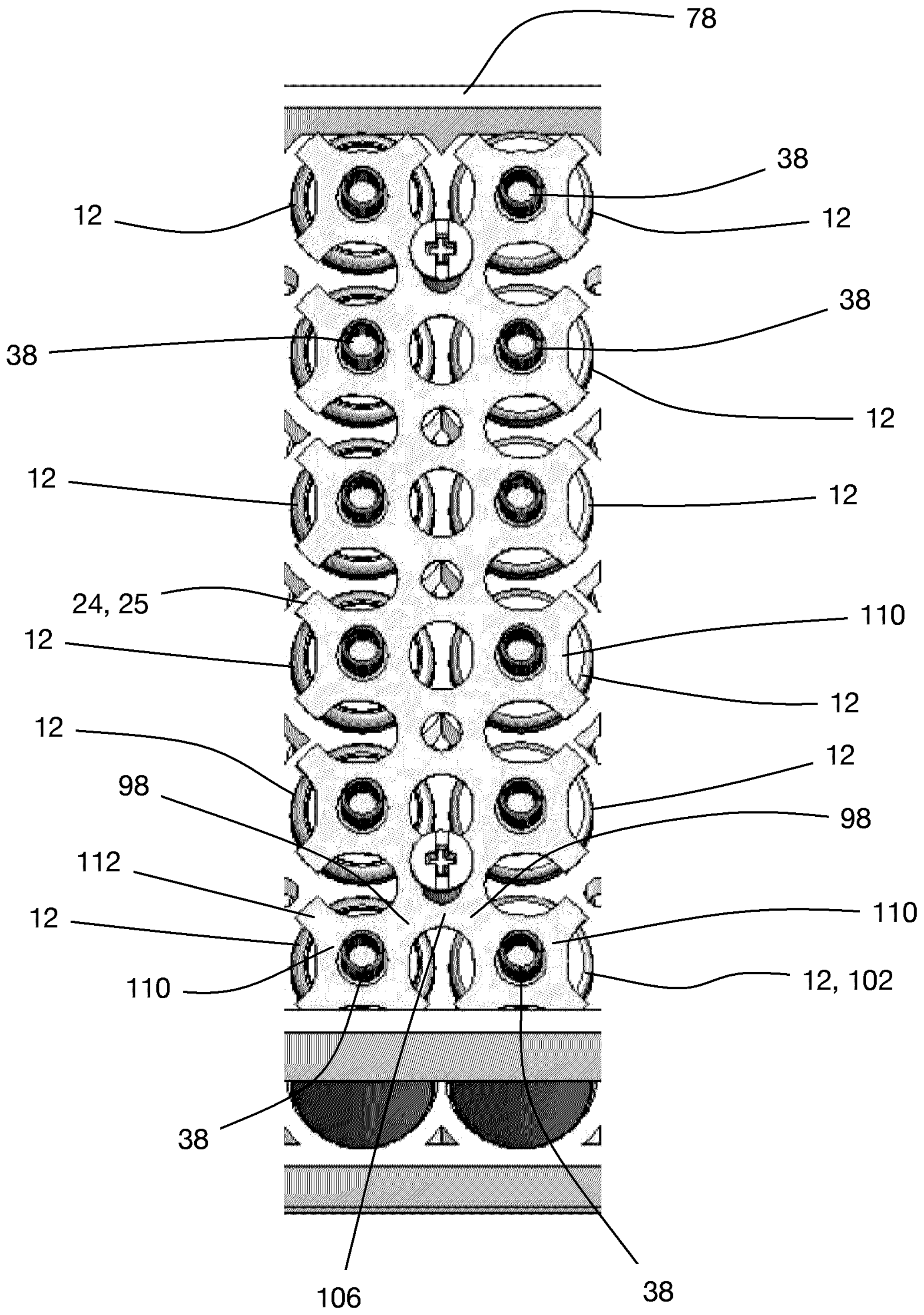
FIG. 11 is a perspective view of one of the bus bars from the battery pack and the cells with which it makes contact.
Figure 12A:
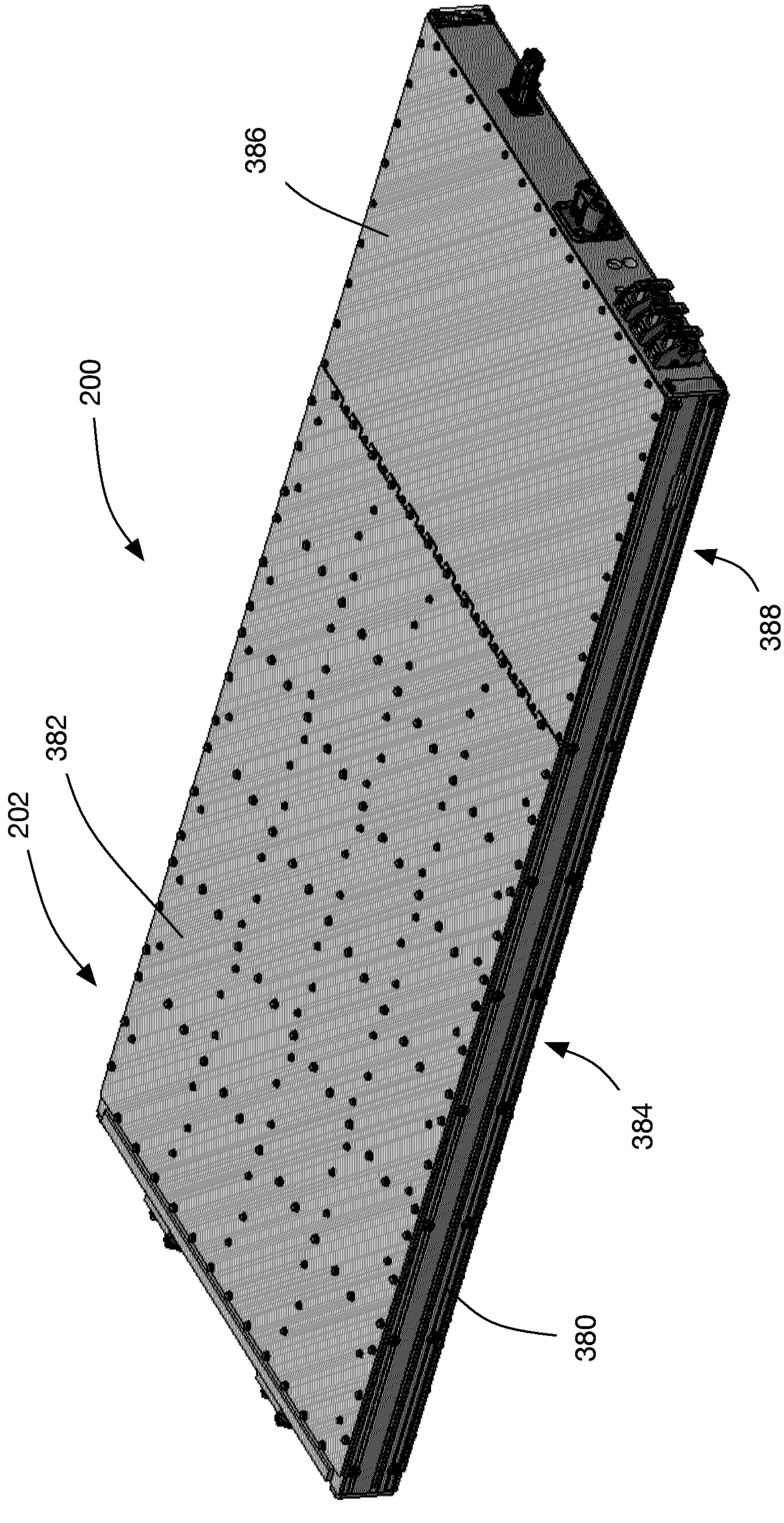
FIG. 12A is a perspective view of a battery pack in accordance with another embodiment of the present disclosure.
Figure 12B:
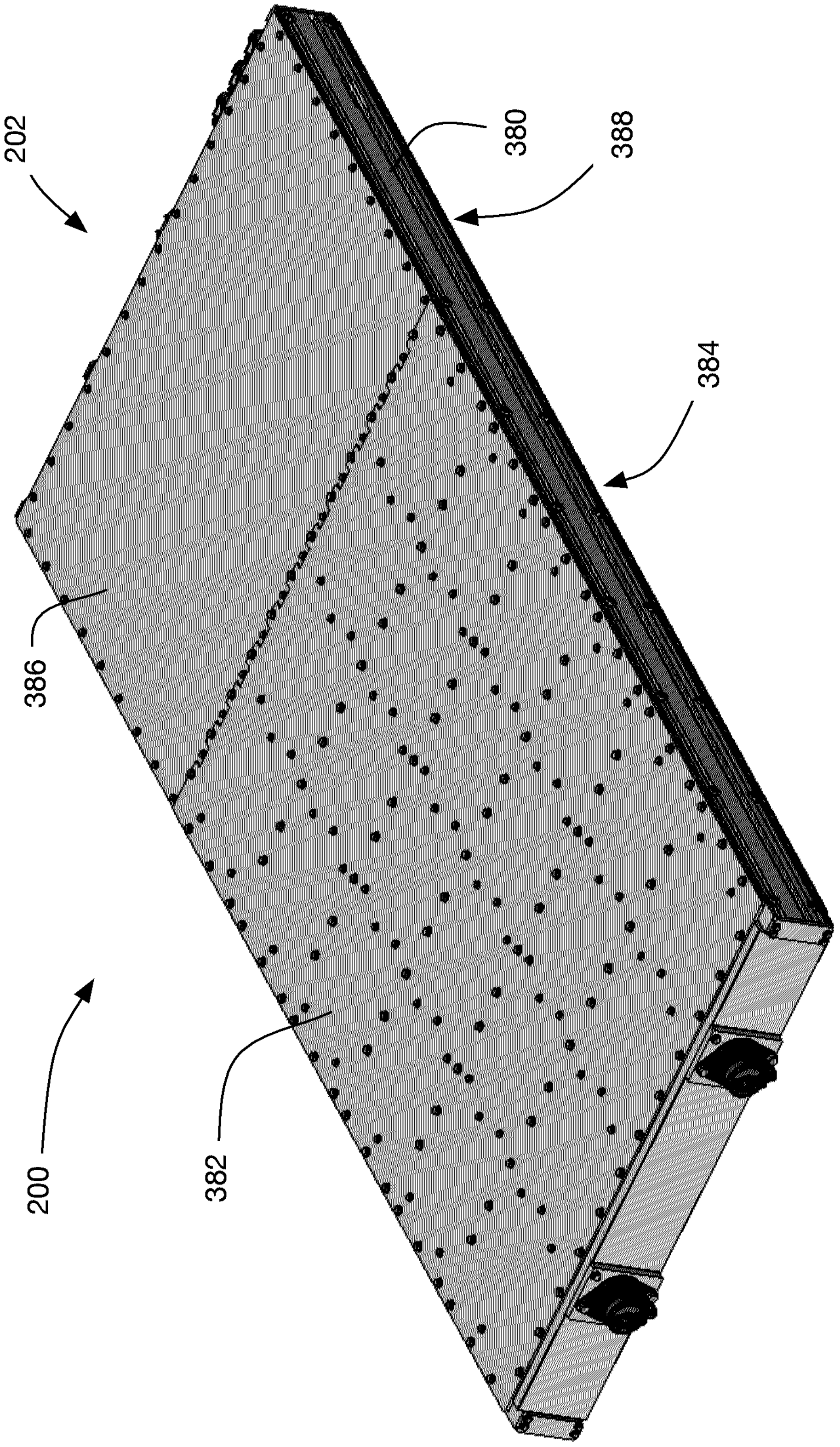
FIG. 12B is another perspective view of the battery pack shown in FIG. 12A
Figure 13:
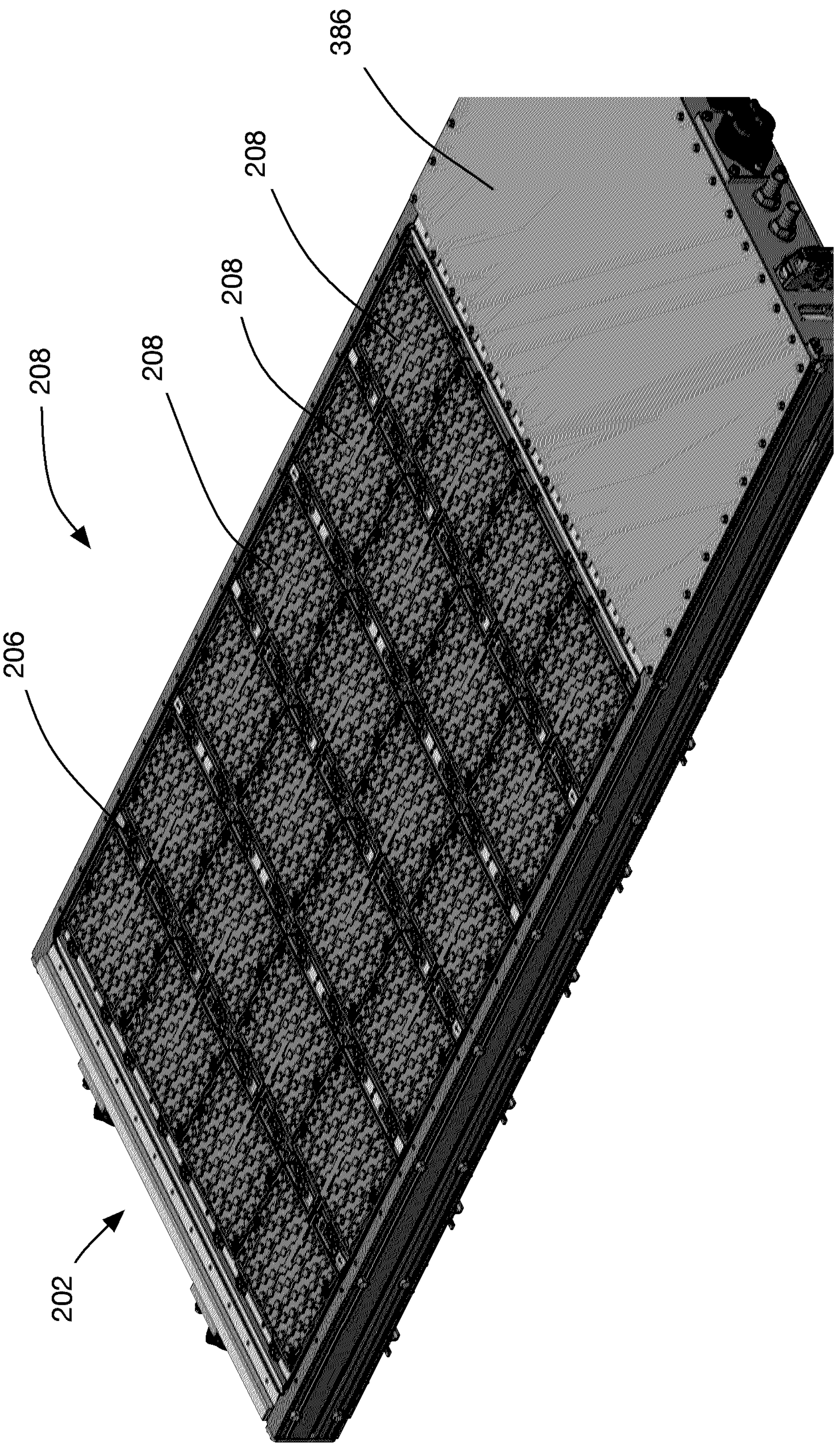
FIG. 13 is a perspective view of a portion of the battery pack shown in FIG. 12A, with part of its housing removed, showing a plurality of modules that hold the cells of the battery pack.

Supporting the Ends of the Bus Bar to Prevent Deformation, and Use of Bus Bar as Fuse The cell-to-cell bus bars 25 may be constructed so as to use a relatively small amount of material, so as to conserve weight. Furthermore, the cell-to-cell bus bars 25 may be constructed so as to have at least one current control region 98 (FIG. 11) that performs the function of a fuse wire. As a result, if one of the cells 12 in the subset of cells 12 that a cell-to-cell bus bar 25 is engaged with is problematic for whatever reason, the current control region 98 can fail by melting, breaking or any other suitable way, in order to ensure that the electrical connection to the problematic cell 12, is broken if the current to that cell 12 exceeds a selected value. FIG. 11 shows a problematic cell at 102, for the purposes of illustration of this feature. As can be seen in FIG. 11, one of the current control regions 98 on the cell-to-cell bus bar 25 has failed, and as a result current flow to and from the problematic cell 102 is prevented. In order to carry out the function of acting as a fuse wire, the current control region 98 may be formed in such a way as to have not more than a selected cross-sectional area, such that heat buildup in the current control region 98 due to resistance during current flow that is beyond a selected value, causes failure at the current control region 98, thereby breaking the circuit to the problematic cell. As a result of this feature, and as a result of generally constructing the bus bar in a way that reduces weight, the cell-to-cell bus bar 25 may be somewhat weak in bending.

As can be seen the current control regions 98 for certain cells 12 engaged by the cell-to-cell bus bar 25 shown in FIG. 11, are shown as having two current control region portions (98*a* and 98*b*), while other current control regions 98 only have one portion. However, it is contemplated that an alternative version of the cell-to-cell bus bar 25 would employ current control regions 98 that are all substantially the same (i.e. they all have a similar cross-sectional area, so as to fail at a similar current).

Figure 5A:
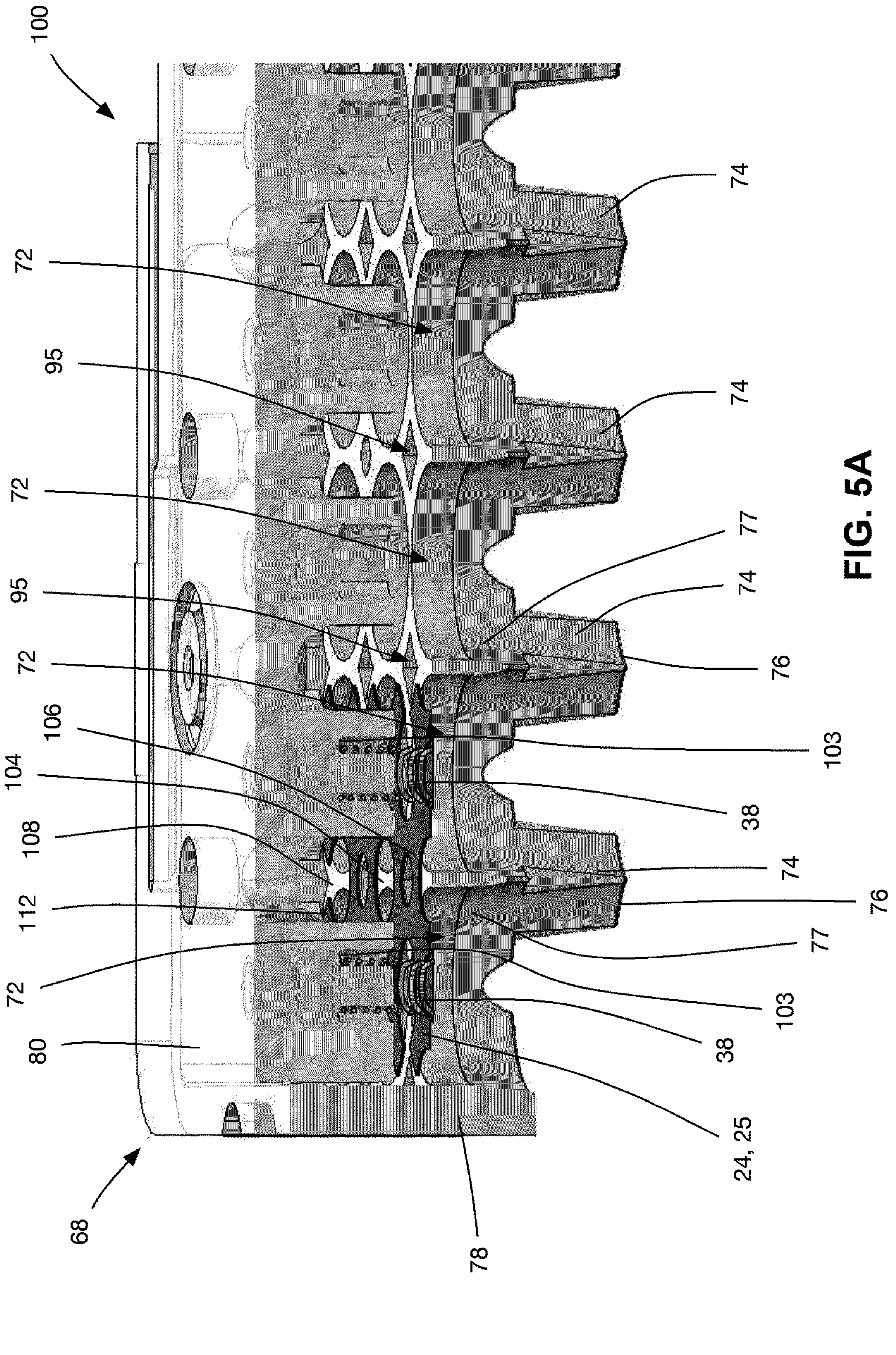
FIG. 5A is a sectional perspective view of a portion of the battery pack showing a bus bar, a plurality of biasing members for the bus bar, and a portion of the housing of the battery pack.
Figure 5B:
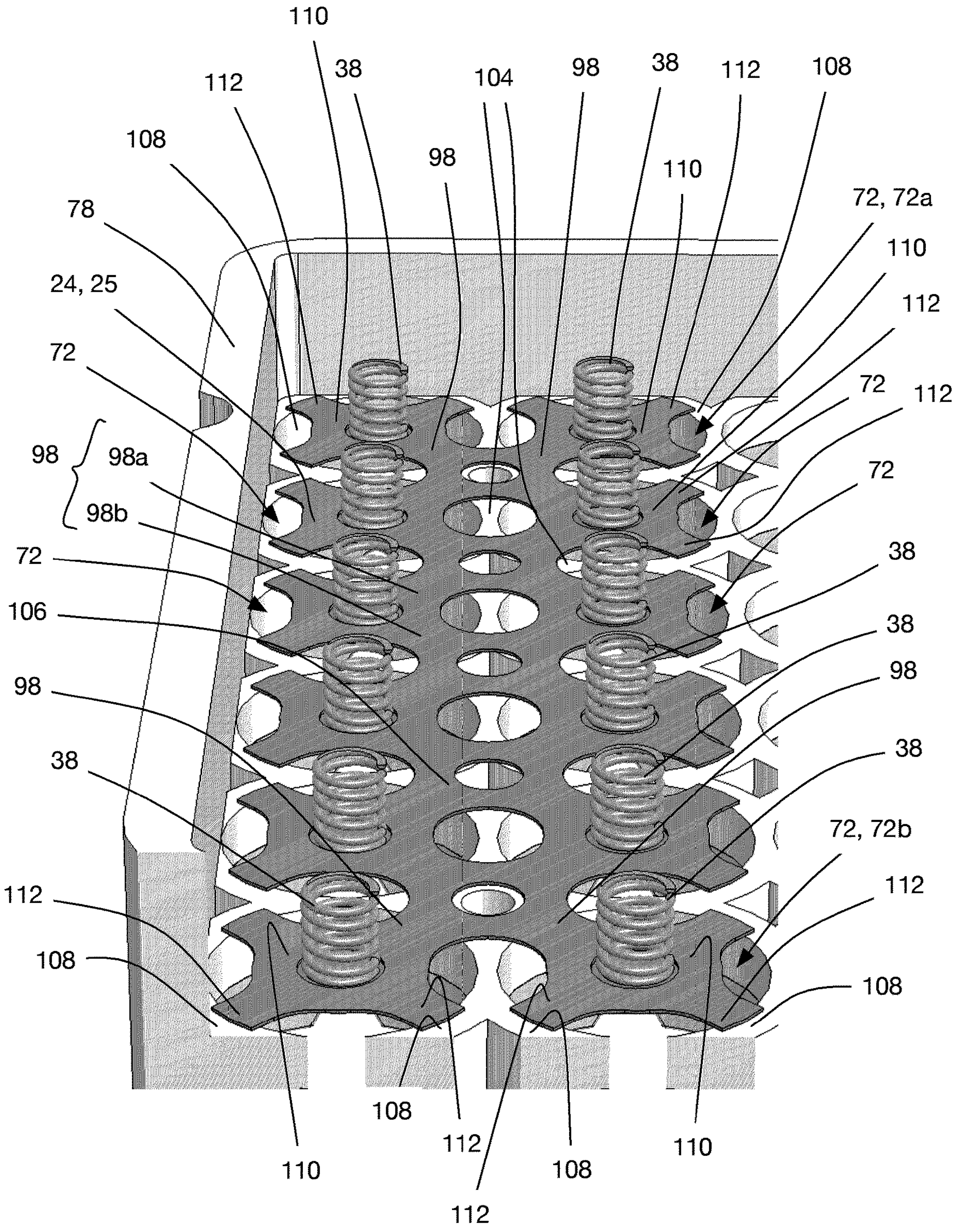
FIG. 5B is another sectional perspective view of a portion of the battery pack, showing the bus bar and the plurality of biasing members.

With reference to FIGS. 5A and 5B, a subassembly 100 is shown that includes the upper holder 68, at least one cell-to-cell bus bar 25, and the at least one biasing member 38. While only one cell-to-cell bus bar 25 is shown in FIG. 5A, there would be others present in the subassembly 100 in the presently shown embodiment. During assembly of the battery pack 10, the subassembly 100 may be placed on top of another subassembly comprising the lower holder 66 and the cells 12 captured in the lower holder cell apertures 70. Prior to mounting of the subassembly 100 onto the aforementioned other subassembly, the at least one biasing member 38 is supported at one end against a biasing member support surface 103 (FIG. 5A) on the second upper holder portion 80, and at their other end against the cell-to-cell bus bar 25. As a result, the cell-to-cell bus bars 25 are urged into engagement with a support surface 104 of the first upper holder portion 78. Along a row of cells 12, the support surface 104 is made up of regions of the first upper holder portion 78 between the upper holder cell apertures 72 which support the body of the cell-to-cell bus bar 25 (shown at 106). In addition, the first upper holder portion 78 includes a plurality of first bus bar support shoulders 108 that are adjacent the upper holder cell apertures 72.

The portion of each cell-to-cell bus bar 25 that is positioned to engage an individual cell 12 may be referred to as an end portion 110. The end portion 110 is connected to the body 106 of the cell-to-cell bus bar 25 by a current control region 98. In order to ensure that the end portions 110 of the cell-to-cell bus bar 25 are not supported in cantilever where they could be potentially bent plastically by the force of the biasing members 38 engaged therewith, the end portions 110 of the cell-to-cell bus bar 25 each have at least one extension 112 thereon, such that each end portion 110 is supported on the bus bar support shoulder 106. As a result, the cell-to-cell bus bar 25 extends across each of the upper holder cell apertures 72, so as to be engaged by one of the positive and negative cell terminals 16 and 18 of each cell 12 from a subset of cells 12 from the plurality of cells 12.

Once the subassembly 100 is mounted to the plurality of cells 12 in the lower holder 66 (FIG. 8) the cell-to-cell bus bars 25 are lifted by the top ends 56 of the cells 12 off the support surface 104 and the bus bar support shoulders 106.

Ease of Assembly and Disassembly

The assembly of the subassembly 100 onto the aforementioned other subassembly may involve the use of mechanical fasteners such as screws, shown at 120 in FIG. 2A, and forms the subassembly 64 in FIG. 8, may then be inserted into the first outer shell portion 60*a*, optionally with the use of further mechanical fasteners, and the second outer shell portion 60*b* may be mounted onto the first outer shell portion 60*a* to enclose the subassembly containing the cells 12.

It will be noted that the battery pack 10 is formed without requiring the use of any other materials between the cells 12 to hold the cells 12 in place, including glue, paste or epoxy or any other flowable or manually plastically deformable material. The avoidance of using any materials such as this permits direct contact between the cells 12 and the coolant 97 flowing through the cooling chamber 94, which, in turn, helps improve the heat transfer between the cells 12 and the coolant 97. Additionally, the avoidance of using materials such as this permits the battery pack 10 to be assembled easily robotically, and permits the easy disassembly of the battery pack 10, which provides a number of advantages. For example, this permits individual cells 12 to be easily accessed and replaced if needed. It further permits the reuse of many components of the battery pack at the end of life of the cells 12 when used in an automotive application. For example, when the cells 12 have reached a point where they only have a selected capacity to store charge left such as about 80% of their original capacity to store charge, the cells 12 can then be easily removed from the upper and lower holders and reused for other uses such as in a stationary charge storage application. By contrast, some battery packs of the prior art employ epoxies and the like to fix the cells in place in the battery pack which makes the cells inaccessible, to the point where the entire battery pack is destroyed after it is no longer suitable for automotive use. Also contributing to the removability of the cells 12 is that the cells 12 do not have any wires soldered thereto as is done in some battery packs of the prior art. The bus bars 24 are all directly engaged with the positive and negative cell terminals 16 and 18 of the cells 12, by virtue of the at least one biasing member 38. It will be noted here that, even the bus bars 24 that are located under the bottom ends 58 of the cells 12 are urged into engagement with the cells 12 by the at least one biasing member 38 that is above the cells 38, since the at least one biasing member 38 urges the cells 12 downwards into engagement with the bus bars 24 that are located below them.

In order to ensure that the bus bars 24 remain in contact with the cells 12 during operation of the electric vehicle 11 in which the battery pack 10 is to be used, the biasing force applied by the at least one biasing member 38 will be selected to account for forces that are exerted on the cells 12 during operation of the electric vehicle 11, such as during impacts (e.g. with potholes or other road irregularities), during vibrations caused by the road surface or for other reasons, and during maneuvers such as extreme braking, acceleration and cornering events.

Other Components

The battery pack 10 may further include other components such as a controller shown at 130 in FIG. 1. The controller 130 may be used to manage the flow of coolant 97 through the battery pack 10, the charging and discharging of the battery pack 10 and other functions. The controller 130 may reside in a separate controller chamber 132 between the first outer shell portion 60*a* and a third outer shell portion 60*c* (which, for illustration purposes is shown as transparent in FIG. 1).

Description Relating Primarily to FIGS. 12-48

General Description

A battery pack 200 in accordance with another embodiment of the present disclosure is shown in FIGS. 12-45. The battery pack 200 has a battery pack housing 202 that is described in greater detail further below. In the embodiment shown, the battery pack housing defines both a battery pack wet chamber 204 and a battery pack dry chamber 206.

Figure 14:
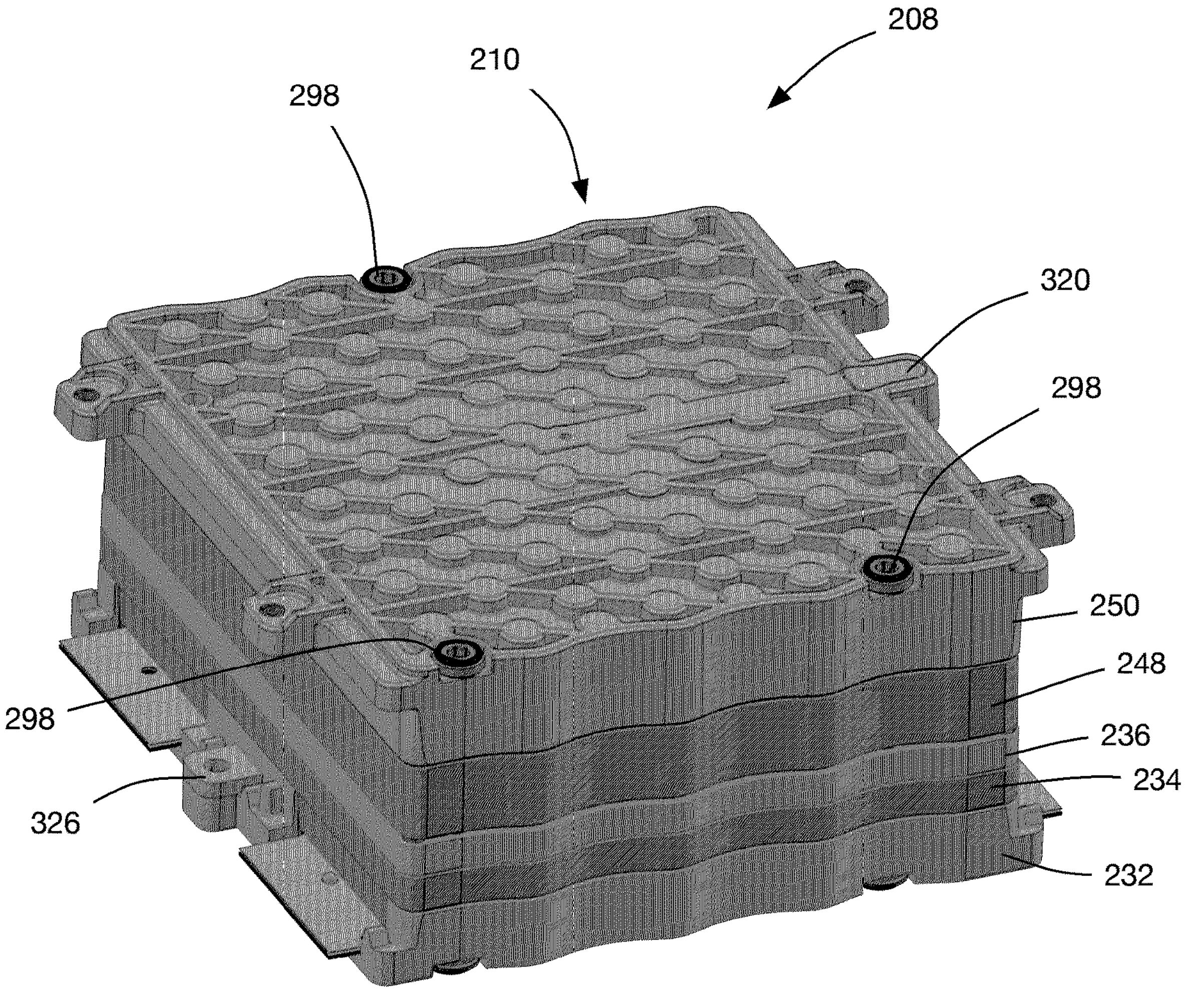
FIG. 14 is a perspective view of one of the modules shown in FIG. 13.

A plurality of modules 208 are positioned inside the battery pack housing 202, and more specifically in the battery pack wet chamber 204. One such module 208 is shown in FIG. 14. The module 208 includes a module housing 210, a plurality of cells 212 supported in the module housing 210, a plurality of upper bus bars 214 and a plurality of lower bus bars 216. The cells 212 may be similar to the cells 12. Each cell 212 has a top end 218 and a bottom end 220, and defines an axis Ac between the top and bottom ends 218 and 220. Each cell further has a cell body 222 extending axially between the top and bottom ends 218 and 220. The cell body 222 has an outer surface 223. In the embodiment shown, the cell body 222 is cylindrical in shape (or may be said to be circular in cross-sectional shape), however any other suitable shape for the cell body 222 may be provided. In some embodiments, the cells 212 may specifically be 21700 cells, or they may be any other suitable types of cells.

The cells 212 each have a positive terminal 224 and a negative terminal 226. The positive terminal 224 is at one of the top and bottom ends 218 and 220, and the negative terminal 226 is at the other of the top and bottom ends 218 and 220. In the embodiment shown, the negative terminal 226 also extends along the outer surface 223 of the cell body 222. In some embodiments, the negative terminal 226 may cover a portion of the top end 218 of the cell 212 also.

Providing Mid-Level Holder Which Prevents Cells from Contacting One Another

The module housing 210 holds the cells 212 during operation of the battery pack 200. The module housing 210 includes a lower housing portion 228, and a module cover 230. The lower housing portion 228 may itself be made up of several elements, including a bottom member 232, a lower holder 234, and optionally, a mid-level holder 236. The bottom member 232 supports the lower bus bars 216. The lower holder 234 is spaced from the top end 218 of each cell 212 and has a plurality of lower holder cell apertures 238. The cells 212 are removably supported in the lower holder cell apertures 238. Each lower holder cell aperture 238 has a first aperture end 238*a* and a second aperture end 238*b* that is smaller than the first aperture end 238*a*, and is tapered from the first aperture end 238*a* to the second aperture end 238*b*.

Figure 25:
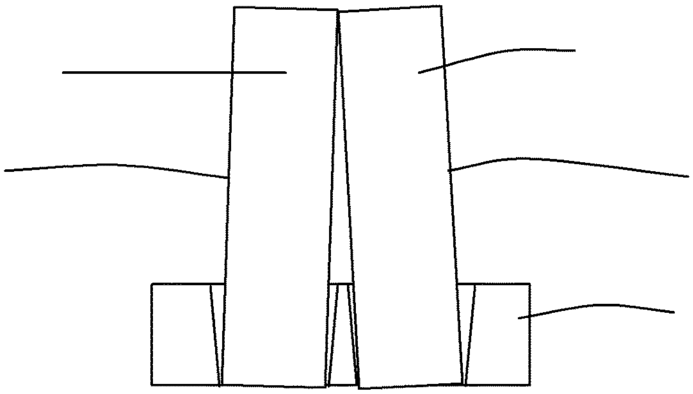
FIG. 25 shows cells of the module shown in FIG. 14 when the cells tilt towards one another sufficiently to contact one another.

The tapered shape of the lower holder cell apertures 238 may be the result of draft that is provided to assist in the molding process of the lower holder 234. More specifically, when an object is injection molded, there is a need in some instances for walls of the molded object to have a slight angle on them in order to facilitate removal of the molded object from the associated mold plate. This angle is referred to as a draft angle, or simply, draft. Depending on the draft angle of the lower holder cell apertures, as well as other factors, such as the height and proximity of the cells 212, it may be possible that, during assembly or transport of the module 208 one or more of the cells 212 could tilt towards one another sufficiently to contact one another. Such an event is illustrated in FIG. 25. In embodiments in which the negative terminal 226 extends along the outer surface 223 of the cell 212, such contact between two cells 212 would short circuit the cells 212, which can damage the cells 212 or could cause a fire to ignite within the module 208.

Figure 26:
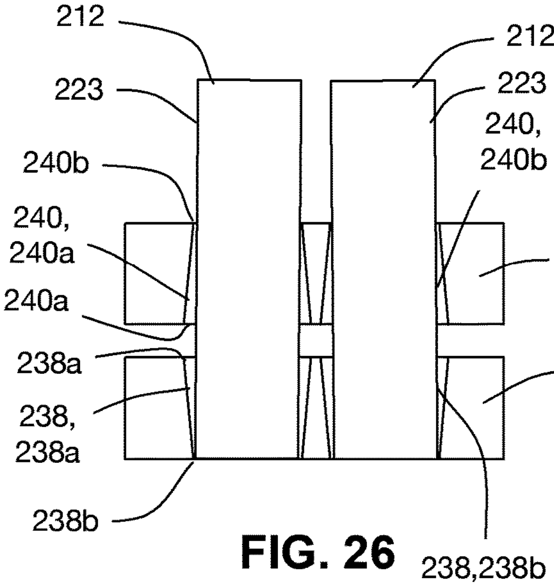
FIG. 26 is a side view of a portion of the module shown in FIG. 14, including cells and a lower holder and a mid-level holder thereof, according to one configuration.
Figure 27:
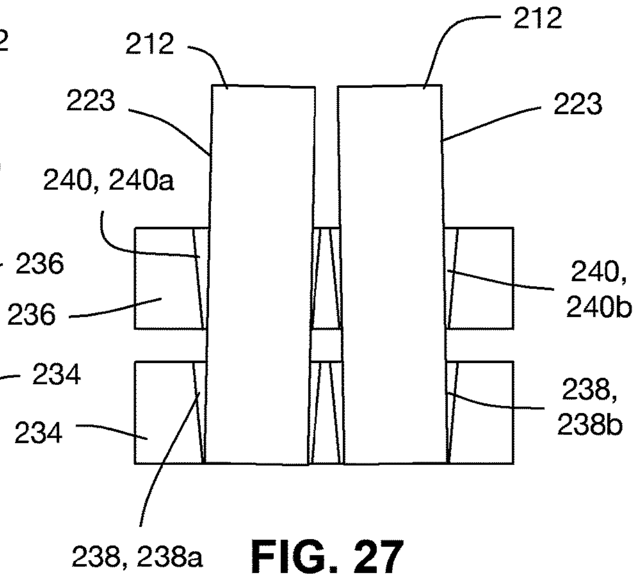
FIG. 27 is a side view of a portion of the module shown in FIG. 14, including cells and a lower holder and a mid-level holder thereof, according to another configuration differing from the configuration shown in FIG. 26.

To mitigate this risk, the mid-level holder 236 may be provided. The mid-level holder 236 is positioned above the lower holder 234 and is itself spaced from the top end 218 of each cell 212. The mid-level holder 236 includes a plurality of mid-level holder cell apertures 240. Each of the mid-level holder cell apertures 240 has a first aperture end 240*a* and a second aperture end 240*b* that is smaller than the first aperture end 240*a*, and is tapered from the first aperture end 240*a* to the second aperture end 240*b*. The lower holder 234 and the mid-level holder 236 are oriented such that the first aperture end 238*a* or 240*a* of one of the lower holder cell apertures 238 and the mid-level holder cell apertures 240 faces towards the other of the lower holder cell apertures 238 and the mid-level holder cell apertures 240. An example of this is shown in FIG. 26, in which the first aperture ends 238*a* and 240*a* of both the lower holder cell apertures 238 and the mid-level holder cell apertures 240 face towards the other of the lower holder cell apertures 238 and the mid-level holder cell apertures 240. In other words, in FIG. 26, the first aperture ends 238*a* of the lower holder cell apertures 238 face towards the mid-level holder cell apertures 240, and the first aperture ends 240*a* of the mid-level holder cell apertures 240 face towards the lower holder cell apertures 238. Another example is shown in FIG. 27, in which the first aperture ends 238*a* of the lower holder cell apertures 238 face towards the mid-level holder cell apertures 240, but the first aperture ends 240*a* of the mid-level holder cell apertures 240 do not face towards the lower holder cell apertures 238.

The second aperture ends 238*b* and 240*b* of the lower holder 234 and the mid-level holder 236 are sized relative to the cross-sectional area of each of the plurality of cells 212 so as to prevent a first one (shown at 242) of the plurality of cells 212 that is held in a first one (shown at 240*a*) of the mid-level holder cell apertures 240 and a first one (shown at 238*a*) of the lower holder cell apertures 238, and a second one (shown at 244) of the plurality of cells 212 that is adjacent to the first one 242 of the plurality of cells 212 and which is held in a second one (shown at 240*b*) of the mid-level holder cell apertures 240 and a second one (shown at 238*b*) of the lower holder cell apertures 238 from being brought into contact with one another by being tilted towards one another, thereby reducing the risk of short circuits in the cells 212.

Presence of Intermediate Space Between Upper and Lower Holders and Gaps Between Upper and Lower Holders and the Cells to Improve Heat Transfer Each lower holder cell aperture 238 is defined by a lower holder cell aperture wall 246 that has a plurality of lower cell contact surfaces 246*a* for engaging a respective one of the plurality of cells 212, and that has a plurality of lower wall valleys 246*b* where the lower holder cell aperture wall 246 is spaced by a lower gap GL from the respective one of the plurality of cells 212. A benefit to this configuration of the lower holder cell aperture wall 238 is that it permits coolant to directly contact the cell 212 along an axial portion of the outer surface 223 where the lower holder cell aperture wall 246 is present. In this way, cooling or heating of the cell 212 (i.e. heat transfer between the cell 212 and the coolant) is more uniform and the temperature of the cell 212 is more uniform along the length of the cell 212.

Figure 36:
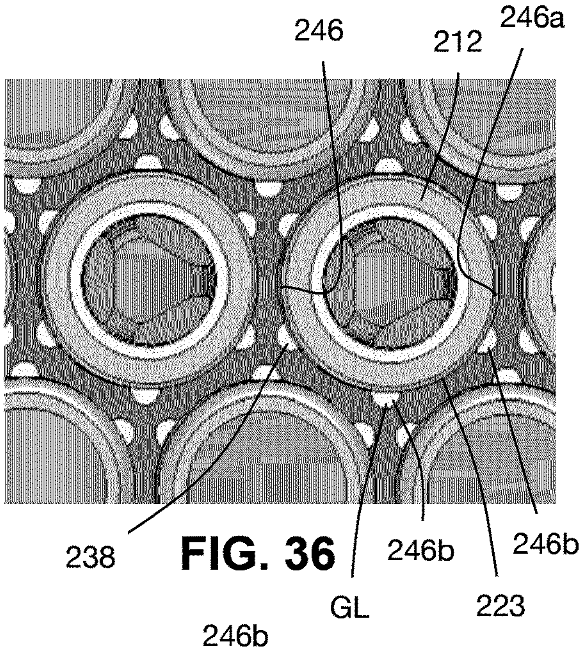
FIG. 36 is a view of a portion of the module shown in FIG. 14, including cells and a lower holder cell aperture wall thereof.
Figure 37A:
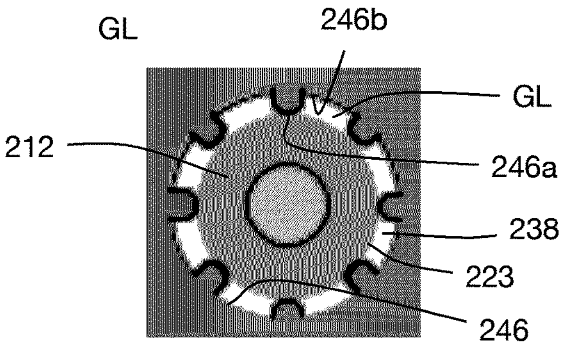
FIG. 37A is a view of a portion of the module shown in FIG. 14, including a cell and an alternative embodiment of a lower holder cell aperture wall thereof.
Figure 37B:
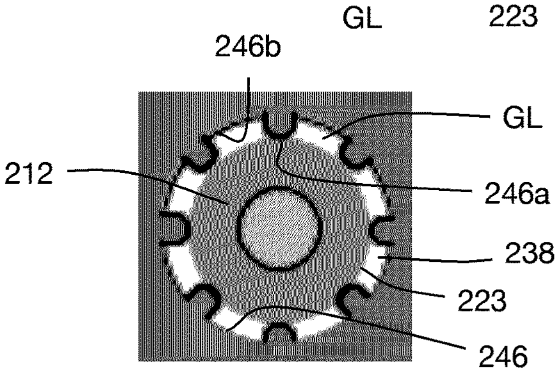
FIG. 37B is a view of a portion of the module shown in FIG. 14, including a cell and an alternative embodiment of a lower holder cell aperture wall thereof.

As can be seen from the example shown in FIG. 36, the plurality of lower cell contact surfaces 246*a* and the plurality of lower wall valleys 246*b* may optionally have polar symmetry about the lower holder cell aperture wall 246, in order to provide even more uniformity to the heat transfer between the cell 212 and the coolant surrounding the cell 212.

As can be seen in the example shown in FIG. 36, the plurality of lower cell contact surfaces 246*a* may occupy a larger portion of the lower holder cell aperture wall 246 than is occupied by the plurality of lower wall valleys 246*b*. However, in an alternative embodiment shown in FIG. 37A, the plurality of lower wall valleys 246*b* may occupy a larger portion of the lower holder cell aperture wall 246 than is occupied by the plurality of lower cell contact surfaces 246*a*, which provided further improved heat transfer between the cells 212 and the coolant.

In embodiments in which there is a mid-level holder 236 (FIG. 26) provided, the mid-level holder cell apertures 240 may each include a plurality of mid-level cell contact surfaces and a plurality of mid-level wall valleys that may be shaped similarly and positioned in similar angular positions about the outer surface 223 of the body 222 of the cell 212.

Figure 16:
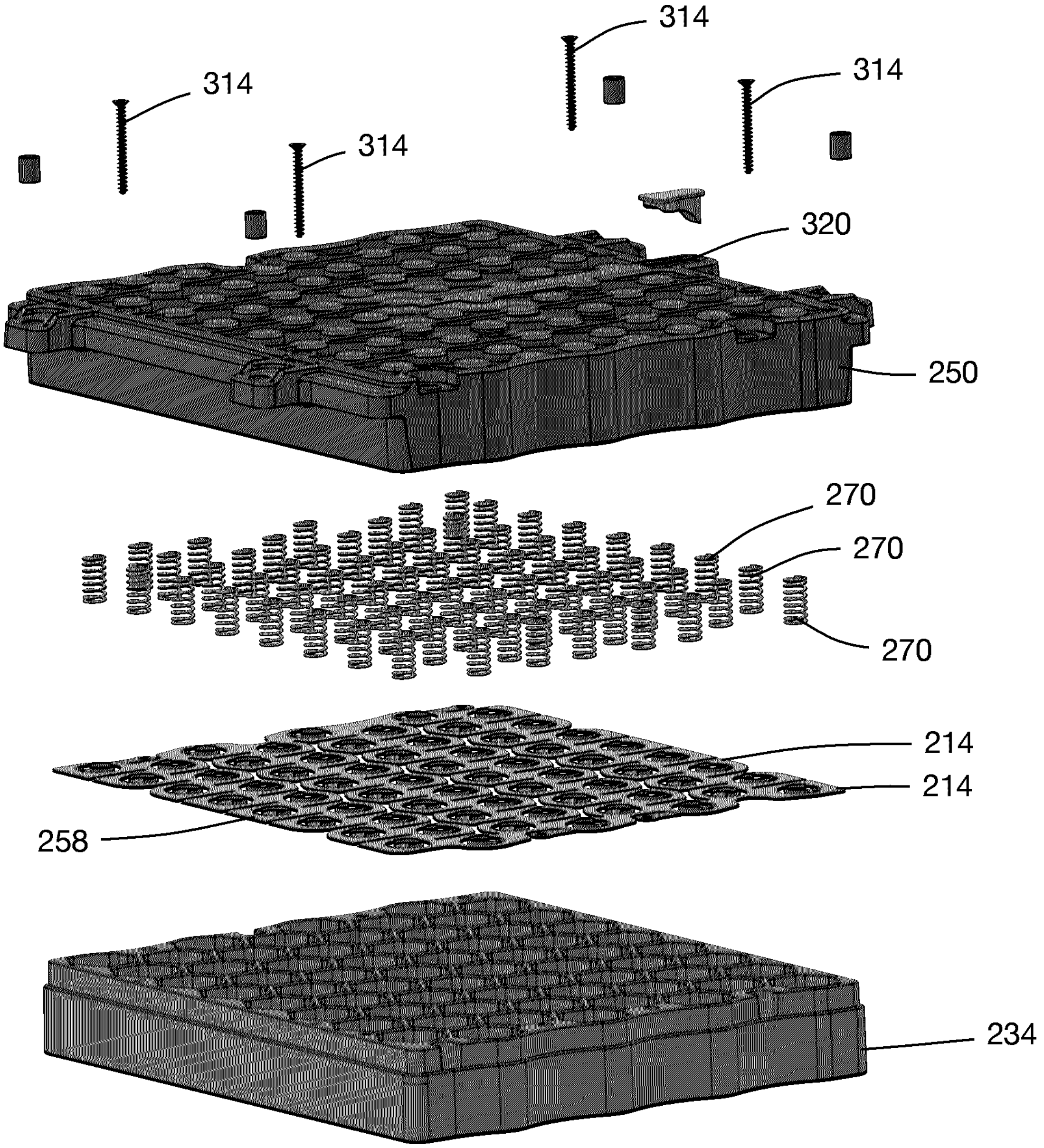
FIG. 16 is an exploded view of the module cover shown in FIG. 15.
Figure 17:
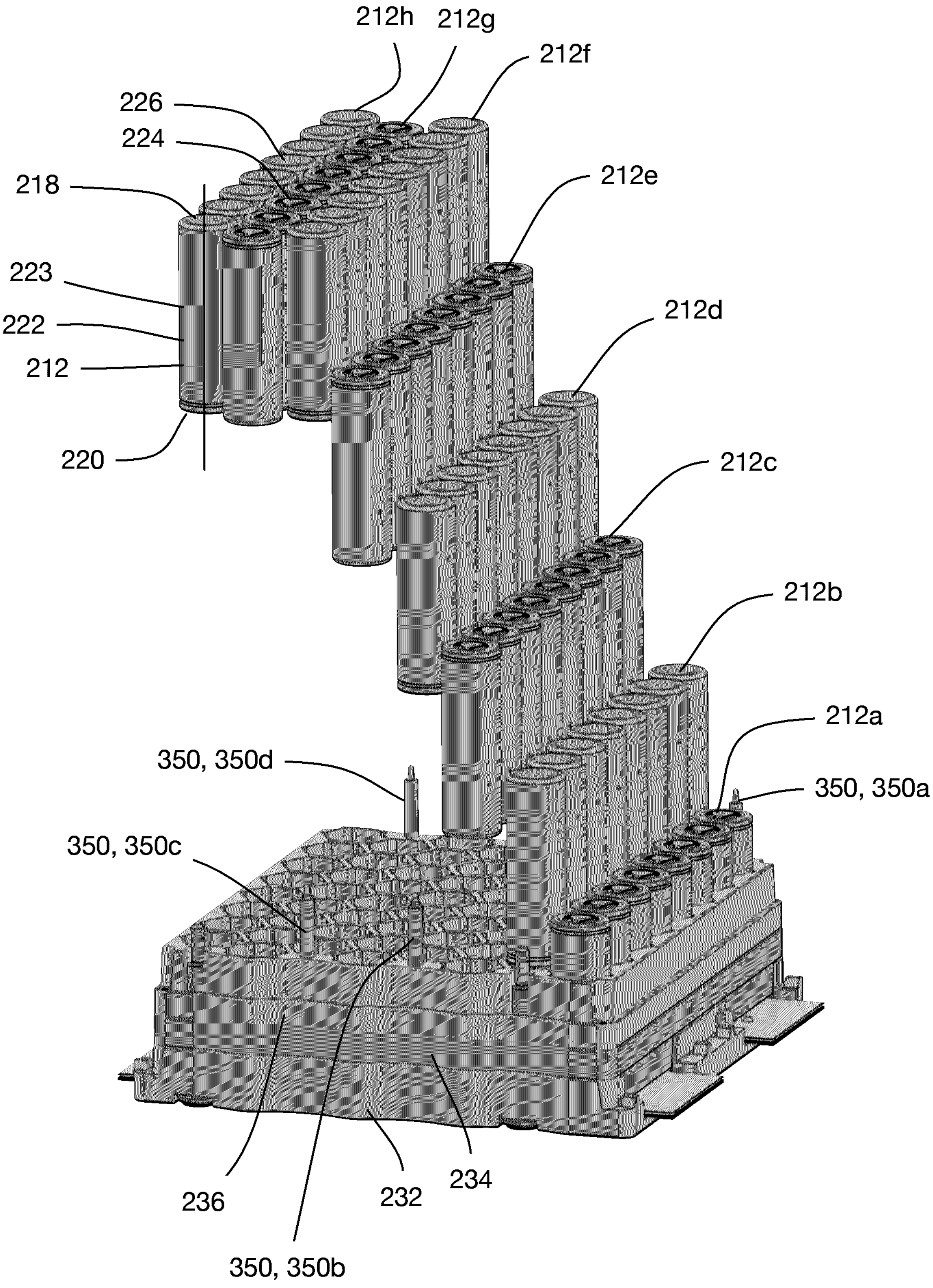
FIG. 17 is an exploded perspective view of the module lower portion.
Figure 18:
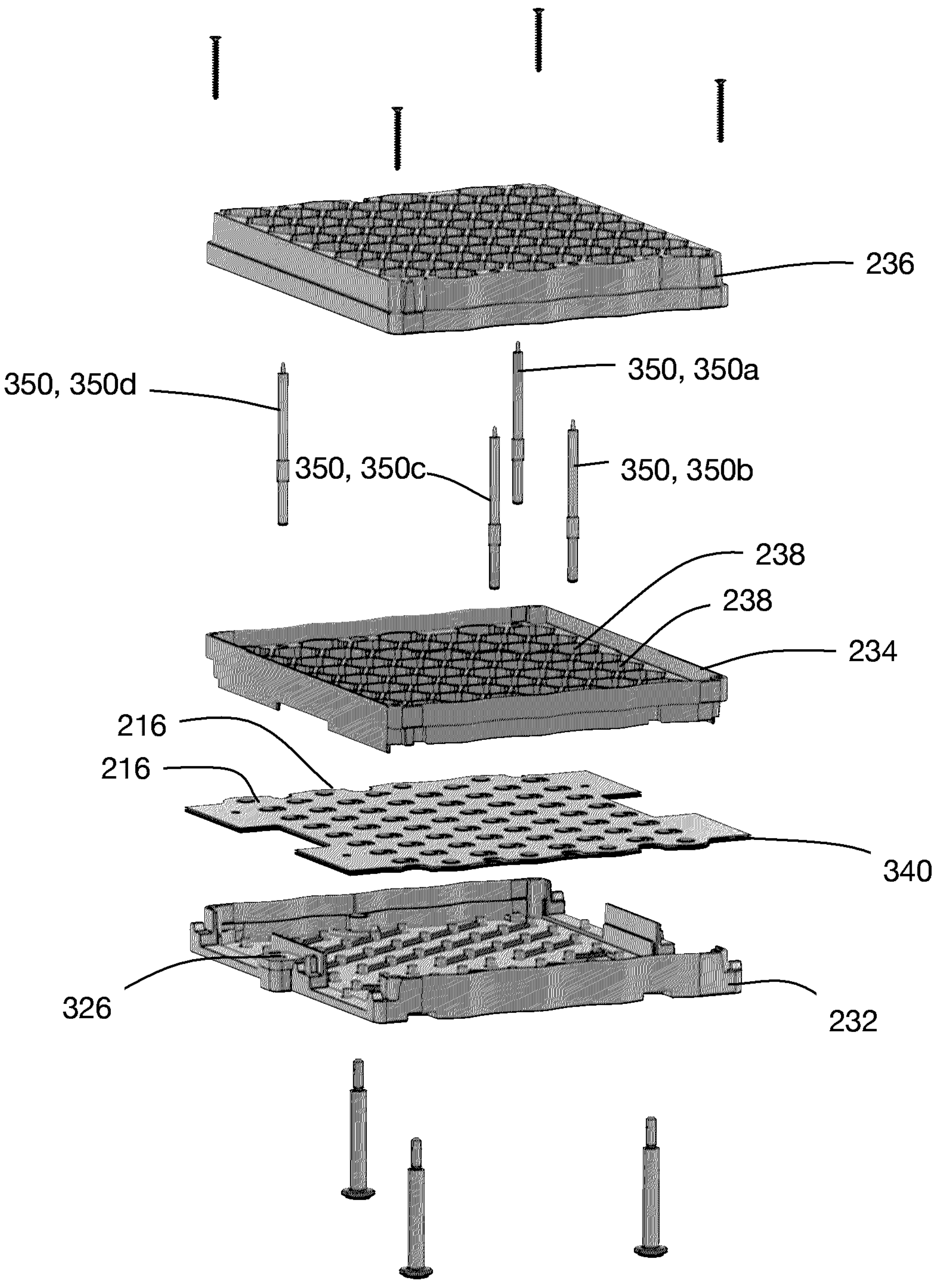
FIG. 18 is an exploded view of the lower housing portion of the module shown in FIG. 14.
Figure 34:
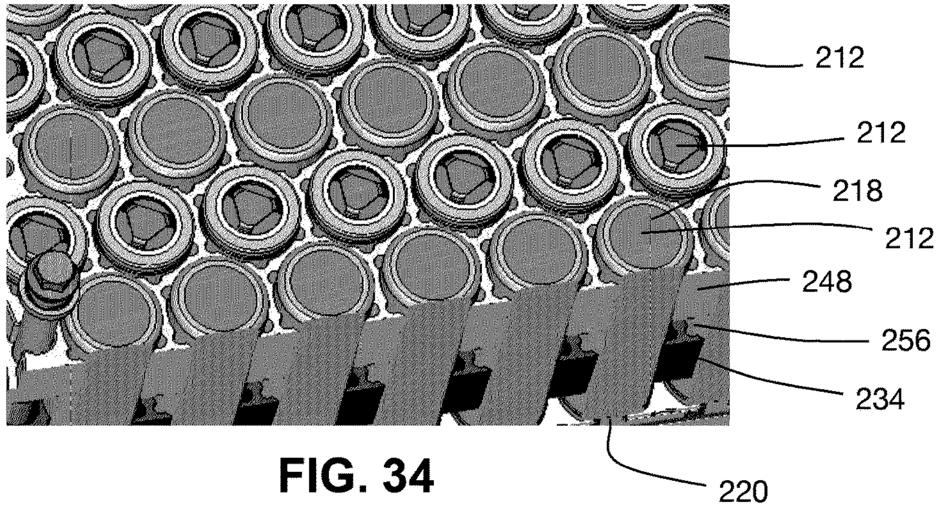
FIG. 34 is a perspective of a portion of the module shown in FIG. 14, including cells and the upper holder thereof.
Figure 35:
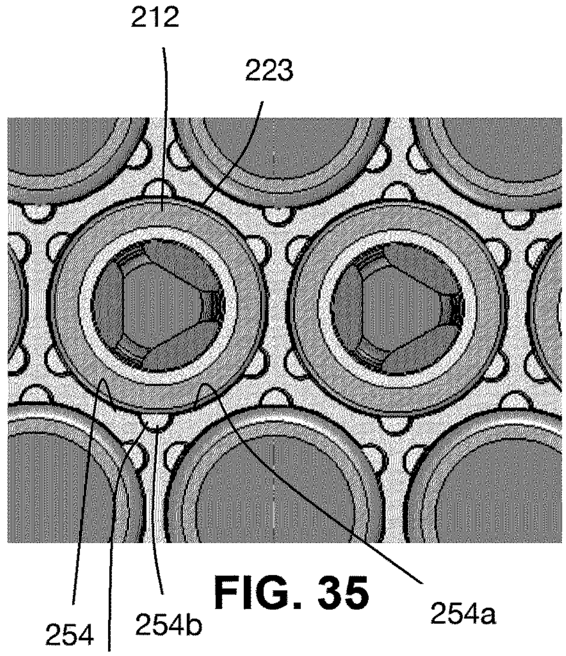
FIG. 35 is a view of a portion of the module shown in FIG. 14, including cells and the upper holder thereof.

The module cover 230 may itself be made up of several elements, including an upper holder 248 and a top member 250 (FIG. 16). As shown in FIG. 34, the upper holder 248 is closer to the top end 218 of each cell 212 than is the lower holder 234 (and than is the mid-level holder 236 in embodiments in which the mid-level holder 236 is provided). The upper holder 248 as shown in FIG. 35 has a plurality of upper holder cell apertures 252. The cells 212 are removably supported in the upper holder cell apertures 238.

Each upper holder cell aperture 252 is defined by an upper holder cell aperture wall 254 that has a plurality of upper cell contact surfaces 254*a* for engaging the respective one of the plurality of cells, and that has a plurality of upper wall valleys 254*b* where the upper holder cell aperture wall 254 is spaced by an upper gap GU from the respective one of the plurality of cells 212, to similar benefit as that provided by the lower cell contact surfaces 246*a* and the plurality of lower wall valleys 246*b*. Optionally, the upper wall valleys 254*b* are angularly aligned with the lower wall valleys 246*b*, thereby facilitating a flow of coolant along the length of the cell 212.

By spacing the upper holder 248 from the lower holder 234 (and from the mid-level holder 236 in embodiments in which the mid-level holder 236 is provided), the cell 212 is only captured along a portion of its length, leaving at least one intermediate portion (shown at 256 in FIG. 34) of its length completely exposed to coolant, thereby improving the heat transfer between the cell 212 and the coolant, which in turn can in some embodiments provide better uniformity of the temperature of the cell 212.

Axial Flow of Coolant Through Module

Figure 22A:
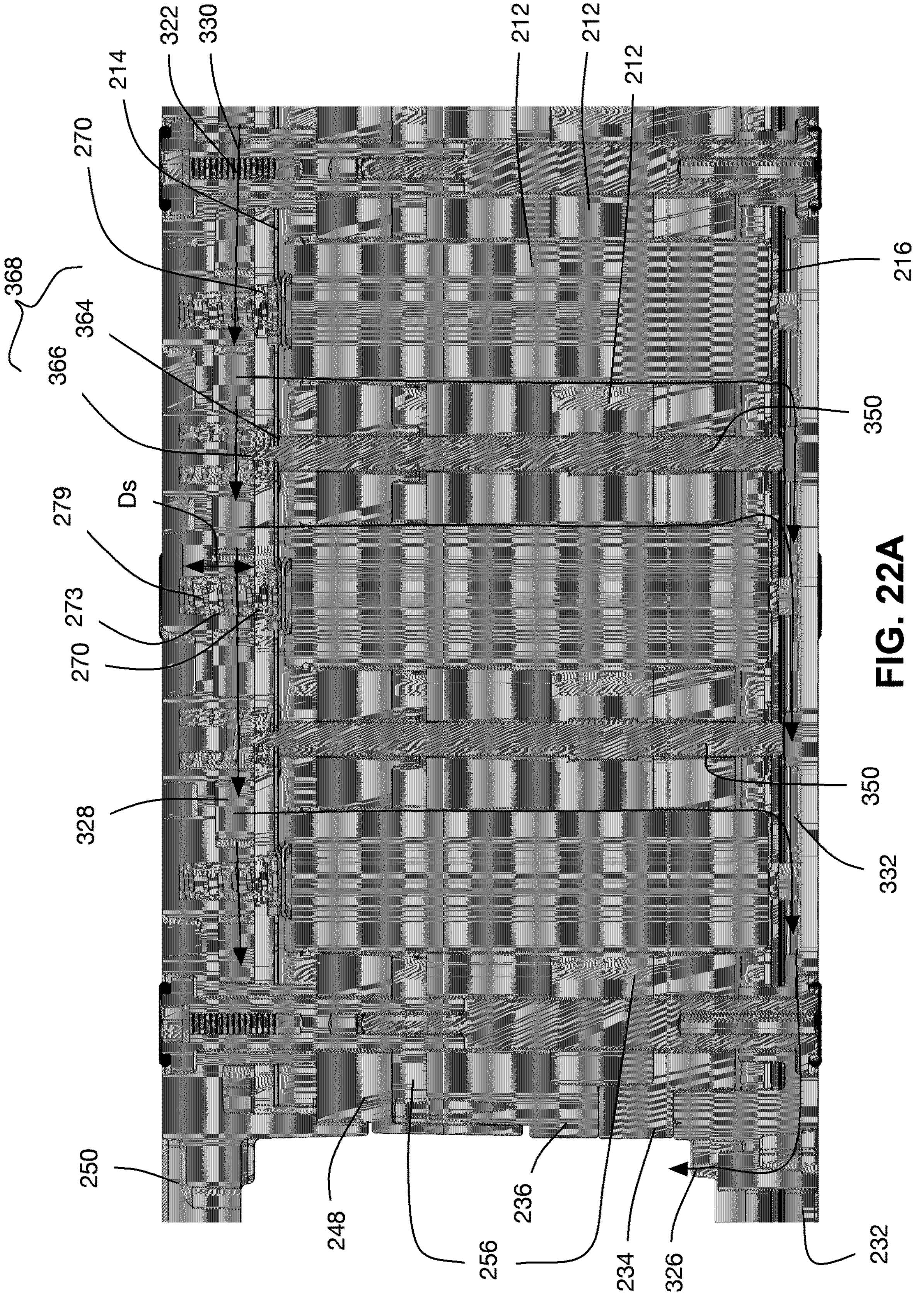
FIG. 22A is a side view of a portion of the module shown in FIG. 14, including a coolant path thereof.
Figure 28:
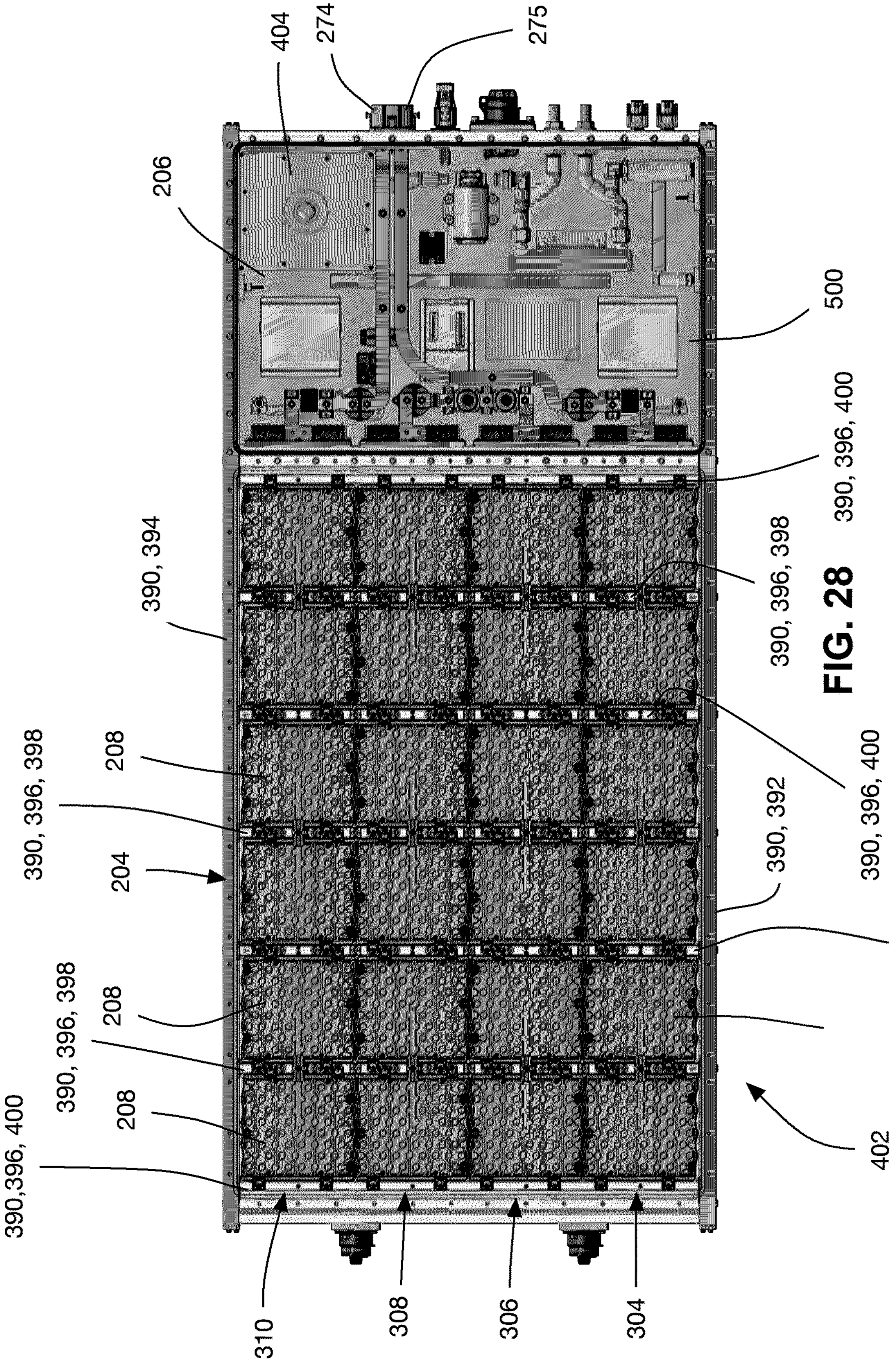
FIG. 28 is a top view of a protion of the battery pack shown in FIG. 12A, including modules, a coolant circuit and a controller thereof.
Figure 33:
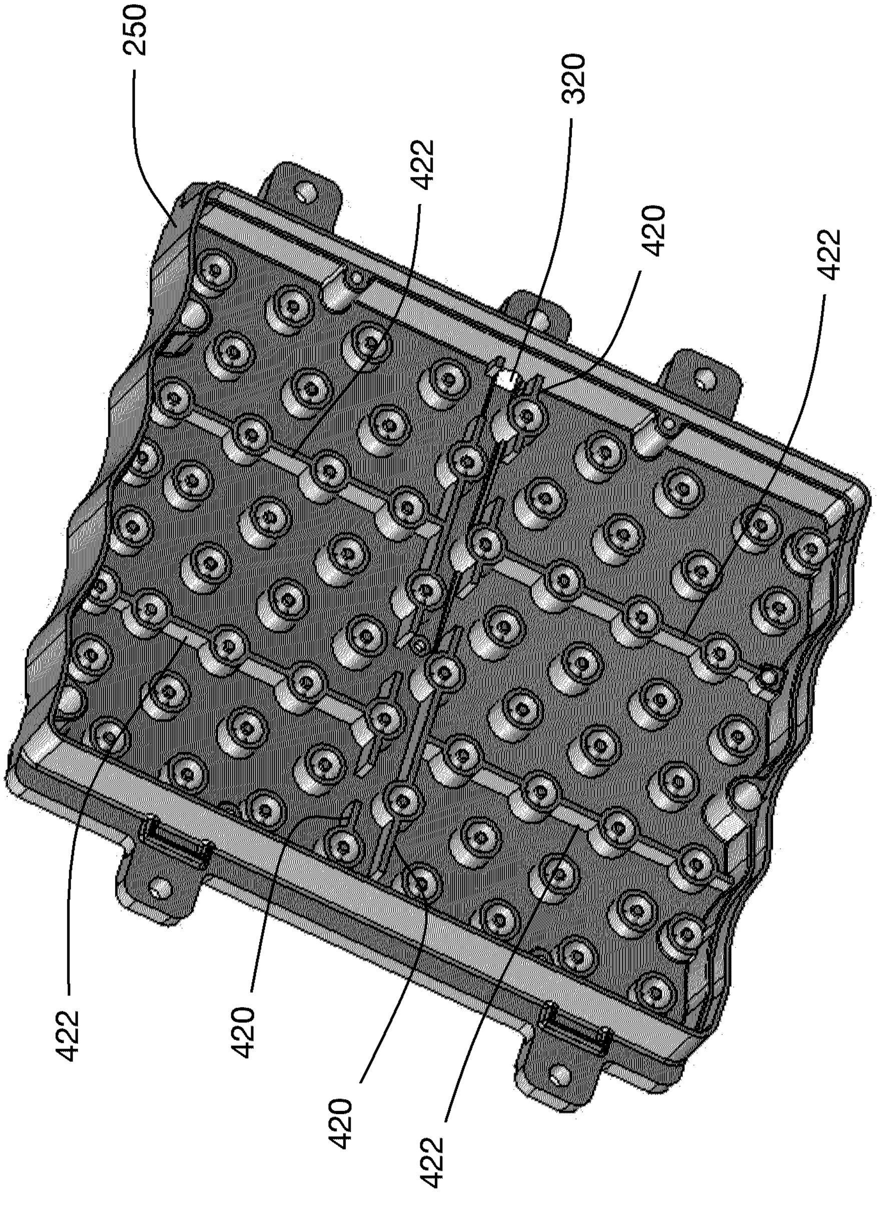
FIG. 33 is a perspective of a top member of a module cover of the module shown in FIG. 14.

With reference to FIGS. 22A, 28 and 33, each module 208 has a coolant inlet 320 for receiving coolant shown at 322 from a coolant source (shown in FIG. 28 at 324), and a coolant outlet 326 (FIG. 22A) for discharging coolant 322 from the module 208. The coolant inlet 320 is positioned to transfer coolant 322 to an inlet chamber 328 above the upper holder 248, and the coolant outlet 326 is positioned below the coolant inlet 320, such that a coolant flow path (shown at 330) through the module 208 extends from the coolant inlet 320, into the inlet chamber 328, axially through the upper holder 248, axially through the lower holder 234, and out of the module through the coolant outlet. Optionally there is an outlet chamber (shown at 332) beneath the lower holder 234 and the bottom member 232 of the module housing 210, into which the coolant 322 would flow after passing through the lower holder 234. If the mid-level holder 236 is provided, the coolant 322 would flow axially through the mid-level holder 236 as well.

In embodiments in which upper holder 248 has the upper wall valleys 254*b* so as to be spaced from each cell 212 by the upper gaps GU, the coolant flow path 330 through the upper holder 248 is at least partially through the upper gaps GU between the upper holder cell aperture wall 254 and the respective one of the plurality of cells 212.

In embodiments in which lower holder 234 has the lower wall valleys 246*b* so as to be spaced from each cell 212 by the lower gaps GL, the coolant flow path 330 through the lower holder 234 is at least partially through the lower gaps GL between the lower holder cell aperture wall 246 and the respective one of the plurality of cells 212.

It will be noted that the axial flow through the module 208 is advantageous since it means that each cell 212 in the module 208 is exposed to essentially fresh coolant, and not coolant that has already been spent cooling other cells 212. This is in contrast to some battery packs of the prior art, which transport coolant (e.g. through coolant conduits in the battery pack) horizontally across many rows of cells, such that the coolant temperature has changed significantly once the coolant in the coolant conduits has reached the last cells in the battery pack before leaving the battery pack. Such prior art battery packs can experience relatively high amounts of variation in temperature between the cells at one end of the battery pack (which see fresh coolant) versus cells at the downstream end of the battery pack (which see coolant that has been used to cool other cells already). As a result, such prior art battery packs are typically operated inefficiently such that the cells receiving the least amount of heat transfer are kept at the target temperature, and the other cells of the battery pack are cooled or heated more than necessary, as the case may be. In the present embodiment of the module 208, however, each cell 212 sees essentially fresh coolant and so there is a greater degree of uniformity in the temperatures of the cells 212 therein.

In some embodiments, such improved uniformity of the cell temperatures is provided by virtue of the axial flow of the coolant, in combination with the presence of the intermediate space between the upper and lower holders 248 and 234, which permits the coolant 322 to directly contact the cells 212. This is in contrast to some battery packs of the prior art in which coolant is not in direct contact with the cells, along their length, but is instead transported through conduits, thereby hampering the heat transfer between the coolant and the cells.

In some embodiments, such improved uniformity of the cell temperatures is provided by virtue of the axial flow of the coolant, in combination with the presence of gaps (e.g. the upper gaps GU and/or the lower gaps GL) between the upper holder 248 and/or the lower holder 234 and the outer surfaces of the cells 212, which improves heat transfer between the cells 212 and the coolant 322 even in regions where a holder, such as the upper holder 248 or the lower holder 234, is provided for the cells.

Description of Bus Bars and Overall Electrical Flow Path

Figure 20:
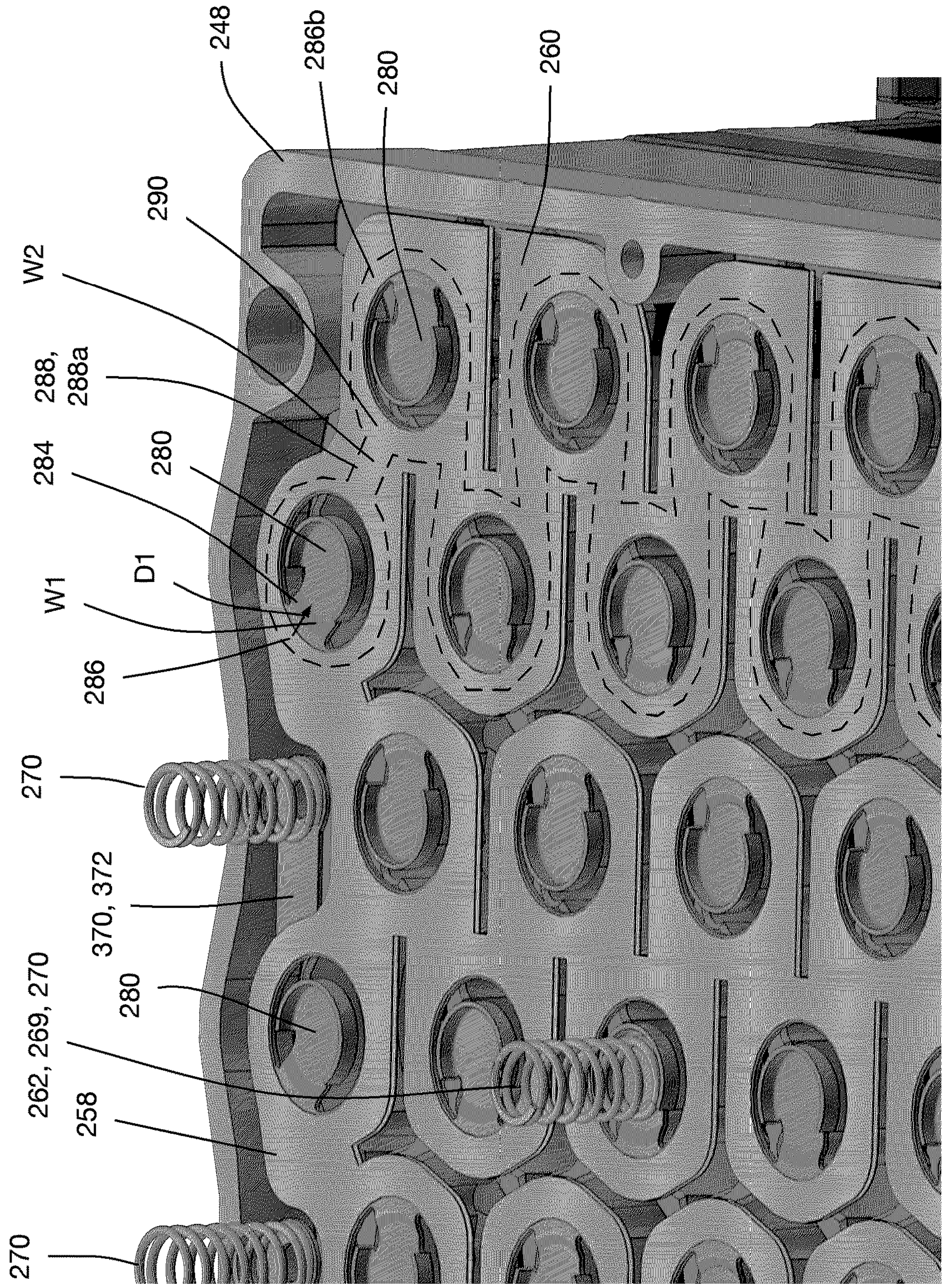
FIG. 20 is a perspective view of a portion of the module shown in FIG. 14, including the upper bus bar connecting matrix thereof.
Figure 21:
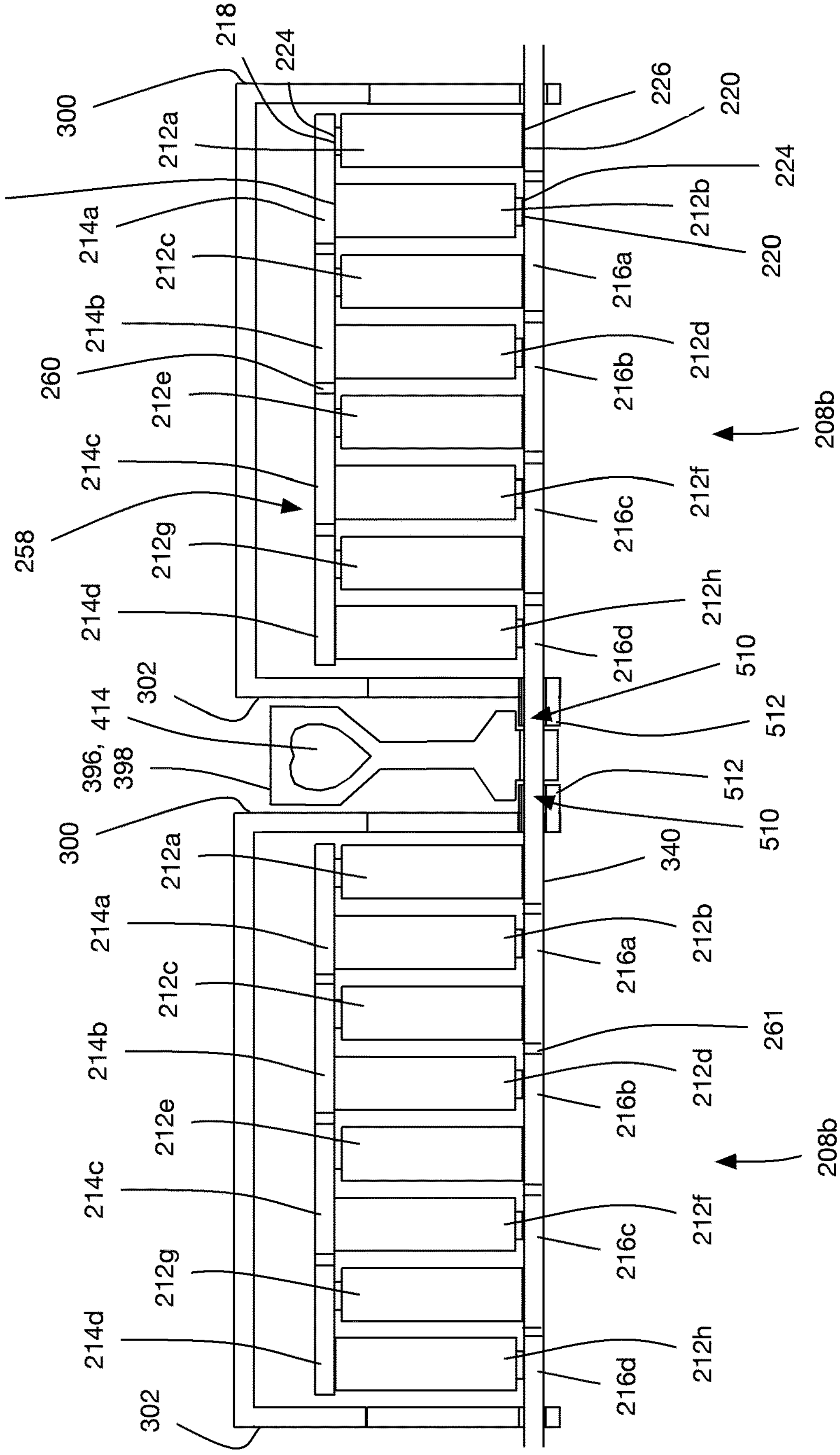
FIG. 21 is a not-to-scale, and somewhat schematic, sectional view of two modules 208 of the battery pack shown in FIG. 12A.

The upper bus bars 214 are electrically conductive and may be made from any suitable material such as copper or aluminum and are held in the module housing 210. More specifically, the upper bus bars 214 may be held in the module cover 230. As shown in FIGS. 20 and 21, the upper bus bars 214 may be connected together to form an upper bus bar array 258 by an upper bus bar connecting matrix 260. As a result, the upper bus bars 214 are installed all together as one element in the module cover 230 thereby simplifying assembly of the module cover 230. The upper bus bar connecting matrix 260 is made from an electrically insulative material such as a suitable polymeric material so as not to provide an electrical connection between the upper bus bars 214 that it connects together. The upper bus bar connecting matrix 260 may also function to cover certain portions of the upper bus bars 214 in order to ensure that those portions do not contact the cells 212 and cause a short circuit, while other portions are not covered and are positioned for contact with the cells 212.

Figure 15:
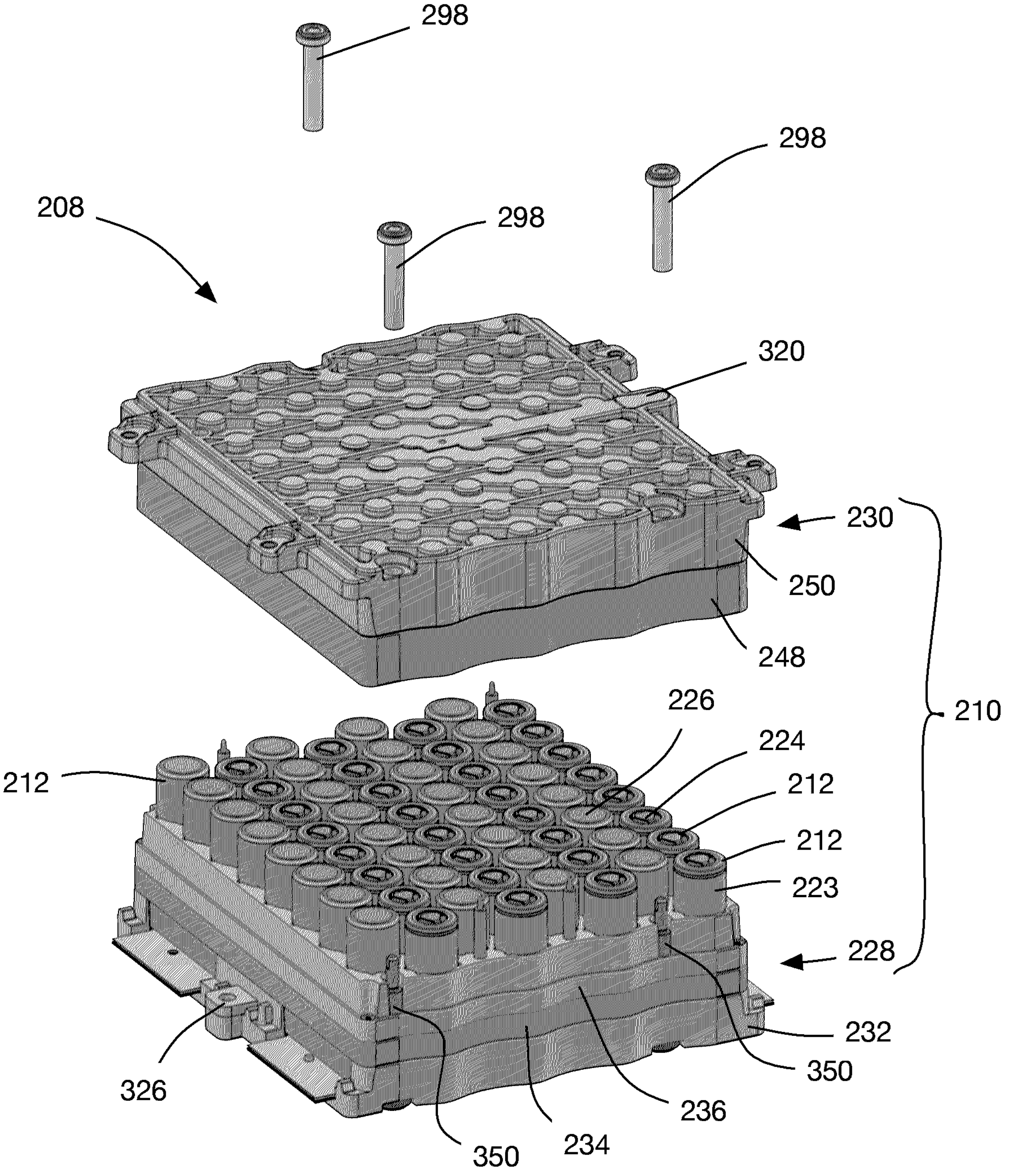
FIG. 15 is a partially exploded perspective view of the module shown in FIG. 14, showing a module cover and a module lower portion.

As best seen in FIGS. 15, 16 and 21, the plurality of cells 212 may include a first subset of cells shown at 212*a*, a second subset of cells shown at 212*b*, third a first subset of cells shown at 212*c*, a fourth subset of cells shown at 212*d*, a fifth subset of cells shown at 212*e*, a sixth subset of cells shown at 212*f*, a seventh subset of cells shown at 212*g*, and an eighth subset of cells shown at 212*h*. The eighth subset of cells 212*h*, may also be referred to as a final subset of cells 212*h*. While eight subsets of cells 212 are shown, it will be understood that any suitable number of subsets of cells 212 may be provided, though preferably an even number of subsets of cells 212 is provided.

Each subset of cells 212 may be one row of eight cells 212 in the module 208, as shown in FIGS. 15 and 16 in particular, such that the first subset of cells 212*a* is positioned at a first end 300 of the module 208, while the final subset of cells 212 (i.e. the eighth subset 212*h*) is provided at a second end (shown at 302) of the module 208. Thus, the eight cells 212 within each subset operate in parallel, and connect to a subsequent subset of eight cells 212, which also operate in parallel. In this configuration, the battery pack 200 may provide any suitable number of volts, such as, for example about 800V. In an alternative configuration, the cells 212 may be arranged such that each subset of cells 212 includes two rows of cells 212. As a result, each module 208 may include four subsets of cells 212 wherein in each subset, there are 16 cells 212 operating in parallel. In such an embodiment, the battery pack may generate about 400V instead of generating about 800V (assuming the total cell count for the battery pack 200 remains the same).

FIG. 21 shows a not-to-scale, and somewhat schematic, sectional view of two modules 208 (a first module 208*a* and a second module 208*b*), so as to illustrate the arrangement of the upper and lower bus bars 214 and 216 in the modules 208. Each module 208 may have four upper bus bars 214, including a first upper bus bar 214*a*, a second upper bus bar 214*b*, a third upper bus bar 214*c* and a fourth upper bus bar 214*d* all of which are connected together by the upper bus bar connecting matrix 260 to each other so as to form the upper bus bar array 258. The first upper bus bar 214*a* is in engagement with the positive cell terminals 224 of the first subset of cells 212*a* and the negative cell terminals 226 from the second subset of cells 212*b* so as to electrically connect the first subset of cells 212*a* with the second subset of cells 212*b*. The second upper bus bar 214*b* is in engagement with the positive cell terminals 224 of the third subset of cells 212*c* and the negative cell terminals 226 from the fourth subset of cells 212*d* so as to electrically connect the third subset of cells 212*c* with the fourth subset of cells 212*d*. The third upper bus bar 214*c* is in engagement with the positive cell terminals 224 of the fifth subset of cells 212*e* and the negative cell terminals 226 from the sixth subset of cells 212*f* so as to electrically connect the fifth subset of cells 212*e* with the sixth subset of cells 212*f*. The fourth upper bus bar 214*d* is in engagement with the positive cell terminals 224 of the seventh subset of cells 212*g* and the negative cell terminals 226 from the eighth subset of cells 212*h* so as to electrically connect the seventh subset of cells 212*e* with the eighth subset of cells 212*h*.

Additionally, there are four lower bus bars 216, including a first lower bus bar 216*a*, a second lower bus bar 216*b*, a third lower bus bar 216*c* and a fourth lower bus bar 216*d* all of which are connected together by a lower bus bar connecting matrix 261. The first lower bus bar 216*a* is in engagement with the positive cell terminals 224 of the second subset of cells 212*b* and the negative cell terminals 226 from the third subset of cells 212*c* so as to electrically connect the second subset of cells 212*b* with the third subset of cells 212*c*. The second lower bus bar 216*b* is in engagement with the positive cell terminals 224 of the fourth subset of cells 212*d* and the negative cell terminals 226 from the fifth subset of cells 212*e* so as to electrically connect the fourth subset of cells 212*d* with the fifth subset of cells 212*e*. The third lower bus bar 216*c* is in engagement with the positive cell terminals 224 of the sixth subset of cells 212*f* and the negative cell terminals 226 from the seventh subset of cells 212*g* so as to electrically connect the sixth subset of cells 212*f* with the seventh subset of cells 212*g*. The fourth lower bus bar 216*d* is in engagement with the positive cell terminals 224 of the eighth subset of cells 212*h* and the negative cell terminals 226 from the first subset of cells 212*a* of the next module 208 over (which may be referred to as the subsequent module) so as to electrically connect the eighth subset of cells 212*h* with the first subset of cells 212*a* of the subsequent module 208. Thus, the fourth lower bus bar 216*d* electrically connect the eighth subset of cells 212*h* from the first module 208*a* with the first subset of cells 212*a* of the second module 208*b*. Similarly, the fourth lower bus bar 216*d* electrically connect the eighth subset of cells 212*h* from the second module 208*b* with the first subset of cells 212*a* of a third module (not shown). The fourth lower bus bar 216*d* may be referred to as a bridging bus bar 216*d* since it provides a bridge from one module 208 to the subsequent module 208.

Referring to FIGS. 13A and 13B, the battery pack 200 may be arranged such that the plurality of modules 208 include a first subset of the plurality of modules 208 (wherein the first subset is shown at 304), a second subset (shown at 306) of the plurality of modules 208, a third subset (shown at 308) of the plurality of modules 208, and a fourth subset (shown at 310) of the plurality of modules 208. In the battery pack 200 that is shown, each of the subsets 304, 306, 308 and 310 of modules 208 includes six modules 208, however, the battery pack 200 could alternatively include more or fewer modules 208 in each subset of modules, and could include more or fewer subsets of modules 208.

Each module 208 in a subset of modules 208 is connected to a subsequent module 208 in the subset via the bridging bus bar 216*d*, except for a final module 208 in the subset, which is connected to a battery pack bus bar shown at 312, either for connection to a subsequent subset of modules 208, or, in the case of the final module (shown at 208*f*) in the fourth subset 310 of modules 208, for connection to a positive battery pack terminal 274. Additionally, the negative terminals 226 of the first subset of cells 212*a* on the first module 208*a* of the first subset 304 of modules 208, is connected to a battery pack bus bar 312 that is connected to a negative battery pack terminal 275. The positive and negative battery pack terminals 274 and 275 are used to electrically connect the battery pack 200 to one or more electrical elements in the vehicle 10, such as for example, the electric motor 13 or a charging system (not shown).

When describing a particular module 208, it may be said that the upper bus bar 214 and the plurality of cells 212 (along with the other upper bus bars 214 and lower bus bars 216 in the module 208) are electrically connected (along with a plurality of other modules 208) to the positive battery pack terminal 274 and the negative battery pack terminal 275 of the battery pack 200 in such a way as to form an electric circuit with the upper bus bar 214 and the plurality of cells 212, for charging and discharging the plurality of cells 212. Discharging of the cells 212 may occur, for example, during operation of the electric vehicle 11, by using the energy stored in the cells 212 to drive the electric motor 13, while charging of the cells 212 may occur during, for example, regenerative braking, or during charging of the vehicle 11 while the vehicle 11 is parked.

In the 400V configured described above, it would be understood that the module 208 would only include first and second upper bus bars 214*a* and 214*b* and first and second lower bus bars 216*a* and 216*b*, wherein each of the busbars 214 and 216 engages 16 cells 212 in parallel.

Lower Bus Bar Array Extends Through Entire Subsets of Modules

Figure 41:
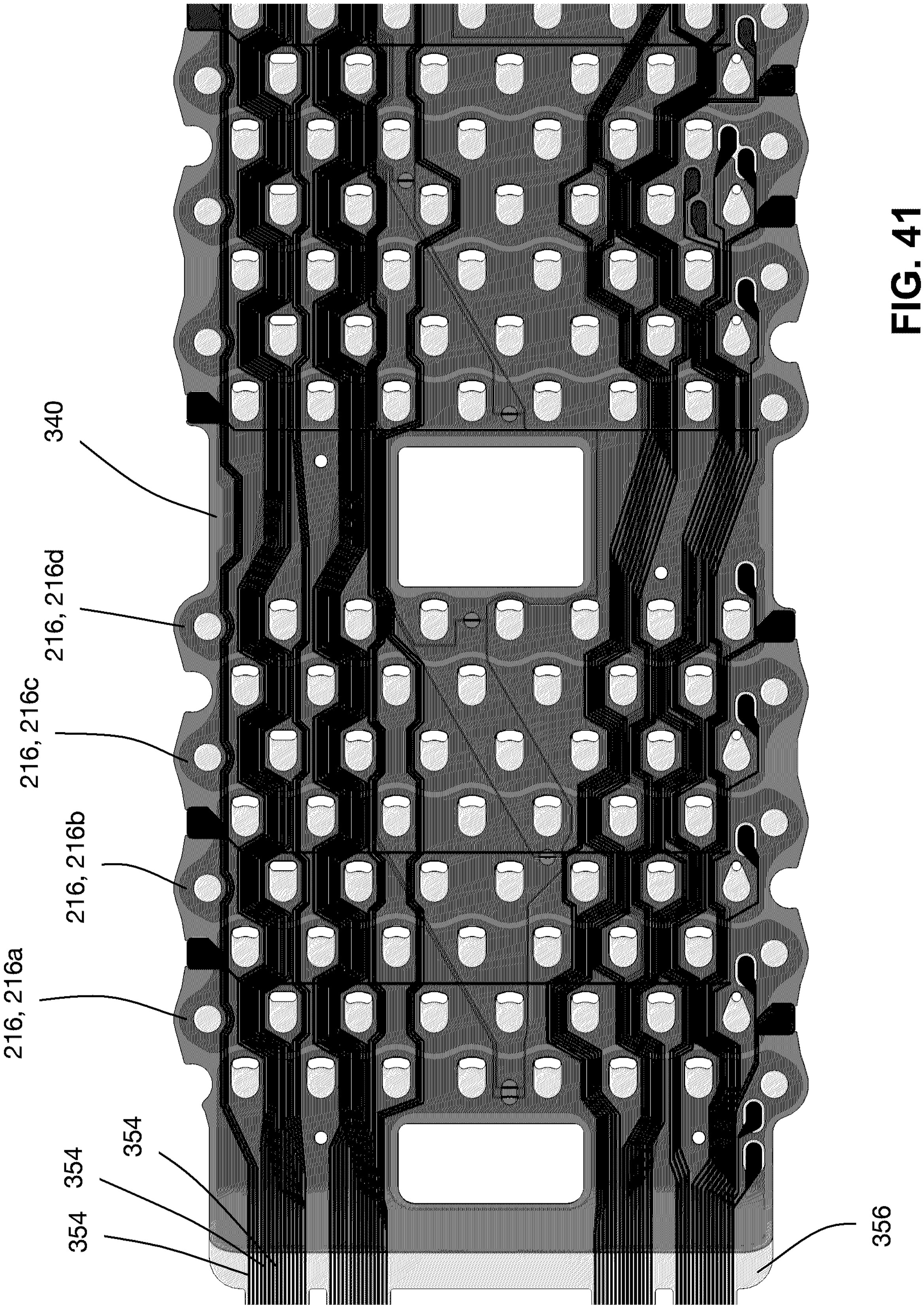
FIG. 41 is a plan view of a lower bus bar array of the battery pack shown in FIG. 12A.
Figure 42:
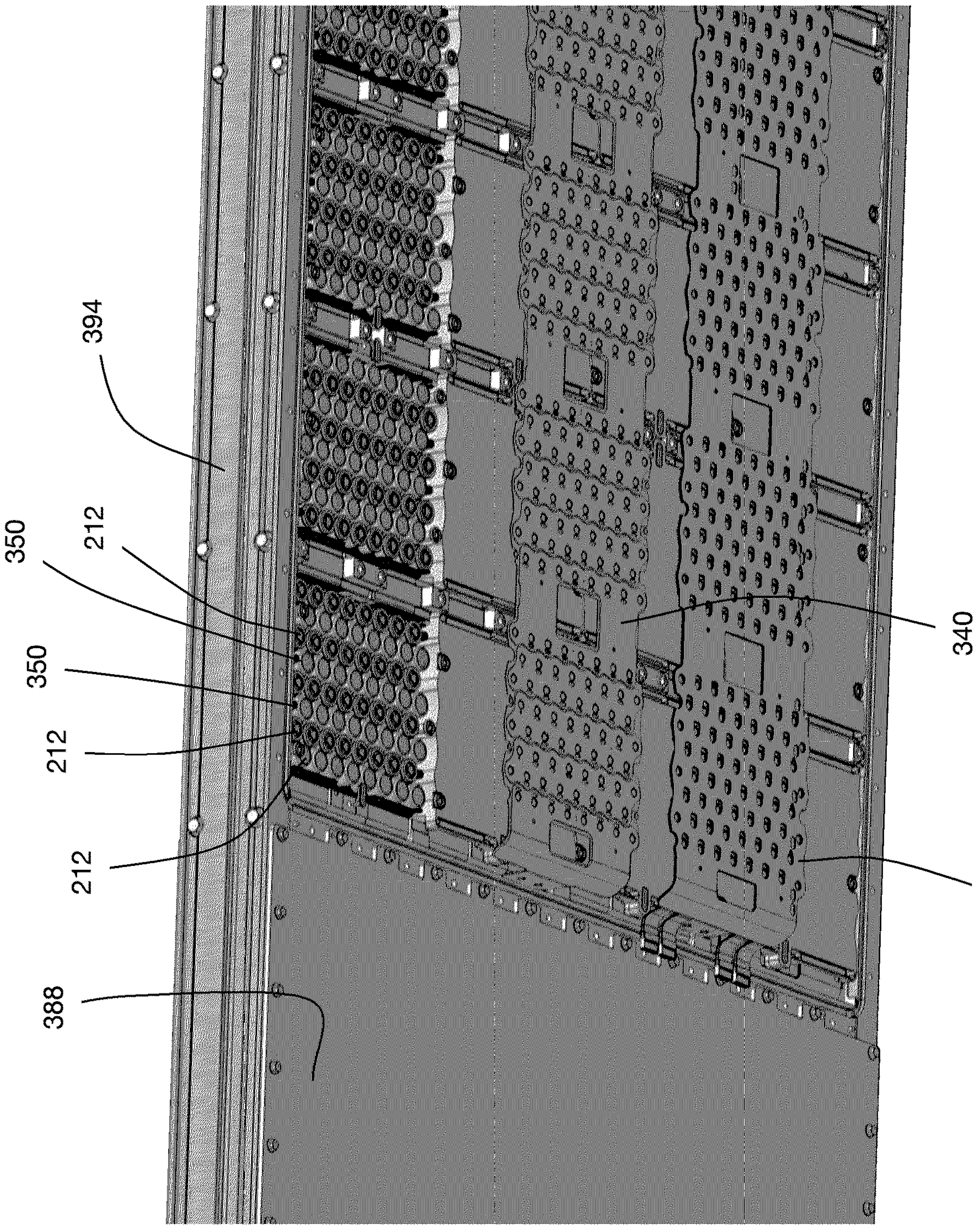
FIG. 42 is a perspective view of a portion of the battery pack shown in FIG. 12A, including a lower bus bar array thereof.
Figure 43:
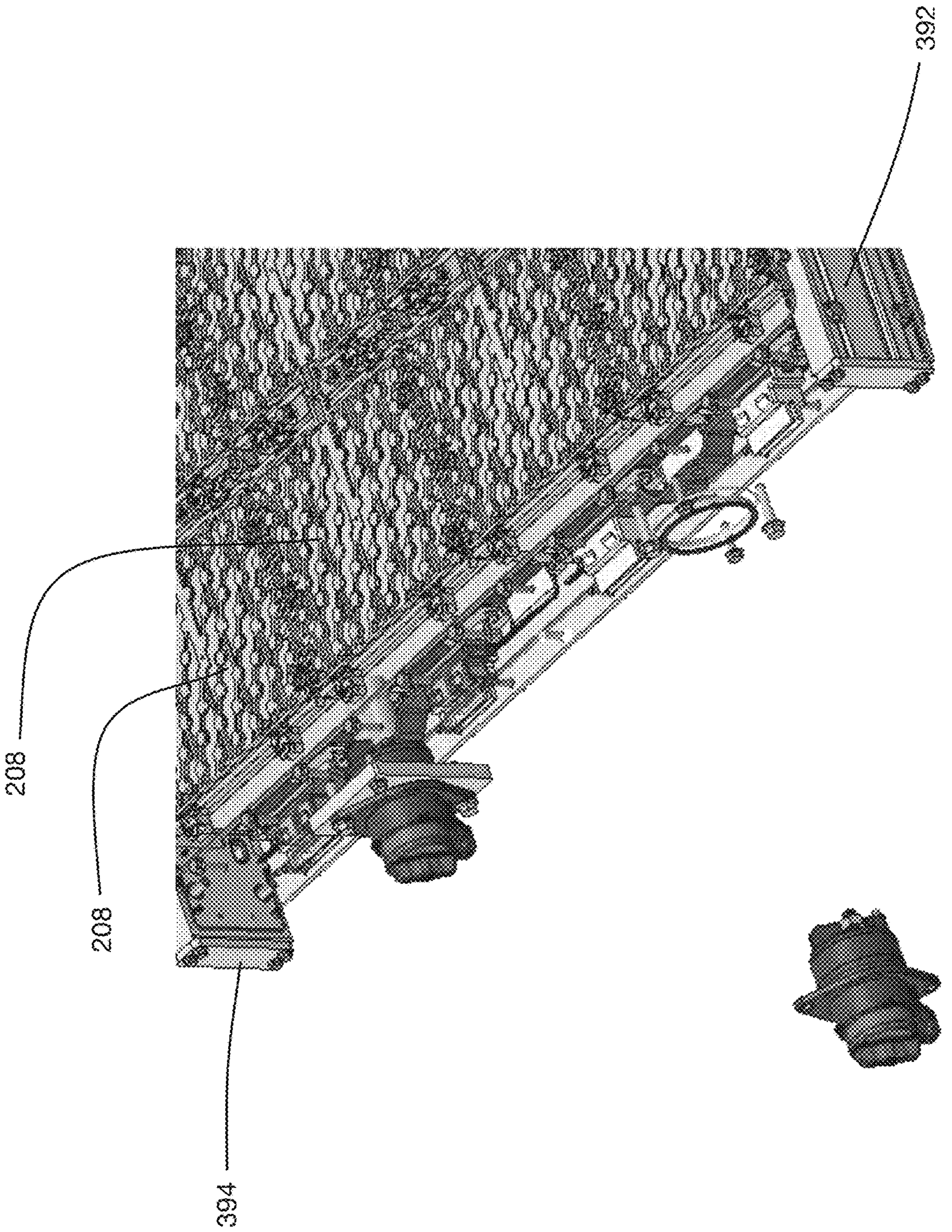
FIG. 43 is a perspective view of a portion of the battery pack shown in FIG. 12A, including modules, a first primary frame member, and a second primary frame thereof.

Reference is made to FIGS. 41 and 42, which show a lower bus bar array 340 that includes the lower bus bars 216 for all of the modules 208 in a single subset 304, 306, 308 or 310, and which are held together with a lower bus bar connecting matrix 342 that may be similar to the upper bus bar connecting matrix 260. The lower bus bar array 340 extends through suitable apertures in the module housings 210 in order to extend substantially the length of the battery pack wet chamber 204.

During operation of the battery pack 200, many measurements will be taken of certain properties of the battery pack 200, such as the temperature at selected regions of each module 208, and the voltages across each pair of upper and lower bus bars 214 and 216 (e.g. the pair of bus bars made up of the first upper bus bar 214*a* and the first lower bus bar 216*a*, the pair of bus bars made up of the second upper bus bar 214*b* and the second lower bus bar 216*b*, and so on). Sensors for measuring the voltages are provided at 350 generally. Since there are four pairs of upper and lower bus bars 214 and 216 in each module 208 in the example shown, there are four voltage sensors for each module, shown individually at 350*a*, 350*b*, 350*c* and 350*d* (seen best in FIG. 19). In order to transmit the signals from these voltage sensors 350 outside of the battery pack wet chamber 204 to a control system for the battery pack 200 (shown at 352 in FIGS. 46 and 47), a series of electrical traces 354 are provided on one or more flexible circuit boards 356 that may be mounted directly onto the lower bus bar array 340. In the embodiment shown, there are two such flexible circuit boards 356 that are laminated directly onto the lower bus bar array 340.

Springs Urging Bus Bar are not Part of the Electric Circuit Formed with the Cells For each upper bus bar 214 that is provided, at least one biasing member 262 is positioned between the module housing 210 and the upper bus bar 214, so as to urge the upper bus bar 214 against the positive cell terminals 224 of a first subset of cells shown at 264 from the plurality of cells 212 and the negative cell terminals 226 from a second subset of cells shown at 266 from the plurality of cells 212. The at least one biasing member 262 may be any suitable type of biasing member, such as, for example, a plurality of helical compression springs 269, including a helical compression spring 270 for each cell 212 from the first and second subsets of cells 264 and 266 from the plurality of cells 212. Each helical compression spring 270 has a first end 271 and a second end 272. The first end 271 is engaged with the upper bus bar 214 and the second end 272 is engaged with a seat 273 in the module housing 210 (e.g. in the top member 250) so as to urge the upper bus bar 214 against the positive cell terminals 224 of the first subset of cells 264 from the plurality of cells 212 and against the negative cell terminals 226 from the second subset of cells 266 from the plurality of cells 212. The seat 273 may be provided any suitable way. For example, the seat 273 may be a form that is directly molded into the top member 250, in embodiments in which the entire top member 250 is made from a non-electrically-conductive material (e.g. an electrically insulative material). The seat 273 may alternatively be a separate member that is mounted to the top member 250, and may itself be made from a non-electrically-conductive material. Regardless of how the seat 273 is provided, the presence of the seat 273 permits the at least one biasing member 262 to be made from a material that is most suitable for its use as a biasing member without regard to whether it is electrically conductive. Accordingly, the at least one biasing member 262 may be made from a material such as a metal that is electrically conductive.

The upper bus bar 214 and the plurality of cells 212 (along with the other upper bus bars 214 and lower bus bars 216 in the module 208) are electrically connected (along with a plurality of other modules 208) to a positive battery pack terminal 274 and a negative battery pack terminal 275 of the battery pack 200 in such a way as to form an electric circuit with the upper bus bar 214 and the plurality of cells 212, for charging and discharging the plurality of cells 212. Discharging of the cells 212 may occur, for example, during operation of the electric vehicle 11, by using the energy stored in the cells 212 to drive the electric motor 13.

As a result of the presence of the seat 273, the at least one biasing member 262 may be made from any suitable material without concern as to whether the at least one biasing member 262 is electrically conductive, since the seat 273 prevents current from the aforementioned electric circuit from passing through the at least one biasing member 262. Accordingly, the at least one biasing member 262 may be made from spring steel or any other suitable material.

Figure 22B:
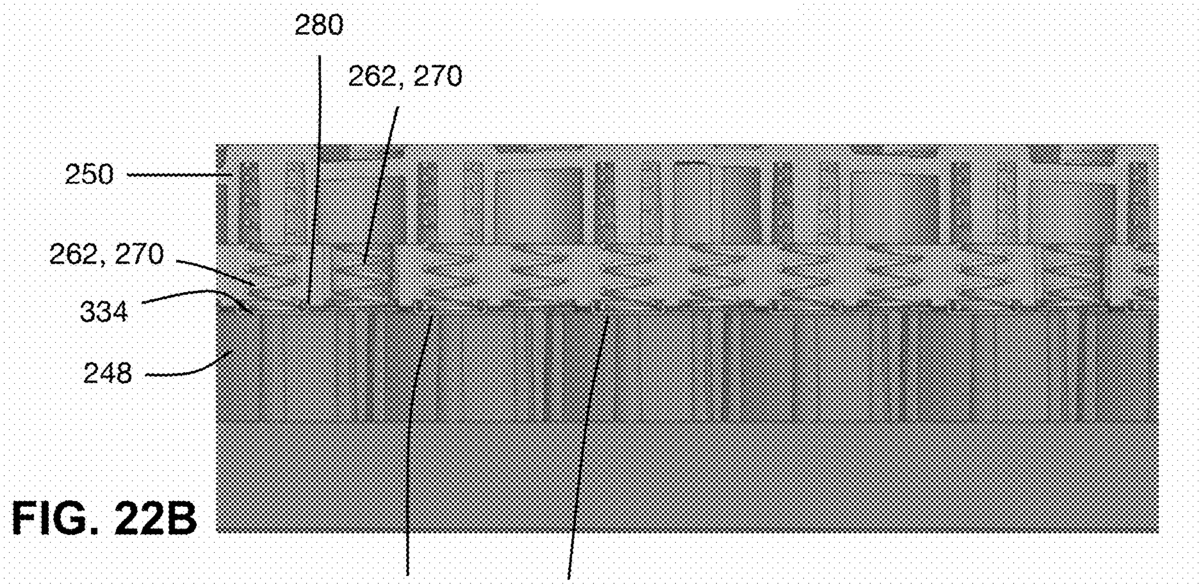
FIG. 22B is a side view of a portion of the module shown in FIG. 14, including an upper holder and a top member thereof.

As can be seen in FIG. 22B, the seat 273 may be relatively deep so that the helical compression spring 270 is prevented from buckling during use. In the embodiment shown, the seat 273 may have a depth Ds that is greater than one half of the length of the helical compression spring 270. Additionally, as an option, the seat 273 may include both a surround for surrounding the helical compression spring 270 and also a center pin 279 that is received in the central aperture of the helical compression spring 270.

In other embodiments a seat that is non-electrically conductive may be provided at the first end 271 of the helical compression spring 270 in order to electrically insulate the helical compression spring 270 from the upper bus bar 214.

In yet other embodiments the at least one biasing member 262 may be made from a suitable metal that is electrically conductive, but may have a coating of a non-electrically conductive material in order to ensure that the at least one biasing member 262 does not form part of the electric circuit.

In still other embodiments, the at least one biasing member 262 may be made from an electrically conductive material but may be other than a plurality of helical compression springs 270. For example, the at least one biasing member 262 may be a plurality of wave springs, such as the Smalley™ wave spring, a plurality of disc springs, a plurality of wave washers, or any other suitable type of spring.

In still other embodiments, the at least one biasing member 262 may be made from a material that is made from a non-electrically conductive material such as a suitable elastomeric material, a closed-cell foam, or some other suitable material.

Flat Contact Between Bus Bar and Cells

Figure 23:
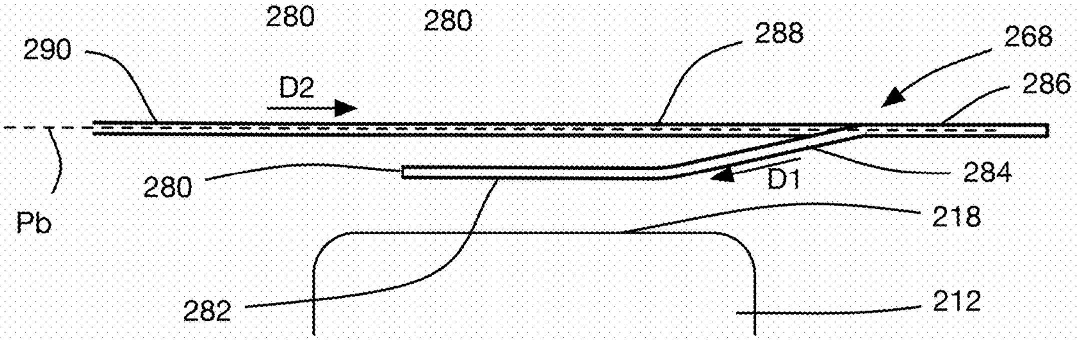
FIG. 23 is a side view of a portion of the module shown in FIG. 14, including an exaggerated representation of the contact arrangement thereof when the upper bus bar is in an unflexed condition.
Figure 24:
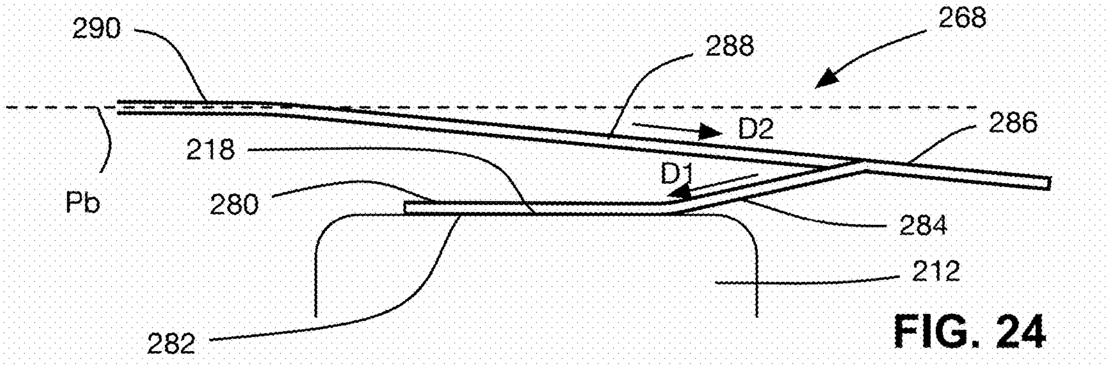
FIG. 24 is a side view of a portion of the module shown in FIG. 14, including an exaggerated representation of the contact arrangement thereof when the upper bus bar is flexed by the at least one biasing member.

Referring to FIGS. 20, 23 and 24, for each cell 212 from the first and second subsets of cells 264 and 266 from the plurality of cells 212, the upper bus bar 214 has a contact arrangement 268 that includes a contact element 280 having a contact surface 282 that is in contact with one of the positive and negative terminals 224 and 226 of the aforementioned cells 212 from the first and second subsets of cells 264 and 266. Each contact arrangement 268 further includes a first flex arm 284 that extends from the contact element 280 to a first arm support 286, and a second flex arm 288 that extends from the first arm support 286 to a second arm support 290.

FIGS. 23 and 24 are an exaggerated representation of the contact arrangement 268 when the upper bus bar 214 is in an unflexed condition and when the upper bus bar 214 is flexed by the at least one biasing member 262, respectively. When the upper bus bar 214 is in an unflexed condition as shown in FIG. 23, the second arm support 290 defines a bus bar plane Pb. The first flex arm 284 and the second flex arm 288 are positioned such that flexure of the first flex arm 284 relative to the first arm support 286, and flexure of the second flex arm 288 relative to the second arm support 290 together position the contact surface 282 of the contact element 280 to be parallel to but offset from the bus bar plane Pb, as shown in FIG. 24. It will be understood that the contact surface 282 may be parallel to and offset from the bus bar plane Pb even when the upper bus bar 214 is in the unflexed condition as shown in FIG. 23, however the presence of the first contact arrangement 268 that permits flexure of the upper bus bar 214 while remaining parallel to and while being further offset from the bus bar plane Pb is nonetheless advantageous.

Figure 19:
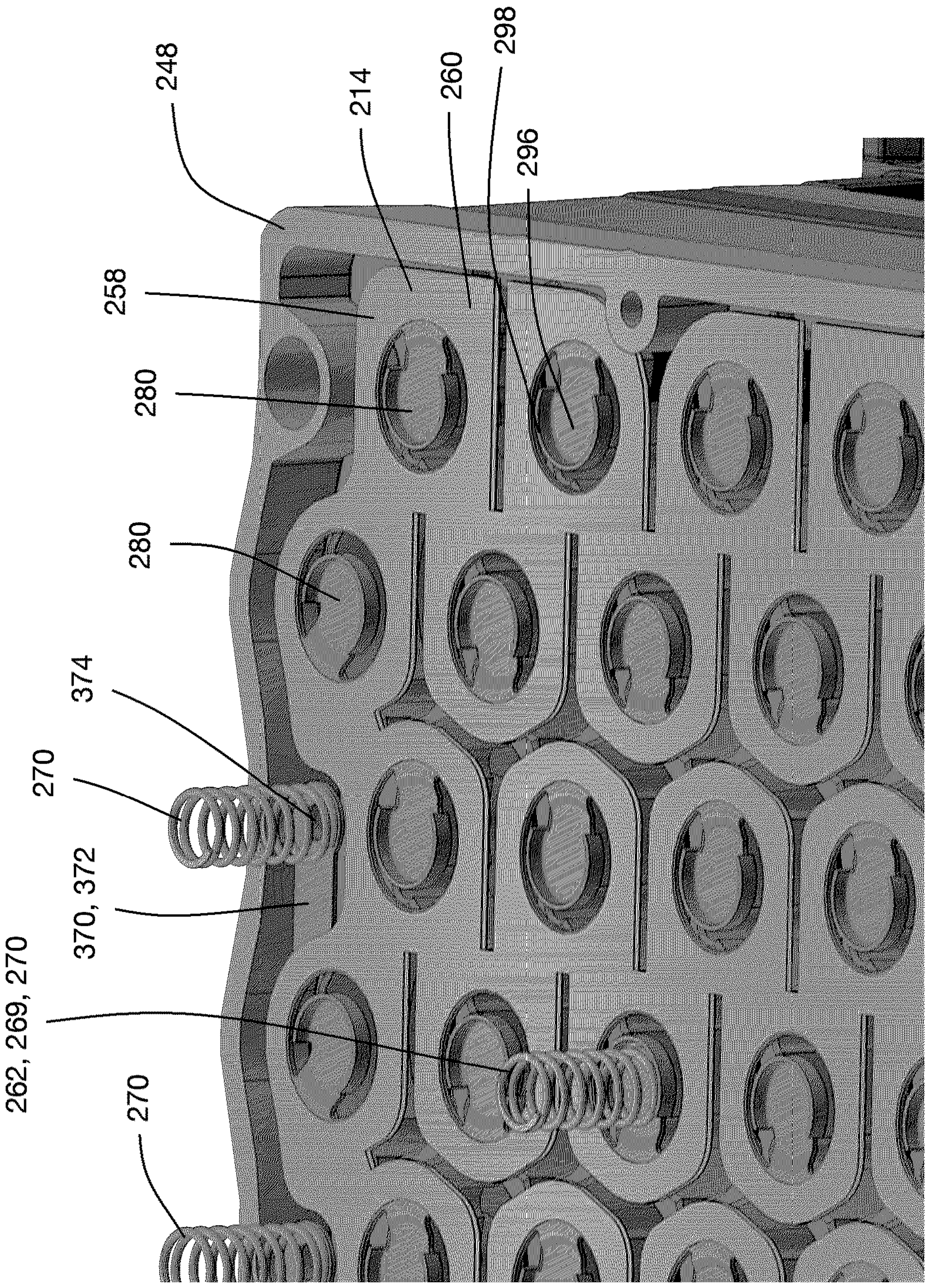
FIG. 19 is a perspective view of a portion of the module shown in FIG. 14, including the upper bus bar thereof.

In the embodiment shown in FIGS. 19 and 20, the first flex arm 284 extends from the first arm support 286 towards the contact element 280 in a first arm direction (shown at D1), and the second flex arm 288 extends from the second arm support 290 towards the first arm support 286 in a second arm direction D2 that is generally opposite the first arm direction D1. An example of this can be seen for the contact element shown at 280*a*.

For the purposes of the present description, the term generally opposite means within about 30 degrees angularly of being precisely opposite.

In the embodiment shown in FIGS. 19 and 20, the first arm support 286 is an enclosed, hollow shape and the first flex arm 284 is connected to the enclosed, hollow shape at a first connection region 292, while the second flex arm 288 is connected to the enclosed, hollow shape at a second connection region 294. As can be seen, for the contact element 280*a*, the second connection region 294 is positioned opposite to the first connection region 292 about the enclosed hollow shape. The enclosed hollow shape of the first arm support 286 may be a circular ring as shown in FIGS. 19 and 20. Thus, for the contact element 280*a*, the first connection region 292 and the second connection region 294 may be said to be positioned diametrically opposite one another.

In order to facilitate keeping the contact surface 282 parallel to the bus bar plane Bp, the cross-sectional area of the first flex arm 284 (which may be referred to as a first arm cross-sectional area) may be approximately the same as the cross-sectional area of the second flex arm 288 (which may be referred to as a second arm cross-sectional area). Since the upper bus bar 214 may be formed from a sheet of material (e.g. copper sheet), which has a generally consistent thickness throughout, elements having approximately the same width will have approximately the same cross-sectional area. The width W1 of the first flex arm 284 can be seen to be approximately the same as the width W2 of the second flex arm 288, at least for the contact element 280*a*. It will be noted that, for certain configurations of the upper bus bar 214 certain parts may act as different things in relation to different contact elements 280. For example, the second flex arm support shown at 290*a* for supporting the second flex arm shown at 288*a* for the first contact element 280*a*, may also be the first arm support shown at 286*b* for supporting the first flex arm shown at 284*b*, for a second contact element 280*b*.

For greater certainty, the upper bus bar connecting matrix 260 that connects the first upper bus bar shown at 214*a* to the second upper bus bar shown at 214*b* may be considered to not be a second flex arm, since it is made up only of polymer and does not include metal, and is consequently much less stiff than the material of the upper bus bars 214*a* and 214*b*.

With continued reference to FIGS. 19 and 20, each contact element 280 may include a receiving surface 296 that is engaged by the first end 271 of the helical compression spring 270 and a guide wall 298 that at least partially surrounds the first end 271 of the helical compression spring 270, thereby inhibiting the helical compression spring 270 from slipping out of engagement with the contact element 280 during use.

By ensuring that the contact element 280 sits flat on the associated positive or negative terminal 224 or 226 as the case may be, of the associated cell 212, there is good contact between the contact element 280 and the cell 212, which provided for reduced electrical resistance at the connection therebetween. This in turn reduces the amount of heat that is generated at the connection, which reduces the amount of work that is needed of the coolant in order to control the temperature of the cell 212 during operation of the electric vehicle 11.

It will be noted, for example, that, in the context of describing the arrangement of the upper bus bar 214 so as to provide for flat contact between the contact element 280 and the associated cell 212, it is not important what the material of the at least one biasing member 262 is. Accordingly, the at least one biasing member 262 could be a layer of closed-cell foam, for example, which is electrically insulative.

Removal of Bus Bar When Removing Module Cover—Automatic Electrical Disconnection of Cells In order to access the cells 212 in one of the modules 208, a user removes the module cover 230. This may be accomplished by loosening (or entirely removing) the three mechanical fasteners shown at 298 in FIG. 14. The mechanical fasteners 298 may be threaded fasteners, for example, or any other suitable type of fastener. Upon loosening or removing the mechanical fasteners 298, the module cover 230 may be lifted off (FIG. 15) the lower housing portion 228, which exposes the plurality of cells 212 contained within the module housing 210. As noted above, the upper bus bar 214 is connected to the module cover 230. As a result, when the module cover 230 is removed from the lower housing portion 228 to expose the cells 212, the upper bus bar 214 is automatically removed with it, which automatically opens the electrical circuit that the upper bus bar 214 was a part of. As a result, the user may touch and remove any cell without being exposed to more than the voltage of that particular cell. Thus, removing the module cover 230 in order to gain access to the cells 212 automatically breaks the circuit that the cells 212 were a part of, which renders the act of accessing the cells 212 (e.g. for removal or replacement) more safe than in some battery packs of the prior art, and particularly battery packs in which the electrical conduits to the cells are welded to the cells.

The upper bus bar 214 may be mounted to the module cover 230 in any suitable way. As shown in FIG. 22B, the upper bus bar 214 may be captured between the upper holder 248 and the top member 250. The upper holder 248 may be connected to the top member 250 by any suitable means, such as by a plurality of mechanical fasteners shown at 314 (FIG. 16).

Worded a different way, the module cover 230 is removably mounted to the lower housing portion 228 to hold the upper bus bar 214 in engagement with the positive cell terminals 224 of the first subset of cells 212*a* and the negative cell terminals 226 from the second subset of cells 212*b* so as to electrically connect the first subset of cells 212*a* with the second subset of cells 212*b*, and is removable therefrom so as to remove the upper bus bar 214 from engagement with the first subset and second subsets of cells 212*a* and 212*b*, so as to expose the plurality of cells 212 while also electrically disconnecting the first subset of cells 212*a* from the second subset of cells 212*b*, so as to permit removal of at least one of the plurality of cells 212 from the lower housing portion 228.

In the context of the overall battery pack 200, it will be understood that, mounting the module covers 230 to the lower housing portions 228 of all of the modules 208 from the first subset 304 of modules 208 electrically connects all of the modules 208 from the first subset of modules 208 together to provide an electrical flow path through the first subset of modules 304. Removal of any one of the module covers 230 from the lower housing portions 228 of any of the modules 208 from the first subset of modules 208 breaks the electrical flow path through the first subset of modules 208.

Low Spring Force Against Upper Bus Bar

FIG. 22B shows the module cover 230 when not installed on the lower housing portion 228 (i.e. in a pre-installation position). In this position, the upper bus bar 214 is urged by the at least one biasing member 262 into engagement with the top surface (shown at 334) of the upper holder 248. Accordingly, the top surface 334 may be referred to as a bus bar support surface 334 of the module cover 230. It will be noted that it is advantageous for the upper bus bar 214 to be as flexible as possible, so as to reduce the amount of force that is required from the at least one biasing member 262 in order to provide for flat engagement between the contact elements 280 and the cells 212. However, it will be understood that, when the module cover 214 is not installed on the lower housing portion 228, the at least one biasing member (e.g. the helical compression springs 270) may exert a force against the contact elements 280, which are simply supported in cantilever. It is therefore advantageous for the force exerted by the at least one biasing member 262 to be as low as possible to as to avoid damaging the first and second flex arms 284 and 288.

The at least one biasing member 262 also has sufficient travel to permit movement of the upper bus bar 214 from the pre-installation position shown in FIG. 22B to the installation position shown in FIG. 22A, when the module cover 230 is installed on the lower housing portion 228, so as to apply a small force (optionally, essentially zero) against the upper bus bar 214 to keep it against the bus bar support surface 334 when the module cover 230 is not installed on the lower housing portion 228, while also not applying an excessive force on the contact elements 280 in order to keep them in flat engagement with the cells 212 (i.e. with the positive and negative terminals 224 and 226 of the cells 212).

The axial position of the bus bar support surface 334 relative to the position of the top ends 218 of the cells 212 may be selected to be a selected distance in order to keep the force applied by the at least one biasing member 262 on the contact elements 280 to be less than about 30 N when the upper bus bar 212 is supported on the bus bar support surface 334. In embodiments wherein there is a biasing member (such as the helical compression spring 270) for each contact element 280, the biasing force applied by the biasing member on each contact element 280 may be well below 30 N and may be in some embodiments between about 3 N and 2 N, or even less than 2 N.

Voltage Taps

FIGS. 22A and 22B illustrate how the voltage sensors 350 are configured, while still permitting the module cover 230 to be removed and installed on the lower housing portion 228. Each voltage sensor 350 includes an electrical conductor 360 that may be a solid rod made from a conductive material such as copper (and which may be referred to as a voltage measurement rod 360), which is fixedly mounted (e.g. to the lower housing portion 228) in contact with the lower bus bar 216 and in engagement with a trace 354 on one of the flexible circuit boards 356. The electrical conductor 360 extends upwards from the lower bus bar 216 to a top end shown at 362 (also referred to as its free end 362, particularly in embodiments in which it isn't at the top of the electrical conductor 360). At the free end 362, there is a shoulder 364, a guide projection 366 (which together may be referred to as a bus bar engagement feature 368). The upper bus bar 214 has a rod engagement feature 370 that may be, for example, a tab 372 with a tab aperture 374 thereon, that is sized to receive the guide projection 366 therethrough. The tab 372 is positioned to rest against the shoulder 364 of the voltage measurement rod 360. In some embodiments, the at least one biasing member 262 includes a dedicated tab biasing member which may be one of the helical compression springs 270.

In some embodiments, it is possible for the voltage measurement rods 360 to be mounted to the module cover 230 so as to be fixedly in contact with the upper bus bars 214 and to removably engage the lower bus bars 216 when the module cover 230 is mounted to the lower housing portion 228.

Based on the above, it may, therefore, be said that the voltage measurement rod 360 is mounted to one of the module cover 230 and the lower housing portion 228 in electrical connection with one of the upper and lower bus bars 214 and 216, and extends from said one of the module cover 230 and the lower housing portion 228. It may further be said that the other of the upper and lower bus bars 214 and 216 has a rod engagement feature 370 thereon that is positioned to removably engage the voltage measurement rod 360 by mounting of the module cover 230 onto the lower housing portion 228. The module 208 further includes a signal conduit (e.g. the associated trace 354 that is mounted to the lower housing portion 228 (by being mounted to the lower bus bar 216, which is itself mounted in the lower housing portion 228) for transmitting a voltage measurement between the upper and lower bus bars 214 and 216 to a controller.

Optionally, the guide projections 366 on the voltage measurement rods 360 are tapered (e.g. conical) in order to facilitate guiding the voltage measurement rods 360 into the tab apertures 374 to ensure that the tabs 372 engage the shoulders 364.

Coolant Flow Through the Frame

Reference is made to FIGS. 12, 13, 14 and 28, which shows the battery pack 200. As noted above, the battery pack housing 202 in the example shown, includes the battery pack wet chamber 204 (which is filled with coolant 322), and the battery pack dry chamber 206 which is not filled with coolant 322. The battery pack housing 202 includes a battery pack frame 380, a first battery pack cover 382 and a second battery pack 384 which cooperate with the battery pack frame 380 to define the battery pack wet chamber 204. A third battery pack cover 386 and a fourth battery pack cover 388 cooperate to define the battery pack dry chamber 206 in embodiments in which the battery pack dry chamber 206 is provided.

As shown in FIG. 28, the battery pack frame 380 includes a plurality of frame members 390 that are mounted to one another. In the embodiment shown, the frame members 390 may be separate elements that are connected to one another via mechanical fasteners or by welding or any other suitable joining method. In some embodiments, the frame members 390 may be formed all together via 3D printing or the like. In the example shown, the frame members 390 include a first primary frame member 392, a second primary frame member 394, a plurality of cross-members 396 that may be categorized into a plurality of secondary frame members 398 and a plurality of tertiary frame members 400.

The battery pack 200 includes at least a portion of a coolant circuit, shown at 402, for circulating coolant from a coolant source (shown at 404 in FIG. 28), and through the battery pack wet chamber 204 in order to carry out heat transfer with the plurality of cells 212 (shown in other figures).

In the present example, at least one of the plurality of frame members 390 directly defines a frame member conduit 406 that makes up part of the coolant circuit 402. In the present example, substantially all of the frame members 390 define frame member conduits 406.

Figure 29:
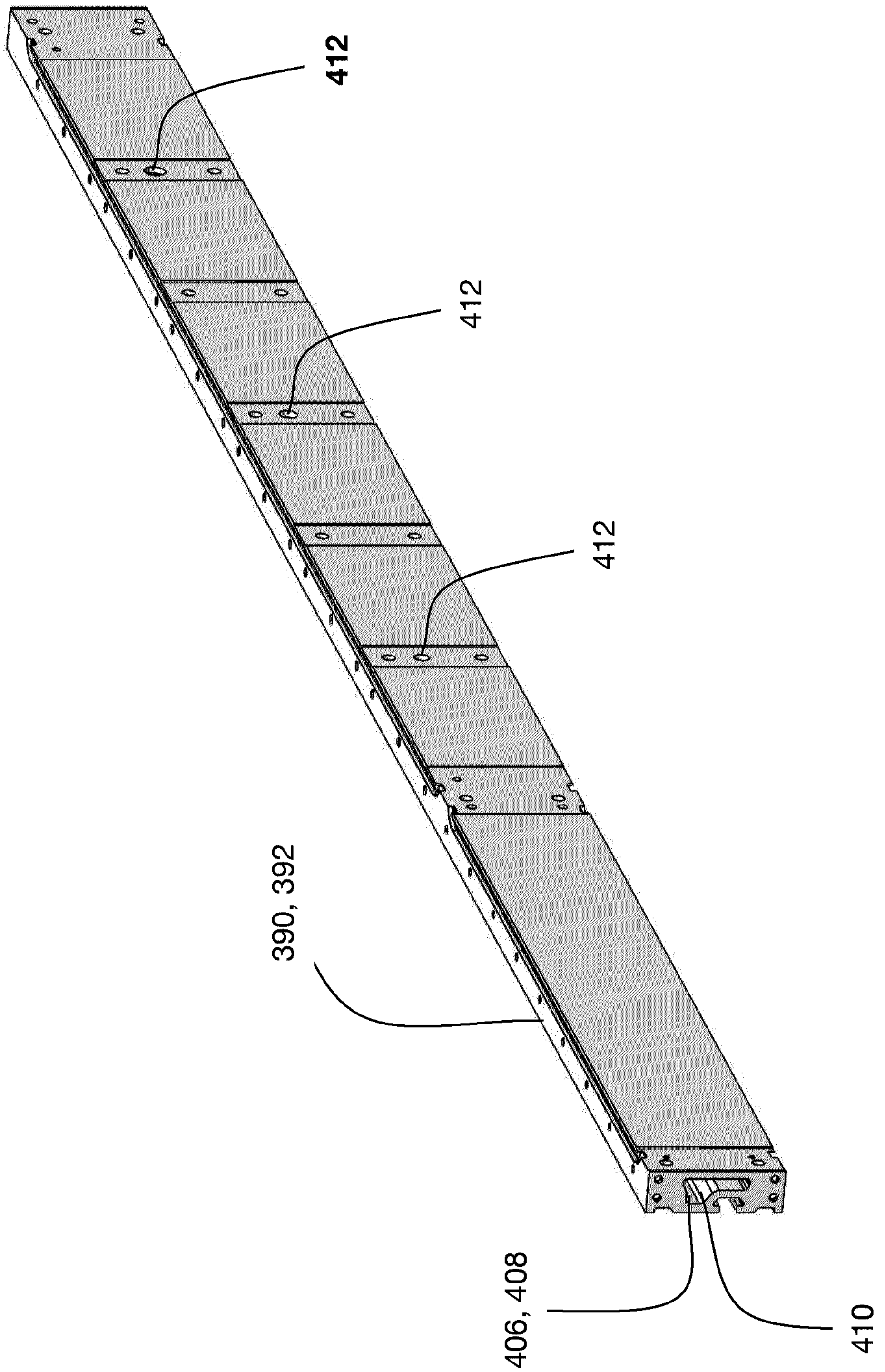
FIG. 29 is a perspective view of a first primary frame member of the battery pack shown in FIG. 12A.
Figure 30:
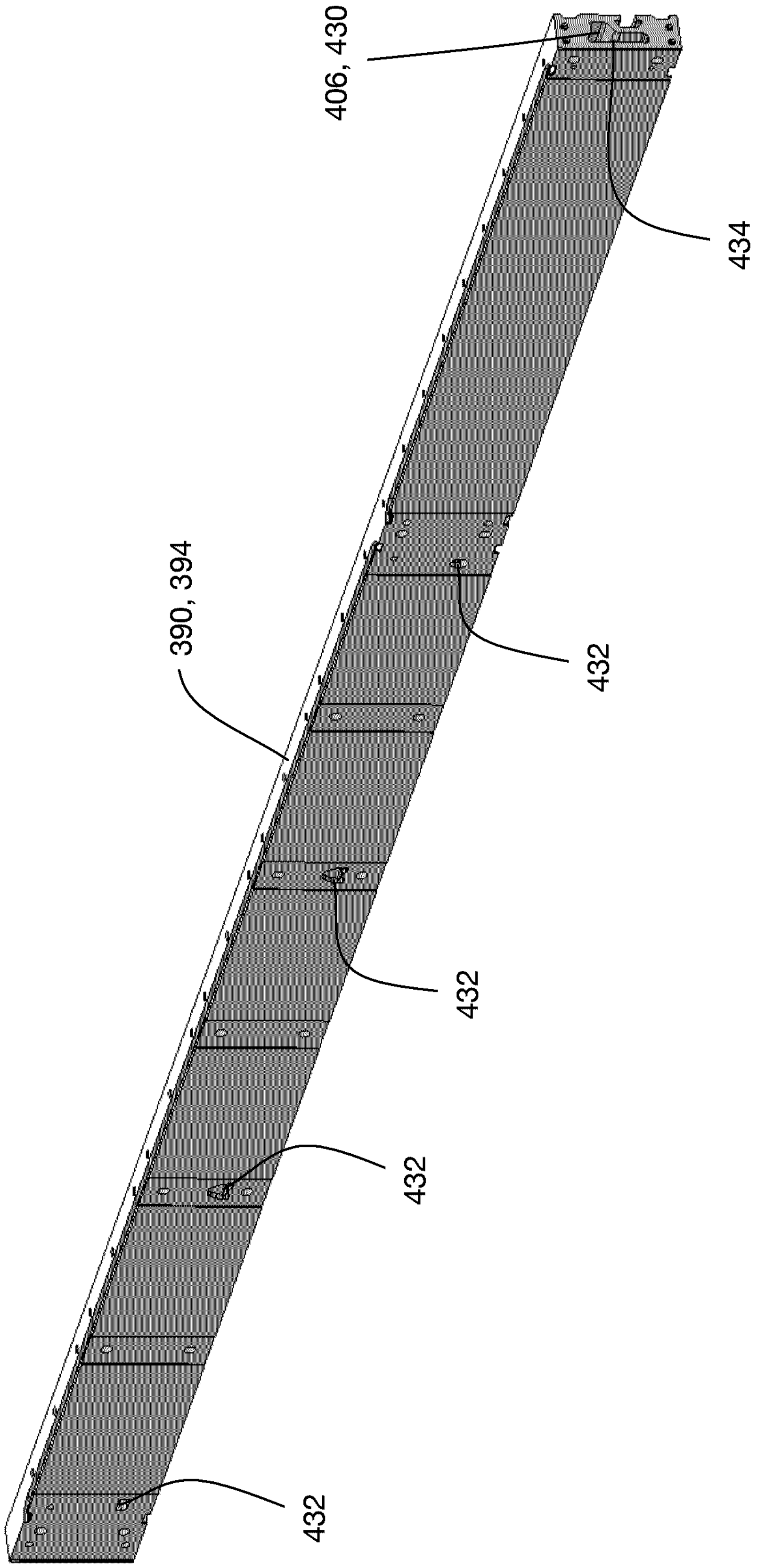
FIG. 30 is a perspective view of a secondary primary frame member of the battery pack shown in FIG. 12A.

FIG. 29 shows the first primary frame member 392. The frame member conduit 406 may be referred to as an inlet header 408, which has an inlet header inlet 410 that is fluidically connected to and downstream from the coolant source 404, and has a plurality of inlet header outlets 412.

Each of the inlet header outlets 412 has a selected size. The sizes of the inlet header outlets 412 are selected so as to provide flow rates of coolant through the inlet header outlets 412 that are all within about 50% of one another. In some embodiments, the flow rates may all be within 30% of one another. In some further embodiments, the flow rates may all be within 15% of one another.

Figure 31:
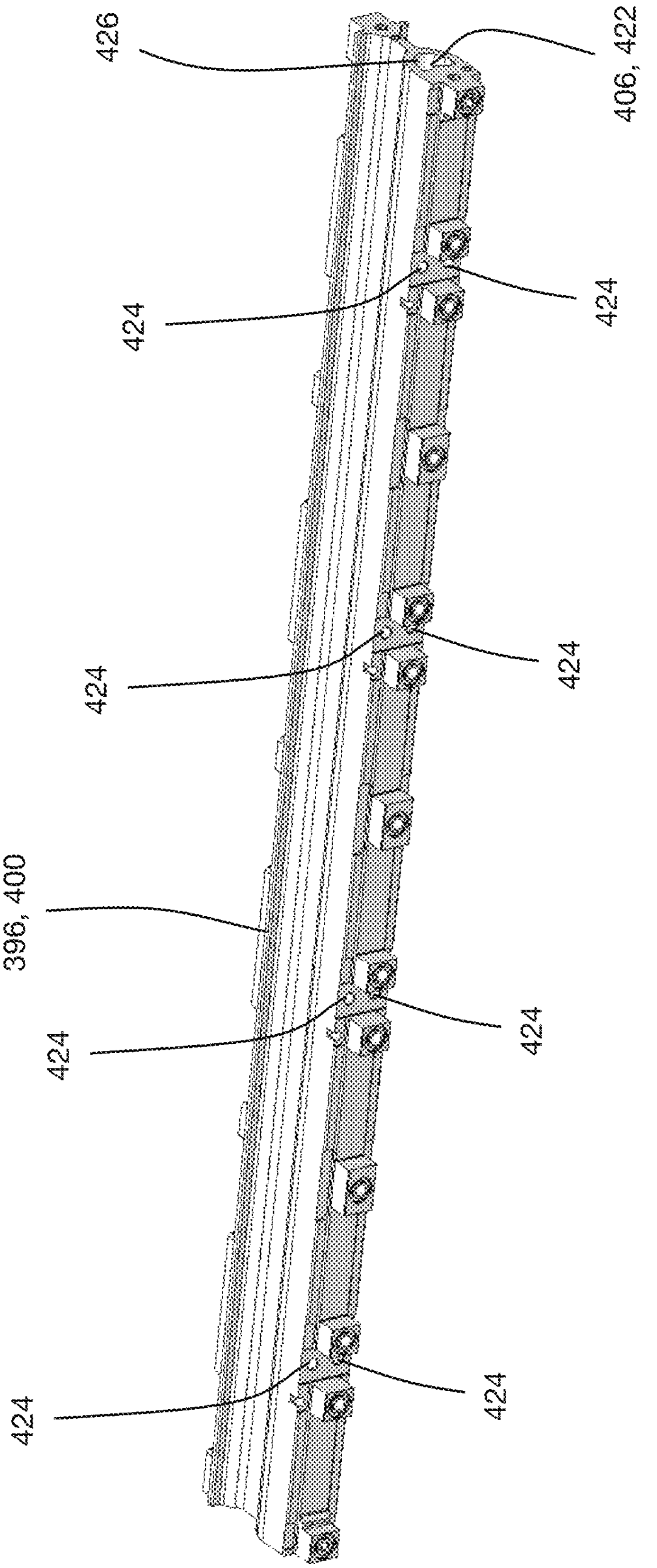
FIG. 31 is a perspective view of a secondary primary frame member of the battery pack shown in FIG. 12A.

Reference is made to FIG. 31, which shows one of the secondary frame members 398. Each secondary frame member 398 defines a secondary conduit 414 that has a secondary conduit inlet 416 and a plurality of secondary conduit outlets 418. Each secondary conduit outlet 418 discharges coolant to an associated subset of cells (e.g. to an associated module 208).

Each of the secondary conduit outlets 418 has a size. The sizes of the secondary conduit outlets 418 are selected so as to provide flow rates of coolant through the secondary conduit outlets that are all within about 50% of one another. In some embodiments, the flow rates may all be within 30% of one another. In some further embodiments, the flow rates may all be within 15% of one another.

The coolant flows from the secondary conduit outlets 418 into the modules 208 of the battery pack 200 axially through each module 208, and then out from the modules 208. FIG. 33 shows the top member 250 with the coolant inlet 320 for the associated module 208, and a plurality of guides 420 and partitions 422 which direct the coolant to distribute throughout the inlet chamber 328 so as to provide relatively even flow throughout the inlet chamber 328 and axially down through the module 208.

Figure 32:
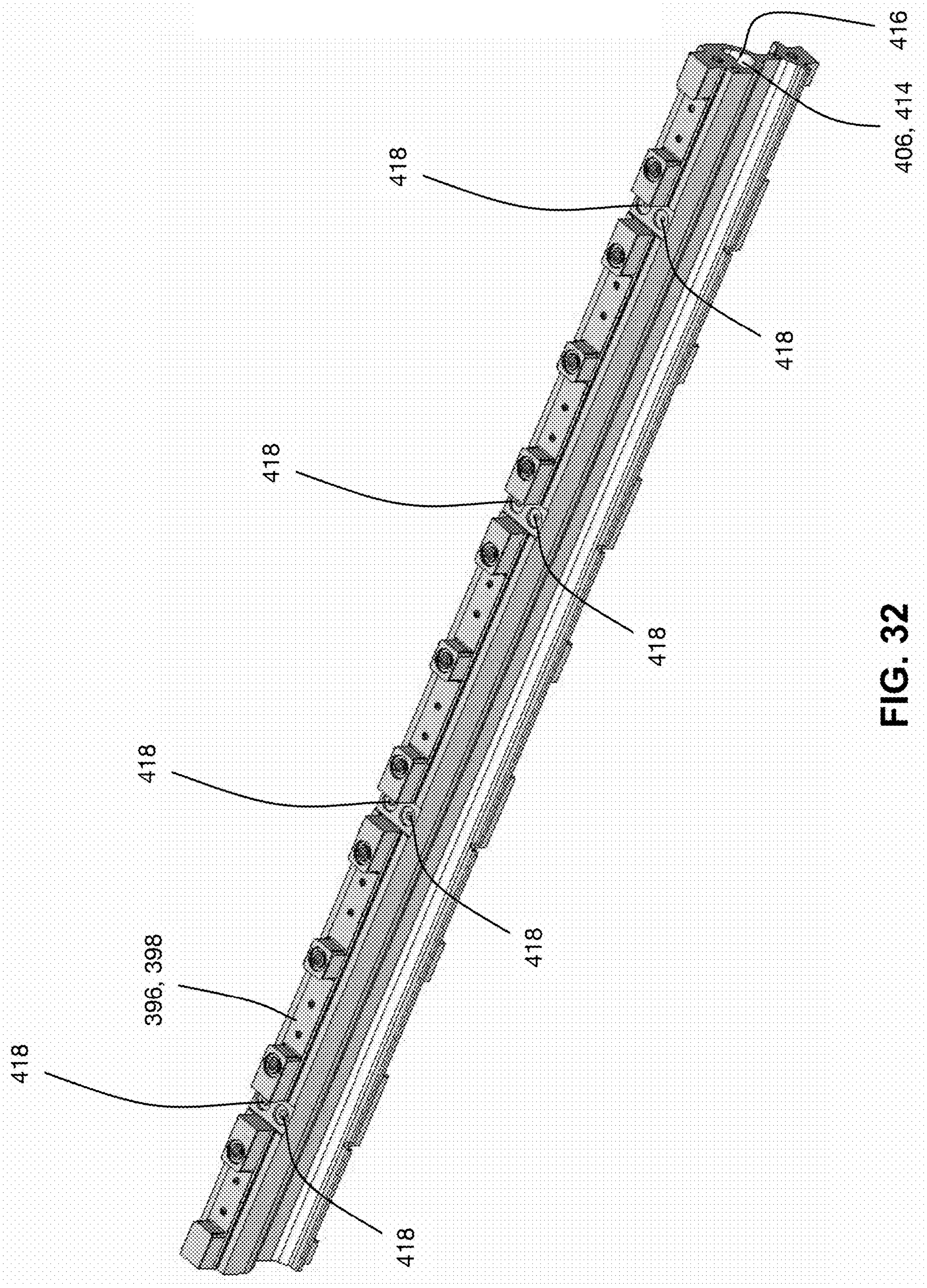
FIG. 32 is a perspective view of a tertiary primary frame member of the battery pack shown in FIG. 12A.

Reference is made to FIG. 32, which shows one of the tertiary frame members 400. The tertiary frame members 400 extend from the first primary frame member 392 through the plurality of cells 212. Each of the tertiary frame members 400 defines a tertiary conduit 422 having a plurality of tertiary conduit inlets 424 and a tertiary conduit outlet 426. Each tertiary conduit inlet 424 receives coolant from the associated subset of cells 212 (e.g. from the coolant outlet from the associated module 208).

Referring to FIG. 29, the second primary frame member 394 defines an outlet header 430 having a plurality of outlet header inlets 432 each of which is fluidically connected to and downstream from one of the plurality of tertiary conduits 422, and has an outlet header outlet 434 that is upstream from the coolant source 404 (FIG. 28).

The coolant 322 that flows through the coolant circuit may be any suitable type of coolant, such as a dielectric coolant that is electrically insulative. An example of a suitable coolant in some embodiments may be AmpCool® AC-110 Dielectric Coolant.

Figure 38:
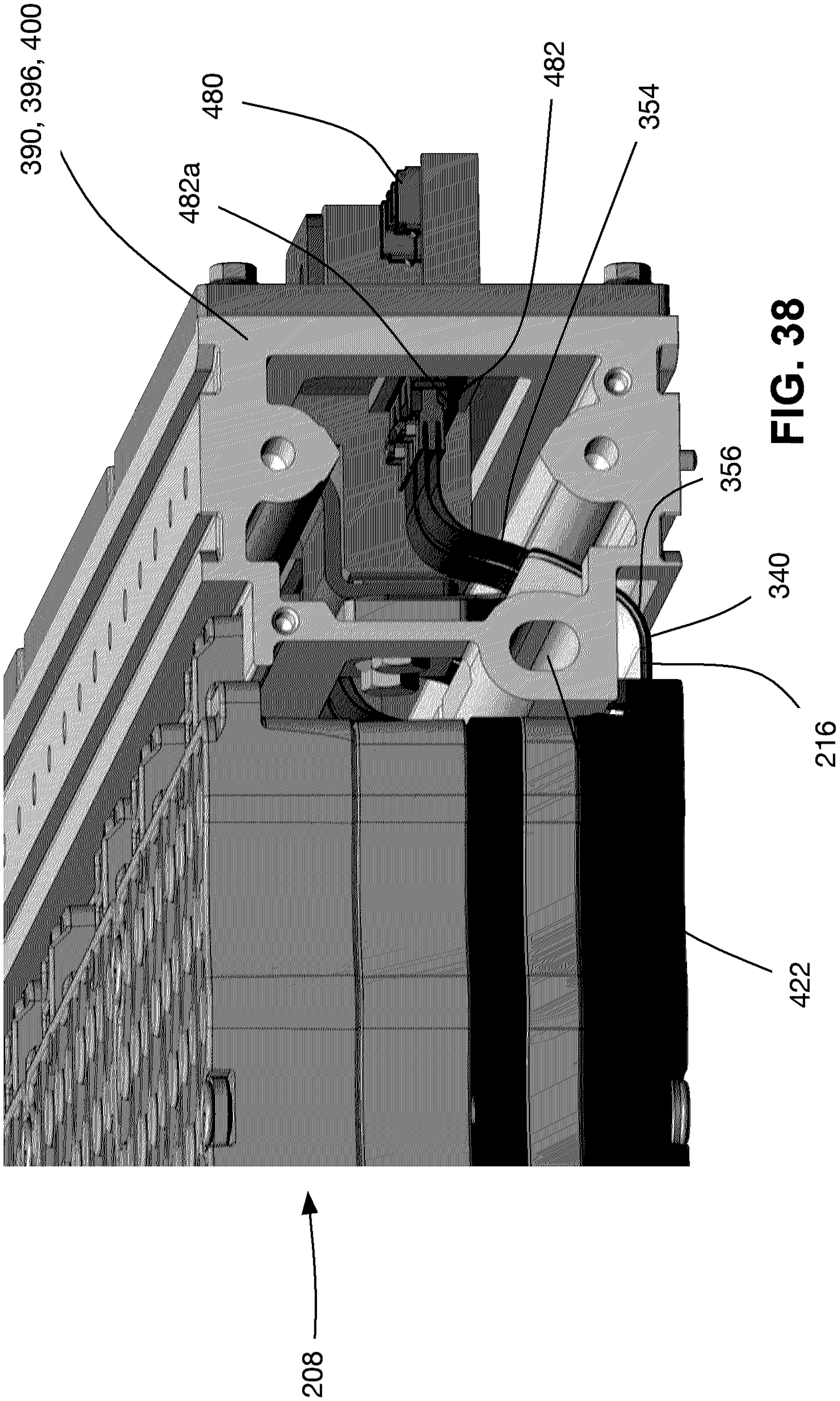
FIG. 38 is a perspective view of a portion of the battery pack shown in FIG. 12A, including a module, bus bars, frame members, a flexbile circuit board, and a printed circuit board thereof.
Figure 39:
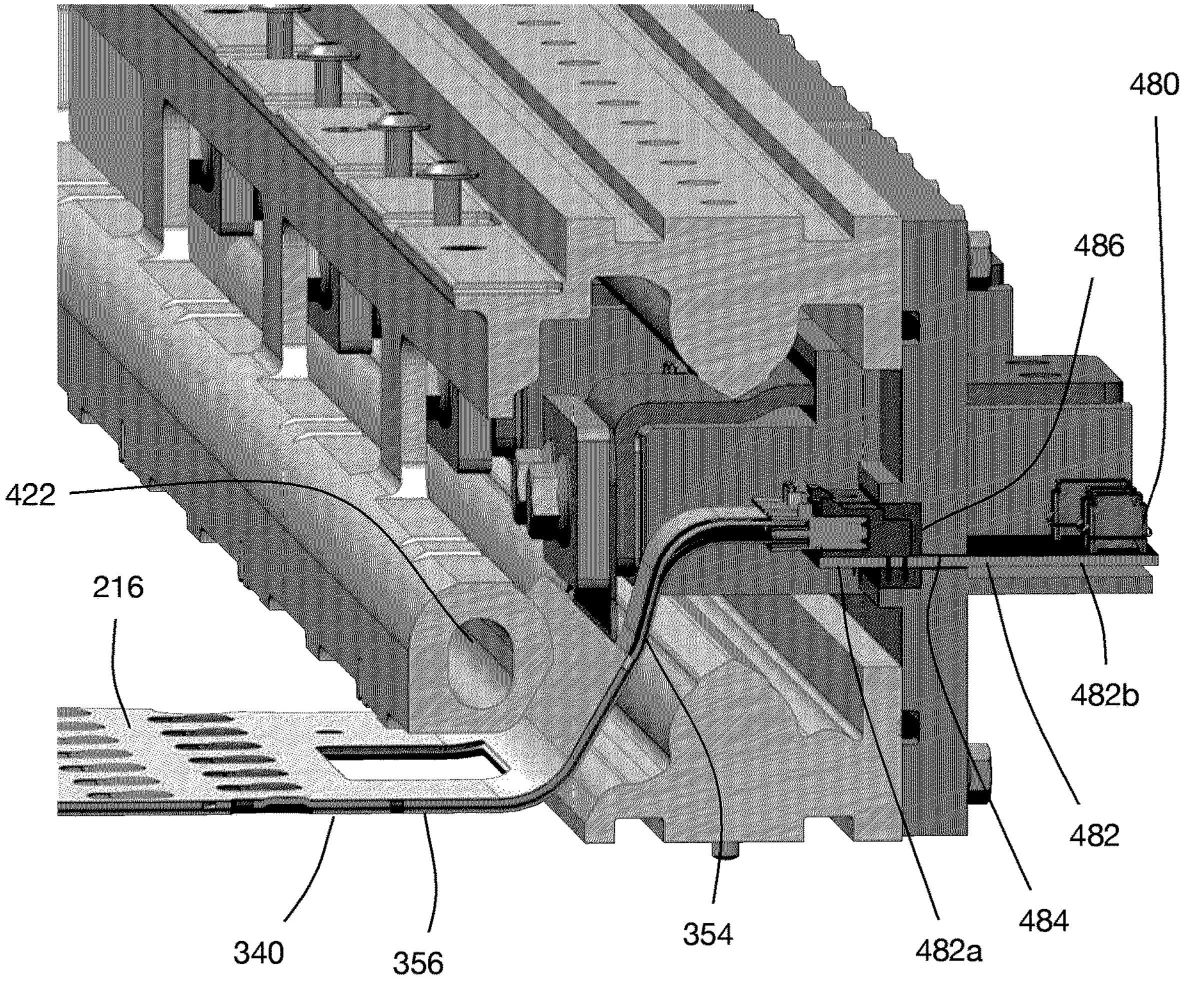
FIG. 39 is a perspective view of a portion of the battery pack shown in FIG. 12A, including bus bars, frame members, a flexible circuit board, and a printed circuit board thereof.
Figure 40:
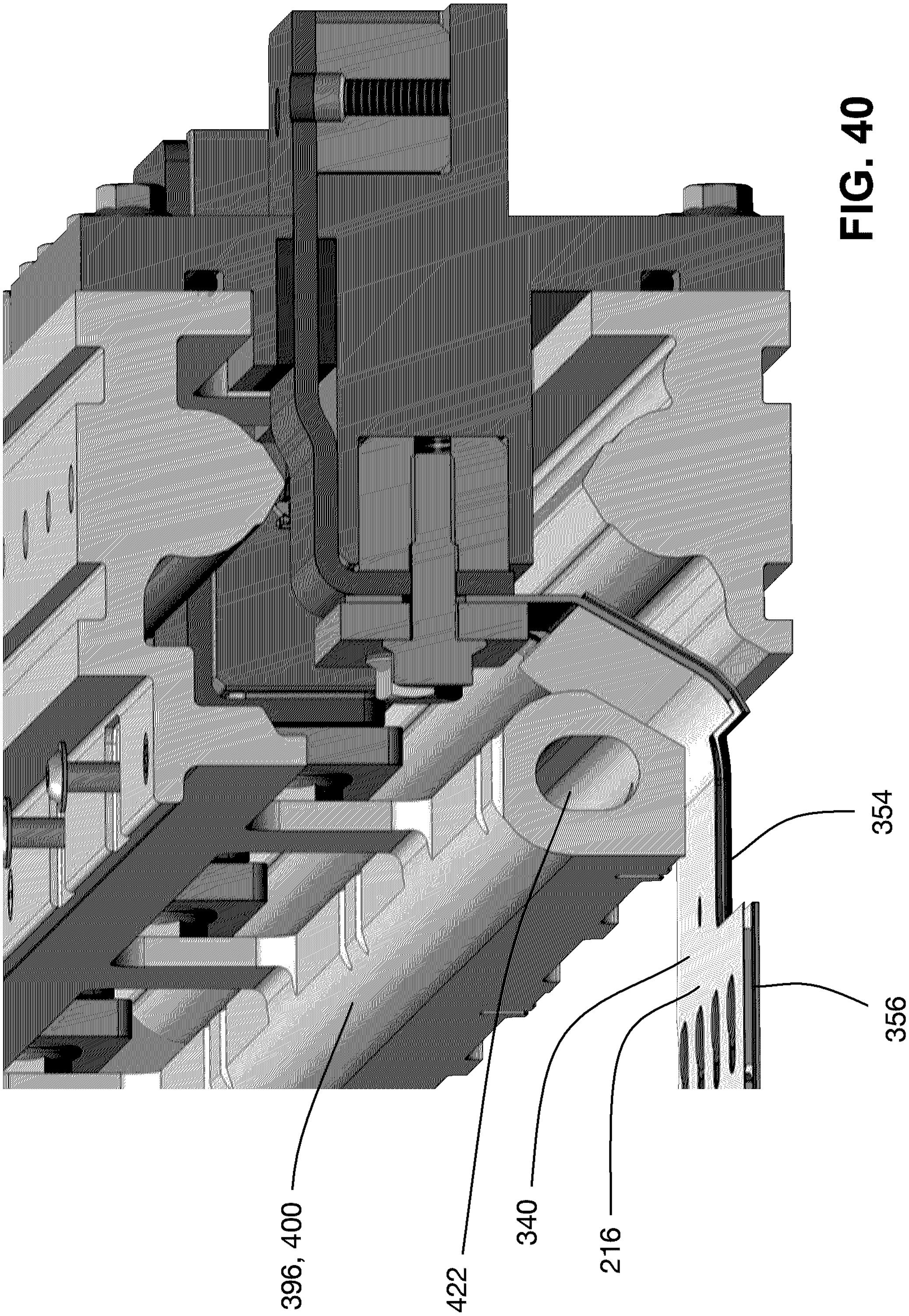
FIG. 40 is a perspective view of a portion of the battery pack shown in FIG. 12A, including bus bars, frame members, a flexible circuit board, and a printed circuit board thereof.

Molding of the Pcb and Bus Bar to the Battery Pack Housing Between the Wet and Dry Side With reference to FIGS. 38, 39 and 40, the lower bus bar arrays 340 and the may connect to the control system in the battery pack dry chamber 206.

As can be seen, a plurality of inner signal-carrying electrical conduits (the traces 354) in the battery pack wet chamber 204 connect with a plurality of outer signal-carrying electrical conduits (conduits shown at 480) outside of the battery pack wet chamber 206.

A printed circuit board 482 is provided that extends through a PCB aperture 484 in the battery pack housing 202. The printed circuit board 482 has a first board portion 482*a* that is inside the battery pack wet chamber 206 and a second board portion 482*b* that is outside the battery pack wet chamber 206. The inner signal-carrying electrical conduits connect to the first board portion 482*a*, and the outer signal-carrying electrical conduits 480 connect to the second board portion 482*b*.

A PCB sealing member 486 that is sealingly connected to the printed circuit board 482 and to the battery pack housing 202 is provided to seal against coolant leakage through the PCB aperture 484.

A controller (that is part of a control system 500 for the battery pack 200) is positioned outside the battery pack wet chamber 206 and receives signals from the outer signal-carrying electrical conduits 480, and controls operation of the battery pack 200, based at least in part on the signals.

Figure 44:
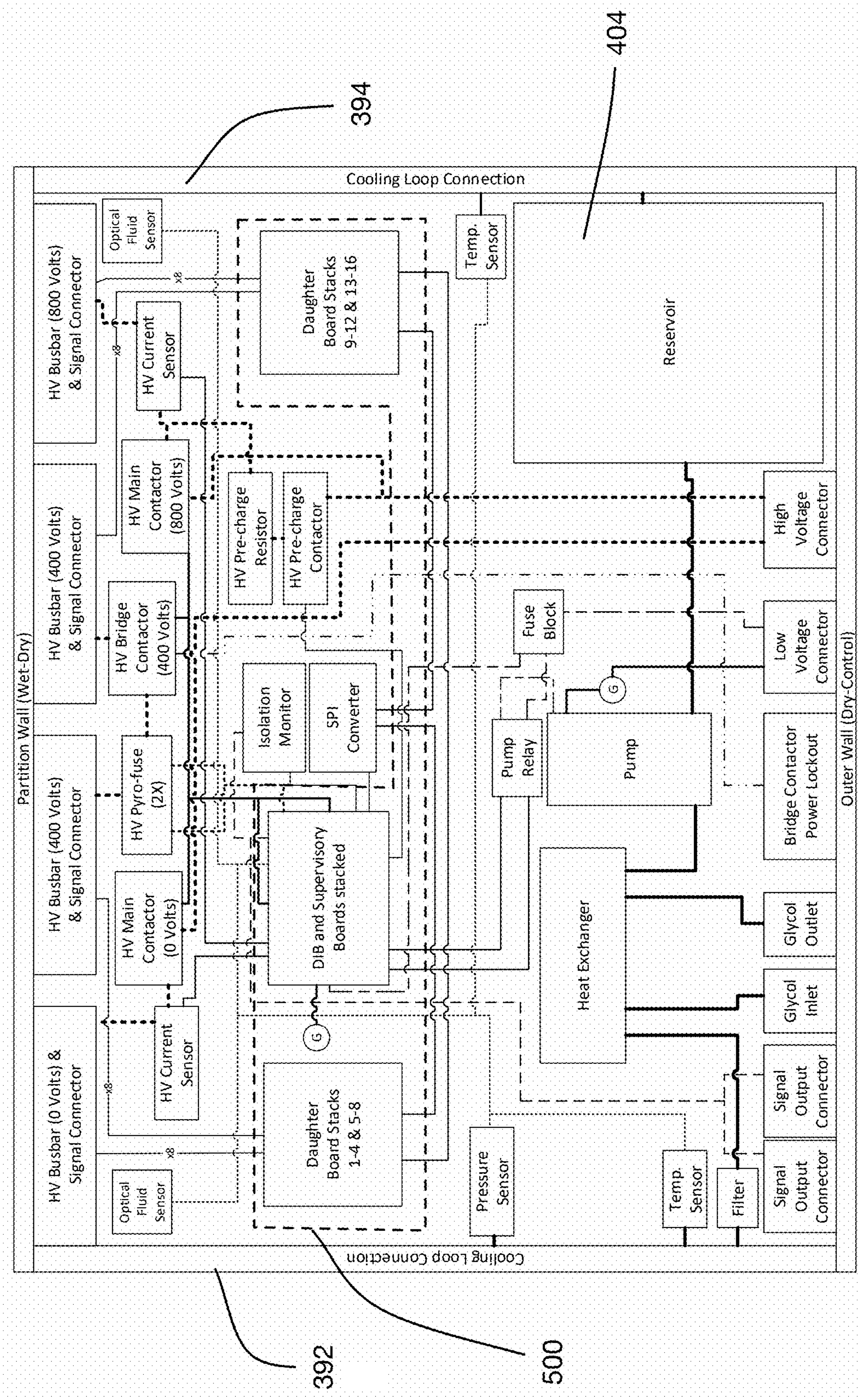
FIG. 44 is a schematic diagram of a control system of the battery pack shown in FIG. 12A.
Figure 45:
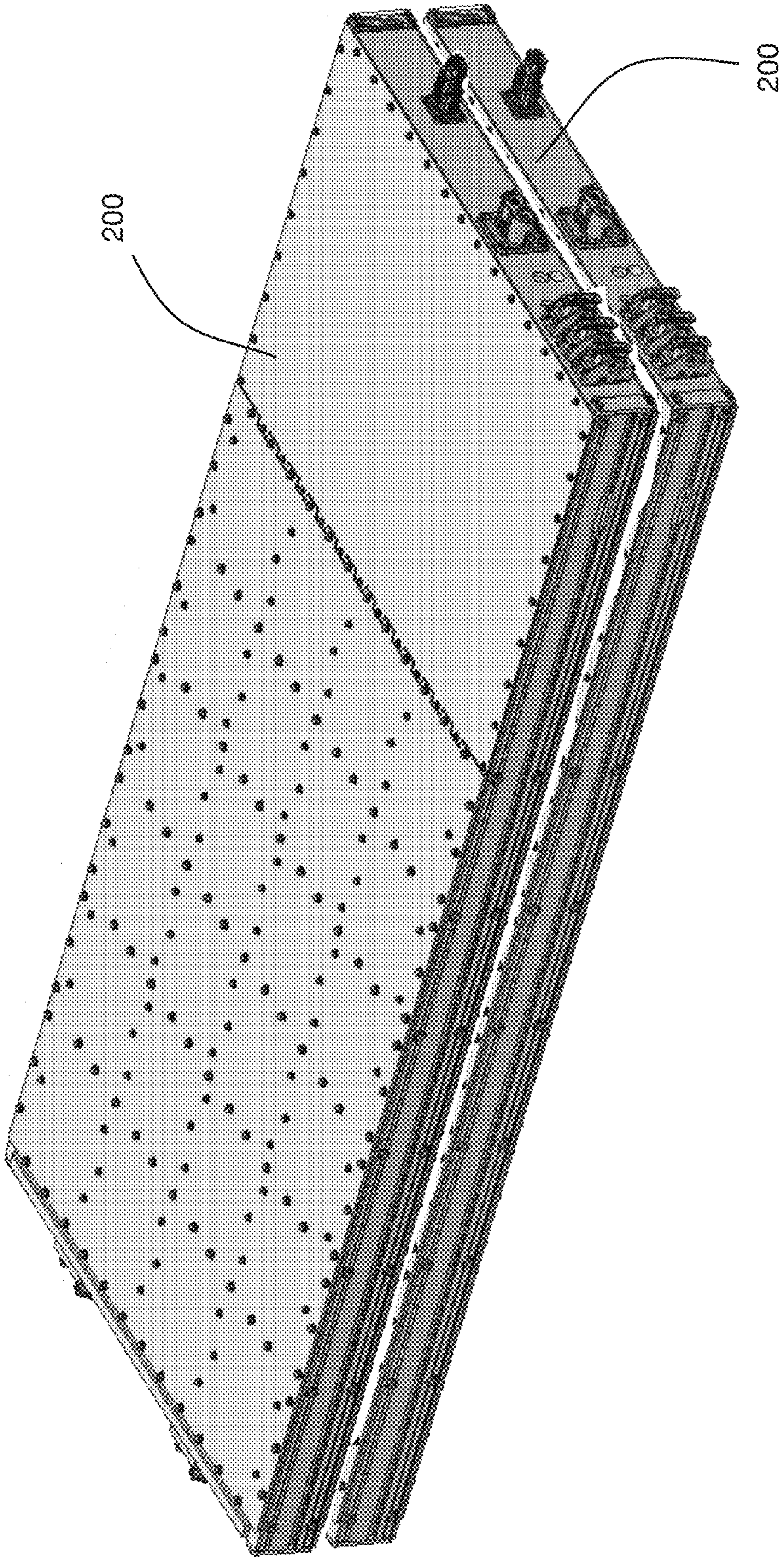
FIG. 45 is a perspective view of a stack of two battery packs shown in FIG. 12A.

FIG. 44 shows a schematic representation of the elements on in the battery pack dry chamber 206, including the control system 500. The control system 500 shown here includes a plurality of individual controllers. The control system 500 may alternatively be referred to as the battery management system 500.

Locking of Modules by Cross-Members

It will be noted that the cross-members 396 of the battery pack frame 380 are shaped to lock the modules adjacent to them in place. As can be seen, the cross-members 396 include recesses 510 that receive lips 512 of the lower housing portions 228 from the adjacent modules 208.

Those skilled in the art will appreciate that the embodiments disclosed herein can be modified or adapted in various other ways whilst still keeping within the scope of the appended claims.

What is claimed is:

1. A module for a battery pack for an electric vehicle, comprising:

a plurality of cells, wherein each of the cells has a top end and a bottom end, and a positive cell terminal and a negative cell terminal, wherein the plurality of cells include a first subset of cells, each having the positive cell terminal at the top end and the negative cell terminal at the bottom end, a second subset of cells, each having the negative cell terminal at the top end and the positive cell terminal at the bottom end;

a module housing including a lower housing portion that includes a lower holder, and a module cover, wherein the lower holder has a plurality of lower holder cell apertures, wherein the plurality of cells are removably supported in the lower holder cell apertures;

an upper bus bar that is electrically conductive, and is mounted to the module cover; and at least one biasing member that is positioned between the module housing and the upper bus bar so as to urge the bus bar against the positive cell terminals of the first subset of cells and the negative cell terminals from the second subset of cells, wherein the module cover is removably mounted to the lower housing portion to hold the upper bus bar in engagement with the positive cell terminals of the first subset of cells and the negative cell terminals from the second subset of cells so as to electrically connect the first subset of cells with the second subset of cells, and is removable therefrom so as to remove the upper bus bar from engagement with the first subset of cells, so as to expose the plurality of cells while also electrically disconnecting the first subset of cells from the second subset of cells, so as to permit removal of at least one of the plurality of cells from the lower housing portion.

2. A module for a battery pack as claimed in claim 1, wherein a voltage measurement rod is mounted to one of the module cover and the lower housing portion in electrical connection with one of the upper and lower bus bars, and extends from said one of the module cover and the lower housing portion, wherein the other of the upper and lower bus bars has a rod engagement feature thereon that is positioned to removably engage the voltage measurement rod by mounting of the module cover onto the lower housing portion, wherein the module further includes a signal conduit that is mounted to the lower housing portion for transmitting a voltage measurement between the upper and lower bus bars to a controller.

3. A module for a battery pack as claimed in claim 2, wherein the voltage measurement rod is mounted to the lower housing portion in electrical connection with the lower bus bars, and extends upward from the lower housing portion, wherein the upper bus bar has the rod engagement feature thereon that is positioned to removably engage the voltage measurement rod by mounting of the module cover onto the lower housing portion.

4. A module for a battery pack as claimed in claim 1, wherein the module has a coolant inlet for receiving coolant from a coolant source, and a coolant outlet for discharging coolant from the module, wherein the coolant inlet is positioned to transfer coolant into an inlet chamber above the upper holder cell apertures and the coolant outlet is positioned below the coolant inlet, such that a coolant flow path through the module extends from the coolant inlet, into the inlet chamber, downward axially along the plurality of cells, and out through the coolant outlet.

5. A module for a battery pack as claimed in claim 1, wherein the plurality of cells includes a third subset of cells, each having the positive cell terminal at the top end and the negative cell terminal at the bottom end, and wherein the module further comprises a lower bus bar that is electrically conductive and that is mounted to the module housing underneath the bottom ends of the plurality of cells, for removable engagement with the positive cell terminals of the second subset of cells and the negative cell terminals from the third subset of cells.

6. A battery pack for an electric vehicle, comprising:

a battery pack housing;

a plurality of modules positioned inside the battery pack housing, wherein each module includes a plurality of cells, wherein each of the cells has a top end and a bottom end, and a positive cell terminal and a negative cell terminal, wherein the plurality of cells include a first subset of cells, each having the positive cell terminal at the top end and the negative cell terminal at the bottom end, a second subset of cells, each having the negative cell terminal at the top end and the positive cell terminal at the bottom end;

a module housing including a lower housing portion that includes a lower holder, and a module cover, wherein the lower holder has a plurality of lower holder cell apertures, wherein the plurality of cells are removably supported in the lower holder cell apertures;

a first upper bus bar that is electrically conductive, and is mounted to the module cover;

at least one biasing member that is positioned between the module housing and the upper bus bar so as to urge the bus bar against the positive cell terminals of the first subset of cells and the negative cell terminals from the second subset of cells, wherein the module cover is removably mounted to the lower housing portion to hold the upper bus bar in engagement with the positive cell terminals of the first subset of cells and the negative cell terminals from the second subset of cells so as to electrically connect the first subset of cells with the second subset of cells, and is removable therefrom so as to remove the upper bus bar from engagement with the first subset of cells, so as to expose the plurality of cells while also electrically disconnecting the first subset of cells from the second subset of cells, so as to permit removal of at least one of the plurality of cells from the lower housing portion, wherein the plurality of modules includes a first subset of modules, wherein, for each module from the first subset of modules except for a final module from the first subset of modules, each module includes a bridging bus bar that connects the positive terminals of a final subset of cells from said each module to the negative terminals of the first subset of cells from a subsequent one of the modules from the first subset of modules, wherein mounting the module covers to the lower housing portions of all of the modules from the first subset of modules electrically connects all of the modules from the first subset of modules together to provide an electrical flow path through the first subset of modules, and wherein removal of any one of the module covers from the lower housing portions of any of the modules from the first subset of modules breaks the electrical flow path through the first subset of modules.

7. A module for a battery pack for an electric vehicle, comprising:

a module housing;

a plurality of cells supported in the module housing, wherein each cell from the plurality of cells includes a positive cell terminal and a negative cell terminal;

a bus bar that is electrically conductive, at least one biasing member having a first end and a second end, wherein the first end is engaged with the bus bar and the second end is engaged with a seat in the module housing so as to urge the bus bar against the positive cell terminals of a first subset of cells from the plurality of cells and against the negative cell terminals from a second subset of cells from the plurality of cells, wherein the at least one biasing member is made from a metal that is electrically conductive, and wherein the seat in the module housing is made from a non-conductive material, and wherein the bus bar and the plurality of cells are electrically connected to a positive battery pack terminal and a negative battery pack terminal of the battery pack in such a way as to form an electric circuit with the bus bar and the plurality of cells for charging and discharging the plurality of cells, wherein the seat in the module housing prevents current from the electric circuit from passing through the at least one biasing member.

8. A module as claimed in claim 7, wherein the at least one biasing member includes a helical compression spring for each cell from the first and second subsets of the plurality of cells.

9. A battery pack as claimed in claim 7, wherein the at least one biasing member includes a layer of resilient material that extends across the bus bar over an area that overlaps at least partially each cell from the subset of the cells from the plurality of cells.

* * * * *